(12) United States Patent
Park et al.

(10) Patent No.: US 8,217,941 B2
(45) Date of Patent: *Jul. 10, 2012

(54) APPARATUS AND METHOD FOR DEPTH IMAGE-BASED REPRESENTATION OF 3-DIMENSIONAL OBJECT

(75) Inventors: In-kyu Park, Seoul (KR); Alexander Olegovich Zhirkov, Moscow (RU); Mahn-jin Han, Kyungki-do (KR); Alexey Victorovich Ignatenko, Moscow (RU); Leonid Ivanovich Leckovich-Maslyuk, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 397 days.

This patent is subject to a terminal disclaimer.

(21) Appl. No.: 10/305,065

(22) Filed: Nov. 27, 2002

(65) Prior Publication Data

US 2003/0214502 A1 Nov. 20, 2003

Related U.S. Application Data

(60) Provisional application No. 60/333,167, filed on Nov. 27, 2001, provisional application No. 60/362,545, filed on Mar. 8, 2002, provisional application No. 60/376,563, filed on May 1, 2002, provisional application No. 60/395,304, filed on Jul. 12, 2002.

(30) Foreign Application Priority Data

Nov. 4, 2002 (KR) .................. 10-2002-0067970

(51) Int. Cl.
*G06T 15/10* (2011.01)
*G06T 15/20* (2011.01)
(52) U.S. Cl. ..................................... 345/427

(58) Field of Classification Search ........... 345/419–428
See application file for complete search history.

(56) References Cited

U.S. PATENT DOCUMENTS 3,816,726 A 6/1974 Sutherland et al.
(Continued)

FOREIGN PATENT DOCUMENTS

JP 2001-283201 10/2001

OTHER PUBLICATIONS

"LDI Tree: a Hierarchical Representation for Image-based Rendering", Chang et. al., pp. 291-298, 1999, ISBN:0-201-48560-5.*

(Continued)

*Primary Examiner* — Said Broome
(74) *Attorney, Agent, or Firm* — Staas & Halsey LLP

(57) ABSTRACT

A family of node structures for representing 3-dimensional objects using depth image are provided. These node structures can be adopted into MPEG-4 AFX for conventional polygonal 3D representations. Main formats of the family are DepthImage, PointTexture and OctreeImage. DepthImage represents an object by a union of its reference images and corresponding depth maps. PointTexture represents the object as a set of colored points parameterized by projection onto a regular 2D grid. OctreeImage converts the same data into hierarchical octree-structured voxel model, set of compact reference images and a tree of voxel-image correspondence indices. DepthImage and OctreeImage have animated versions, where reference images are replaced by videostreams. DIBR formats are very convenient for 3D model construction from 3D range-scanning and multiple source video data. MPEG-4 framework allows construction of a wide variety of representations from the main DIBR formats, providing flexible tools for effective work with 3D models. Compression of the DIBR formats is achieved by application of image (video) compression techniques to depth maps and reference images (videostreams).

22 Claims, 41 Drawing Sheets

U.S. PATENT DOCUMENTS

| | | | |
|---|---|---|---|
| 4,947,347 A | | 8/1990 | Sato |
| 5,774,126 A | | 6/1998 | Chatterjee et al. |
| 5,819,017 A | | 10/1998 | Akeley et al. |
| 5,923,330 A | * | 7/1999 | Tarlton et al. .................. 345/419 |
| 6,072,495 A | | 6/2000 | Watanabe et al. |
| 6,104,837 A | * | 8/2000 | Walker .......................... 382/239 |
| 6,124,864 A | * | 9/2000 | Madden et al. ............... 345/473 |
| 6,215,496 B1 | | 4/2001 | Szeliski et al. |
| 6,249,285 B1 | * | 6/2001 | Madden et al. ............... 345/419 |
| 6,285,779 B1 | * | 9/2001 | Lapidous et al. ............. 382/106 |
| 6,639,597 B1 | * | 10/2003 | Zwicker et al. ............... 345/427 |
| 6,664,958 B1 | * | 12/2003 | Leather et al. ................ 345/422 |
| 6,677,945 B2 | | 1/2004 | Lapidous et al. |
| 2003/0214502 A1 | | 11/2003 | Park et al. |
| 2003/0218606 A1 | | 11/2003 | Zhirkov et al. |

OTHER PUBLICATIONS

"Layered Depth Images", Shade et. al., pp. 231-242, 1998, ISBN:0-89791-999-8.*

"Surfels: surface elements as rendering Primitives", Pfister et. al., pp. 335-342, 2000, ISBN:1-58113-208-5.*

"Image Based Objects", Oliveira et. al., pp. 191-198, 1999, ISBN:1-58113-082-1.*

Wikipedia. "3D projection", article on perspective projection methods.*

Schaufler, G., Nailboards: A Rendering Primitive for Image Caching in Dynamic Scenes, 1997, Eurographics Rendering Workshop, pp. 1-12.*

Chang, C., Bishop, G., Lastra, A., LDI Tree: A Hierarchical Representation for Image-Based Rendering, 1999, ACM, Proceedings of the 26th annual conference on Computer graphics and interactive techniques, pp. 291-298.*

Cleary, J., et al., *Data Compression Using Adaptive Coding and Partial String Matching*, IEEE Transactions on Communications, vol. COM-32, No. 4, Apr. 1984, pp. 396-402.

Rissanen, J., et al., *Universal Modeling and Coding*, IEEE Transactions on Information Theory, vol. IT-27, No. 1, Jan. 1981, pp. 12-23.

Schindler, M., *A Fast Renormalisation for Arithmetic Coding*, Proc. of Data Compression Conference, Mar. 1998.

Martin. G., *Range encoding: an algorithm for removing redundancy from a digitised message*, Video & Data Recording Conference, Mar. 1979, pp. 187-197.

Coxeter, H., et al., *Generators and Relations for Discrete Groups*, 3rd Edition, Springer-Verlag, 1972.

Levovich-Maslyuk, L., et al., *Texture compression with adaptive block partitions*, Proc. of 8th ACM International Conference on Multimedia, Oct. 2000, pp. 401-403.

European Search Report issued by the European Patent Office on Nov. 5, 2004 in corresponding application 02258159.

Jonathan Shade et al., "Layered Depth Images," Computer Graphics, Siggraph 98 Conference Proceedings, U.S.., Jul. 19-24, 1998, pp. 231-242.

Jiangang Duan et al., "Compression of the Layered Depth Image," Data Compression Conference, Proceedings, DCC, IEEE Computer Society Press, Los Alamitos, CA, U.S., Mar. 27, 2001, pp. 331-340.

Manuel M. Oliveira et al., "Relief Texture Mapping," Computer Graphics, Siggraph 2000 Conference Proceedings, USA, Jul. 23-28, 2000, pp. 359-368.

F. Schmitt et al., "3D Color Object Reconstruction from 2D Image Sequences," Proc. of International Conference on Image Processing, 1999, Piscataway, NJ, USA, IEEE, Oct. 24, 1999, pp. 65-69.

Hiroshi Toriyama, "Context Number Reduction for Entropy Coding of Octree Represented 3-D Objects," IEICE Transactions on Information and Systems, Institute of Electronics Information and Comm. Eng. Tokyo, JP, vol. E80-D, No. 2, Feb. 1, 1997, pp. 243-249.

Mikaël Bourges-Sévenier, "PDAM of ISO/IEC 14496-1/AMD4," International Organisation for Standardisation Organisation Internationale de Normalization, N4415, Dec. 2001, pp. I-X through 288.

Y. Bayakovski, et al., "Depth Image-Based Representations for Static and Animated 3D Objects," Proceedings 2002 International Conference on Image Processing, ICIP 2002, Rochester, NY, Sep. 22-25, 2002, IEEE, US, vol. 2 of 3.

Alexander Zhirkov, "Binary Volumetric Octree Representation for Image-Based Rendering," Proc. of Graphicon 2001, Sep. 10, 2001, Nizhny Novgorod, Russia.

Chinese Office Action, dated Feb. 16, 2007, with English-language Translation.

European Office Action, dated May 8, 2007.

Mahnjin Han et al., "Proposal for Image-Based Rendering of AFX," Jul. 2001, Sydney, pp. 1-10.

Mikael Bourges-Sevenier et al., "FPDAM of ISO/IEC 14496-1/AMD4," Jul. 2002, Klagenfurt, pp. 84-89.

Mikael Bourges Sevenier, International Organization of Standardization, ISO/IEC JTC1/SC29/WG11, N5071, "Coding of Moving Pictures and Audio" , Jul. 2002, Klagenfurt, 12 pages.

Office Action issued by European Patent Office on May 10, 2007 in EP Application No. 02 258 158.1-1552 corresponding to U.S. Appl. No. 10/305,070.

U.S. Appl. No. 10/305,070, filed Nov. 27, 2002, Alexander Olegovich Zhirkov, Samsung Electronics Co., Ltd.

Office Action issued by U.S.P.T.O. on Dec. 29, 2004 in co-pending U.S. Appl. No. 10/305,070.

Office Action issued by U.S.P.T.O. on Sep. 26, 2005 in co-pending U.S. Appl. No. 10/305,070.

Final Office Action issued by U.S.P.T.O. on Aug. 10, 2006 in co-pending U.S. Appl. No. 10/305,070.

Office Action issued by U.S.P.T.O. on May 3, 2007 in co-pending U.S. Appl. No. 10/305,070.

Office Action issued by U.S.P.T.O. on Mar. 11, 2008 in co-pending U.S. Appl. No. 10/305,070.

Final Office Action issued by U.S.P.T.O. on Sep. 19, 2008 in co-pending U.S. Appl. No. 10/305,070.

Office Action issued by U.S.P.T.O. on Jan. 28, 2009 in co-pending U.S. Appl. No. 10/305,070.

Final Office Action issued by U.S.P.T.O. on Jun. 2, 2009 in co-pending U.S. Appl. No. 10/305,070.

Oliveira et al., Relief Texture Mapping, International Conference on Computer Graphics and Interactive Techniques, published in 2000, pp. 359-368.

Shade et al., Layered Depth Images, International Conference on Computer Graphics and Interactive Techniques, published in 1998, pp. 231-242.

Japanese Office Action dated Jun. 30, 2009 issued in Japanese Publication No. 2006-203922, corresponding to copending U.S. Appl. No. 10/305,070.

Notice of Allowance dated Apr. 4, 2011 for related U.S. Appl. No. 10/305,070.

Garnot Schaufler "Nailboards: A Rendering Primitive for Image Caching in Dynamic Scenes," Jun. 16, 1997, Proceedings of the Eurographics Workshop on Rendering Techniques '97, pp. 151-162. Referene.com [online], Jul. 5, 2008 [retrieved on Oct. 12, 2009]. Retrieved from the Internet: <URL:http://web.archive.org/web/20080705050037/http://www.reference.com/browse/wiki/Tree_(data_structure)>.

Wikipedia—3D Projection, article on perspective projection methods, Jul. 13, 2010.

Advisory Action dated Sep. 18, 2009 for related U.S. Appl. No. 10/305,070.

Advisory Action dated Oct. 8, 2009 for related U.S. Appl. No. 10/305,070.

Office Action dated Jan. 12, 2010 for related U.S. Appl. No. 10/305,070.

Office Action dated Jul. 9, 2010 for related U.S. Appl. No. 10/305,070.

Chang et al., "LDI Tree: A Hierarchical Representation for Image-Based Rendering", University of North Carolina, 10 pages (in English), Aug. 1999.

Japanese Office Action for corresponding Japanese Patent Application No. 2006-204014 dated Mar. 9, 2010.

U.S. Office Action mailed Feb. 10, 2006 on Co-pending U.S. Appl. No. 10/305,070.

* cited by examiner

FIG. 1
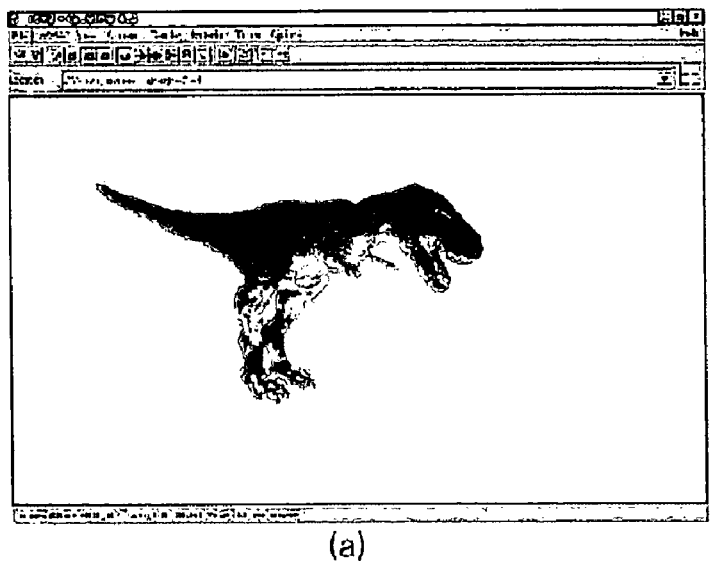
(a)
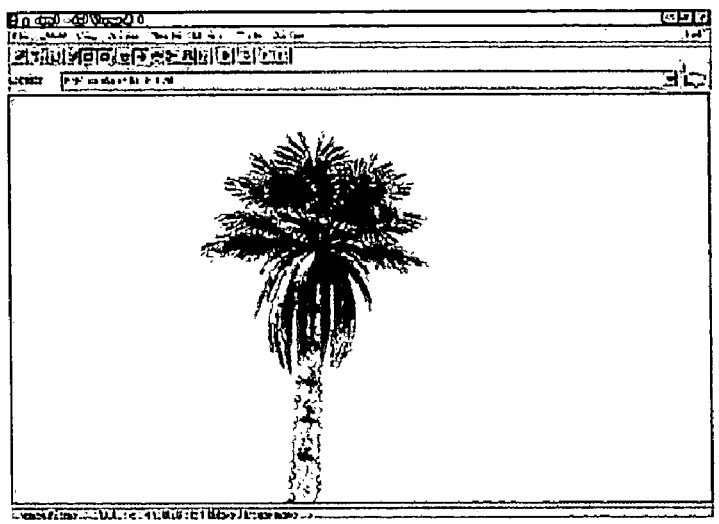
(b)

(a)  (b)

(a)            (b)

FIG. 10
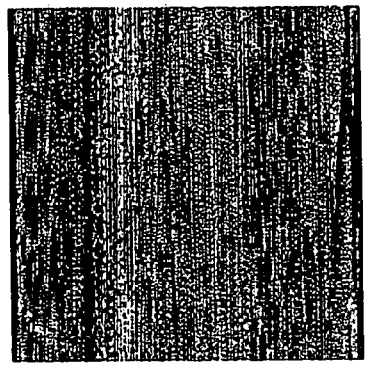
(a)
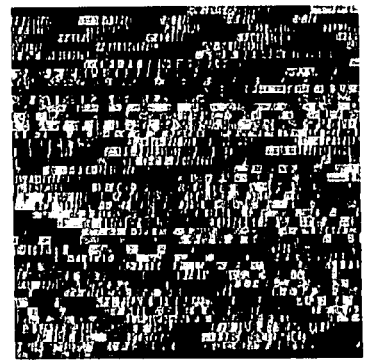
(b)

FIG. 11
(a)
(b)
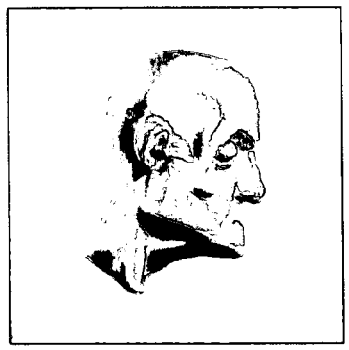
(c)
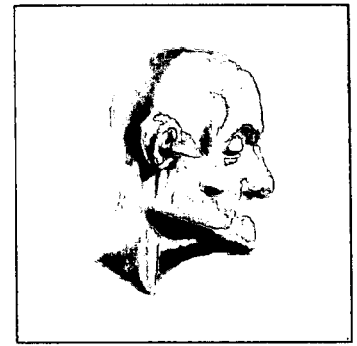
(d)

FIG. 15
| Method | PSNR (dB) | Size (total and geometry-only) | View | Cameras |
|---|---|---|---|---|
| BVO | 22.7 | 58K (32K) |  |  |
| TBVO-6 | 29.3 | 75K (38K) |  |  |
| TBVO-12 | 33.53 | 103K (42K) |  |  |
| TBVO-(6+6) | 31.28 | 106K (42K) |  |  |

FIG. 17

| Method | PSNR (dB) | Size (total and geometry-only) | View | Cameras |
|---|---|---|---|---|
| BVO | 27.5 | 146(87K) | | |
| TBVO-6 | 36.7 | 192K (103K) | | |
| TBVO-12 | 39.9 | 267K (114K) | | |
| TBVO-(6+6) | 37.7 | 171K (88K) | | |

FIG. 18

| Method | PSNR (dB) | Size (Geometry-only) | View | Cameras |
|---|---|---|---|---|
| BVO | 27.0 | 191(81K) | | |
| TBVO-6 | 30.9 | 192K (86K) | | |
| TBVO-6 with Different Camera Locations | 32.8 | 239K (104K) | | |
| TBVO-12 | 33.30 | 212K (83K) | | |
| TBVO-6+6 | 33.34 | 218K (83K) | | |

FIG. 19

| Method | PSNR (dB) | Size (total and geometry only) | View | Cameras |
|---|---|---|---|---|
| BVO | 24.4 | 162(82K) | | |
| TBVO-c | 31.9 | 232K (112K) | | |
| TBVO-12 | 32.1 | 244K (121K) | | |
| TBVO-(6+6) | 32.55 | 274K (126K) | | |

```
if CurNode is not leaf node
        write current BVO-symbol corresponding to this node
if all the children have identical image index (texture-symbol)
        if parent of CurNode has '?' image index
                write image index equal for sub-nodes
else
        write '?' symbol
```

FIG. 26

```
DepthImage {
    field   SFVec3f     position        0 0 10
    field   SFRotation  orientation     0 0 1 0
    field   SFVec2f     fieldOfView     0.785398  0.785398
    field   SFFloat     nearPlane       10
    field   SFFloat     farPlane        100
    field   SFBool      orthographic    FALSE
    field   SFNode      diTextur        NULL
}

SimpleTexture {
    field   SFNode      texture         NULL
    field   SFNode      depth           NULL
}

PointTexture {
    field   SFInt32     width           256
    field   SFInt32     height          256
    field   SFInt32     depthNbBits     7
    field   MFInt32     depth           []
    field   MFColor     color           []
}

OctreeImage {
    field   SFInt32     octreeResolution    256
    field   MFInt32     octree              ""
    field   MFInt32     voxelImageIndex     ""
    field   MFNode      images              []
}
```

FIG. 27
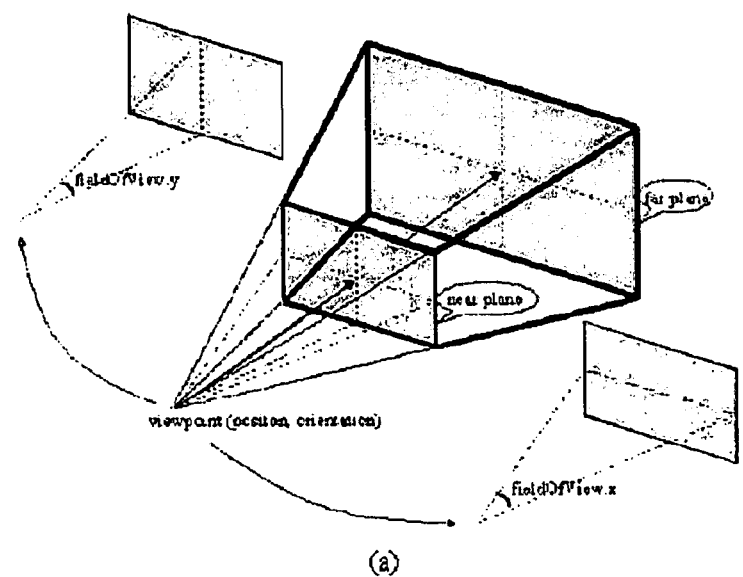
(a)
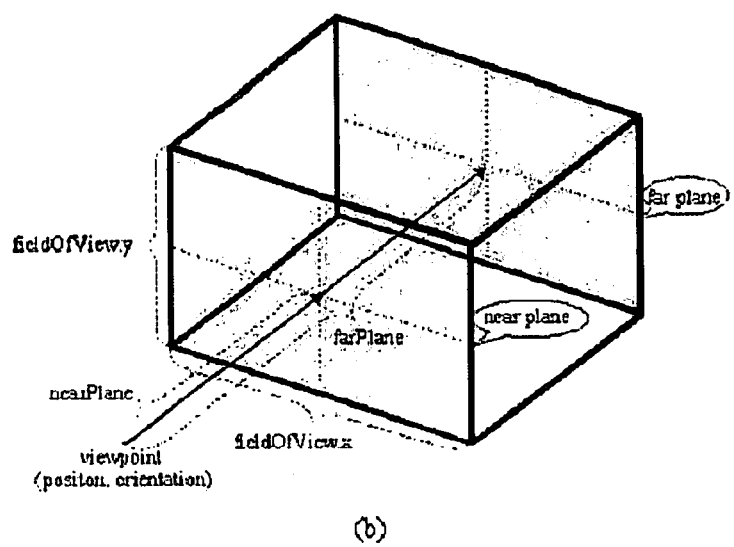
(b)

FIG. 28

```
// Scan all points of the SimpleTexture
for y=0 y<image_height y++
    for x=0 x<image_width x++

// Check if the point belongs to the object
    // projection
    if depth_map(x,y) != 0
    {
        // Compute 3D coordinates
        // up, right,dir,center – camera
        // orientation and location vectors
        point3d = up*y + right*x +
                    dir*depth_map(x,y) + center // Get colors
        color = color_map(x,y)

// Visualize by means of OpenGL
        Splat point3d with a pre-computed radius
        using OpenGL functions.
    }
```

(a)  (b)

(a)  (b)  (c)

(a)  (b)

FIG. 32
 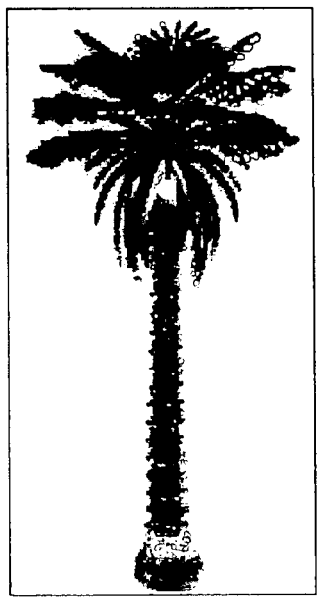
(a)  (b)

ns, in the
APPARATUS AND METHOD FOR DEPTH IMAGE-BASED REPRESENTATION OF 3-DIMENSIONAL OBJECT This application claims the priority of Korean Patent Application No. 2002-67970, filed Nov. 4, 2002, in the Korean Intellectual Property Office. This application also claims the benefit of U.S. Provisional Application No. 60/333,167, filed Nov. 27, 2001; U.S. Provisional Application No. 60/362,545, filed Mar. 8, 2002; U.S. Provisional Application No. 60/376,563, filed May 1, 2002; and U.S. Provisional Application No. 60/395,304, filed Jul. 12, 2002. The entire contents of these applications are incorporated herein by reference.

BACKGROUND OF THE INVENTION

1. Description of the Related Art

The present invention relates to an apparatus and method for representing depth image-based 3-dimensional (3D) objects, and more particularly, to an apparatus and method for representing 3-dimensional (3D) objects using depth image, for computer graphics and animation, called depth image-based representations (DIBR), that has been adopted into MPEG-4 Animation Framework eXtension (AFX).

2. Description of the Related Art

Since the beginning of research on 3-Dimensional (3D) graphics, it is the ultimate goal of researchers to synthesize realistic graphic scene like a real image. Therefore, researches on traditional rendering technologies using polygonal models have been carried out and as a result, modeling and rendering technologies have been developed enough to provide very realistic 3D environments. However, the process for generating a complicated model needs a lot of efforts by experts and takes much time. Also, a realistic and complicated environment needs a huge amount of information and causes to lower efficiency in storage and transmission.

Currently, polygonal models are typically used for 3D object representation in computer graphics. An arbitrary shape can be substantially represented by sets of color polygons, that is, triangles. Greatly advanced software algorithms and development of graphic hardware make it possible to visualize complex objects and scenes as considerably realistic still and moving image polygonal models.

However, search for alternative 3D representations has been very active during the last decade. Main reasons for this include the difficulty of constructing polygonal models for real-world objects as well as the rendering complexity and unsatisfactory quality for producing a truly photo-realistic scene.

Demanding applications require enormous amount of polygons; for example, detailed model of a human body contains several million triangles, which are not easy to handle. Although recent progress in range-finding techniques, such as laser range scanner, allows us to acquire dense range data with tolerable error, it is still very expensive and also very difficult to obtain seamlessly complete polygonal model of the whole object. On the other hand, rendering algorithms to obtain photo-realistic quality are computationally complex and thus far from the real-time rendering.

SUMMARY OF THE INVENTION

It is an aspect of this invention to provide an apparatus and method for representing 3-dimensional (3D) objects using depth image, for computer graphics and animation, called depth image-based representations (DIBR), that has been adopted into MPEG-4 Animation Framework eXtension (AFX).

It is another aspect of this invention to provide a computer-readable recording medium having a program for embodying a method for representing 3-dimensional (3D) objects using depth image, for computer graphics and animation, called depth image-based representations (DIBR), that has been adopted into MPEG-4 Animation Framework extension (AFX) by computer readable codes.

In an aspect, the present invention provides a depth image based 3-dimensional (3D) object representing apparatus including a viewpoint information generator for generating at least one piece of viewpoint information, a first image generator for generating color images on the basis of color information corresponding to the viewpoint information on the respective pixel points constituting an object, a second image generator for generating depth images on the basis of depth information corresponding to the viewpoint information on the respective pixel points constituting an object, a node generator for generating image nodes composed of viewpoint information, a color image and a depth image corresponding to the viewpoint information, and an encoder for encoding the generated image nodes.

In another aspect, the present invention provides a depth image based 3-dimensional (3D) object representing apparatus including a viewpoint information generator for generating viewpoint information on a viewpoint from which an object is viewed, a plane information generator for generating plane information defining the width, height and depth of an image plane corresponding to the viewpoint information, a depth information generator for generating a sequence of depth information on depths of all projected points of an object projected onto the image plane, a color information generator for generating a sequence of color information on the respective projected points, and a node generator for generating node composed of plane information corresponding to the image plane, a sequence of depth information and a sequence of color information.

In still another aspect, the present invention provides a depth image-based 3D object representing apparatus including a shape information generator for generating shape information for an object by dividing an octree containing the object into 8 subcubes and defining the divided subcubes as children nodes, a reference image determiner for determining a reference image containing a color image for each cube divided by the shape information generator, an index generator for generating index information of the reference image corresponding to the shape information, a node generator for generating octree nodes including shape information, index information and reference image, and an encoder for encoding the octree nodes to output bitstreams, wherein the shape information generator iteratively performs subdivision until each subcube becomes smaller than a predetermined size.

In a further aspect, the present invention provides a depth image-based 3D object representing apparatus including an input unit for inputting bitstreams, a first extractor for extracting octree nodes from the input bitstreams, a decoder for decoding the octree nodes, a second extractor for extracting shape information and reference images for a plurality cubes constituting octrees from the decoded octree nodes, and an object representing unit for representing an object by combination of the extracted reference images corresponding to the shape information.

Alternatively, the present invention provides a depth image based 3-dimensional (3D) object representing method including generating at least one piece of viewpoint information, generating color images on the basis of color information corresponding to the viewpoint information on the respective pixel points constituting an object, generating depth images on the basis of depth information corresponding to the viewpoint information on the respective pixel points constituting an object, generating image nodes composed of viewpoint information, a color image and a depth image corresponding to the viewpoint information, and encoding the generated image nodes.

In another aspect, the present invention provides a depth image based 3-dimensional (3D) object representing method including generating viewpoint information on a viewpoint from which an object is viewed, generating plane information defining the width, height and depth of an image plane corresponding to the viewpoint information, generating a sequence of depth information on depths of all projected points of an object projected onto the image plane, generating a sequence of color information on the respective projected points, and generating a node composed of plane information corresponding to the image plane, the sequence of depth information and the sequence of color information.

In still another aspect, the present invention provides a depth image-based 3D object representing method including generating shape information for an object by dividing an octree containing the object into 8 subcubes and defining the divided subcubes as children nodes, determining a reference image containing a color image for each cube divided by the shape information generator, generating index information of the reference image corresponding to the shape information, generating octree nodes including shape information, index information and reference image, and encoding the octree nodes to output bitstreams, wherein in step of generating the shape information, subdivision is iteratively performed until each subcube becomes smaller than a predetermined size.

In a further aspect, the present invention provides a depth image-based 3D object representing method including inputting bitstreams, extracting octree nodes from the input bitstreams, decoding the octree nodes, extracting shape information and reference images for a plurality cubes constituting octrees from the decoded octree nodes, and representing an object by combination of the extracted reference images corresponding to the shape information.

According to the present invention, rendering time for image-based models is proportional to the number of pixels in the reference and output images, but in general, not to the geometric complexity as in polygonal case. In addition, when the image-based representation is applied to real-world objects and scene, photo-realistic rendering of natural scene becomes possible without use of millions of polygons and expensive computation.

BRIEF DESCRIPTION OF THE DRAWINGS

The above objects and advantages of the present invention will become more apparent by describing in detail preferred embodiments thereof with reference to the attached drawings in which:

FIG. 1 is a diagram of examples of IBR integrated in current reference software;

FIG. 10 is a diagram showing two ways of rearrangement of color field of "Angel" PointTexture model into 2D image;

FIG. 11 is a diagram of examples of lossless geometry and lossy color compression: (a) and (b) are original and compressed version of "Angel" model respectively, and (c) and (d) are original and compressed version of "Morton256" model respectively;

FIGS. 15, 17, 18, and 19 are diagrams showing the results of TBVO compression of "Angel", "Morton", "Palm512", and "Robots512", respectively;

FIG. 25 is pseudo-code for writing the TBVO bitstream;

FIG. 26 is a diagram showing the specification of the DIBR nodes;

FIG. 27 is a diagram of view volume model for DepthImage: (a) is in perspective view, (b) is in orthographic view;

FIG. 28 is pseudo-code of OpenGL-based rendering of SimpleTexture;

FIG. 32 is a diagram of rendering examples of "Palm" model: (a) shows an original polygonal format, and (b) shows the same model, but in a DepthImage format;

DESCRIPTION OF THE PREFERRED EMBODIMENTS

Figure 2:
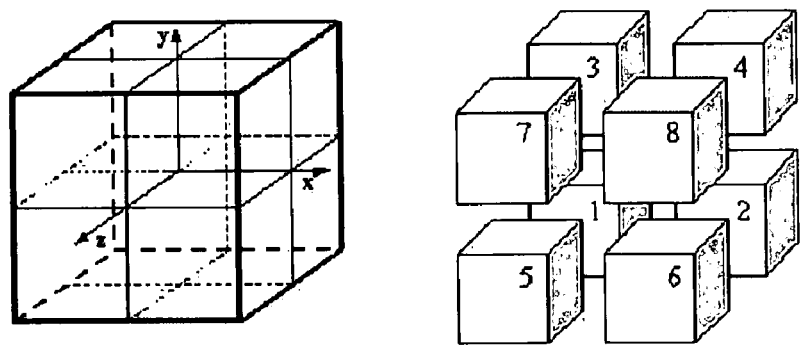
FIG. 2 is a diagram of a structure of octree and the order of the children.

This application claims the benefits of U.S. Provisional Applications listed below, which are incorporated herein by reference in their entireties.

I. ISO/IEC JTC 1/SC 29/WG 11 Coding of Moving Pictures and Audio

1. Introduction

In this document, the result of the core experiment on Image-based Rendering, AFX A8.3, is reported. This core experiment is for image-based rendering technology that uses textures with depth information. Also, based on the experiments after 57$^{th}$ MPEG meeting and discussions during AFX AdHoc Group meeting in October, few changes made to the node specification are presented.

2. Experimental Results 2.1. Test Models

For still objects

DepthImage node with SimpleTexture

Dog

Tirannosaurus Rex (DepthImage, using about 20 cameras)

Terrasque (a monster) (DepthImage, about 20 cameras)

ChumSungDae (DepthImage, scanned data)

Palmtree (DepthImage, 20 cameras)

DepthImage node with LayeredTexture

Angel

DepthImage node with PointTexture

Angel

OctreeImage node

Creature

For animated objects

DepthImage node with SimpleTexture

Dragon

Dragon in scene environment

DepthImage node with LayeredTexture

Not provided

OctreeImage node

Robot

Dragon in scene environment

More data (scanned or modeled) shall be provided in the future.

2.2. Test Results

All the nodes proposed in Sydney are integrated into blaxxun contact 4.3 reference software. However, the sources are not uploaded in the cvs server yet.

The animated formats of the IBR needs to have synchronization between multiple movie files in such a way that images in the same key frame from each movie file must be given at the same time. However, current reference software does not support this synchronization capability, which is possible in MPEG Systems. Therefore, currently, the animated formats can be visualized assuming all animation data are already in the file. Temporarily, movies files in an AVI format are used for each animated texture.

After some experiments with layered textures, we were convinced that Layered Texture node is not efficient. This node was proposed for Layered Depth Image. However, there is also PointTexture node that can support it. Therefore, we propose to remove the Layered Texture node from the node specification. FIG. 1 shows examples of IBR integrated in the current reference software.

3. Updates on IBR Node Specification

The conclusion from the Sydney meeting on the IBR proposal was to have IBR stream that contains images and camera information and IBR node shall only have link (url) to it. However, during the AhG meeting in Rennes, the result of the discussion on IBR was to have images and camera information both in IBR nodes and stream. Thus, the following is the updated node specification for IBR nodes. The requirements for the IBR stream are given in the section that explains the url field.

Decoder (Bitstreams)—Node Specification

```
DepthImage {
    field    SFVec3f      position         0 0 10
    field    SFRotation   orientation      0 0 1 0
    field    SFVec2f      fieldOfView      0.785398   0.785398
    field    SFFloat      nearPlane        10
    field    SFFloat      farPlane         100
    field    SFBool       orthogonal       FALSE
    field    SFNode       diTexture        NULL
    field    SFString     depthImageUrl    ""
}
```

The DepthImage node defines a single IBR texture. When multiple DepthImage nodes are related to each other, they are processed as a group, and thus, should be placed under the same Transform node.

The diTexture field specifies the texture with depth, which shall be mapped into the region defined in the DepthImage node. It shall be one of the various types of depth image texture (SimpleTexture or PointTexture).

The position and orientation fields specify the relative location of the viewpoint of the IBR texture in the local coordinate system. Position is relative to the coordinate system's origin (0, 0, 0), while orientation specifies a rotation relative to the default orientation. In the default position and orientation, the viewer is on the Z-axis looking down the −Z-axis toward the origin with +X to the right and +Y straight up. However, the transformation hierarchy affects the final position and orientation of the viewpoint.

The fieldOfView field specifies a viewing angle from the camera viewpoint defined by position and orientation fields. The first value denotes the angle to the horizontal side and the second value denotes the angle to the vertical side. The default values are 45 degrees in radiant. However, when orthogonal field is set to TRUE, the fieldOfView field denotes the width and height of the near plane and far plane.

The nearPlane and farPlane fields specify the distances from the viewpoint to the near plane and far plane of the visibility area. The texture and depth data shows the area closed by the near plane, far plane and the fieldOfView. The depth data are normalized to the distance from nearPlane to farPlane.

The orthogonal field specifies the view type of the IBR texture. When set to TRUE, the IBR texture is based on orthogonal view. Otherwise, the IBR texture is based on perspective view.

The depthImageUrl field specifies the address of the depth image stream, which may optionally contain the following contents.

position orientation fieldOfView nearPlane farPlane orthogonal diTexture (SimpleTexture or PointTexture)

1 byte header for the on/off flags of the above fields

```
SimpleTexture {
    field    SFNode    texture    NULL
    field    SFNode    depth      NULL
}
```

The SimpleTexture node defines a single layer of IBR texture.

The texture field specifies the flat image that contains color for each pixel. It shall be one of the various types of texture nodes (ImageTexture, MovieTexture or PixelTexture).

The depth field specifies the depth for each pixel in the texture field. The size of the depth map shall be the same size as the image or movie in the texture field. It shall be one of the various types of texture nodes (ImageTexture, MovieTexture or PixelTexture). If the depth node is NULL or the depth field is unspecified, the alpha channel in the texture field shall be used as the depth map.

```
PointTexture {
    field    SFInt32    width     256
    field    SFInt32    height    256
    field    MFInt32    depth     0
    field    MFColor    color     0
}
```

The PointTexture node defines a multiple layers of IBR points.

The width and height field specifies the width and height of the texture.

The depth field specifies a multiple depths of each point (in normalized coordinates) in the projected plane in the order of traversal, which starts from the point in the lower left corner and traverses to the right to finish the horizontal line before moving to the upper line. For each point, the number of depths (pixels) is first stored and that number of depth values shall follow.

The color field specifies color of current pixel. The order shall be the same as the depth field except that number of depths (pixels) for each point is not included.

```
OctreeImage {
    field    SFInt32    octreeresolution    256
    field    SFString   octree              ""
    field    MFNode     octreeimages        0
    field    SFString   octreeUrl           ""
}
```

The OctreeImage node defines an octree structure and their projected textures. The size of the enclosing cube of the total octree is 1×1×1, and the center of the octree cube shall be the origin (0, 0, 0) of the local coordinate system.

The octreeresolution field specifies maximum number of octree leaves along a side of the enclosing cube. The level of the octree can be determined from octreeresolution using the following equation: octreelevel=int(log2(octreeresolution−1))+1)

The octree field specifies a set of octree internal nodes. Each internal node is represented by a byte. 1 in ith bit of this byte means that the children nodes exist for the ith child of that internal node, while 0 means that it does not. The order of the octree internal nodes shall be the order of breadth first traversal of the octree. The order of eight children of an internal node is shown in FIG. 2.

The octreeimages field specifies a set of DepthImage nodes with SimpleTexture for diTexture field. However, the nearPlane and farPlane field of the DepthImage node and the depth field in the SimpleTexture node are not used.

The octreeUrl field specifies the address of the octreeImage stream with the following contents.

header for flags
octreeresolution
octree
octreeimages (Multiple DepthImage nodes)
   nearPlane not used
   farPlane not used
   diTexture→SimpleTexture without depth

II. ISO/IEC JTC 1/SC 29/WG 11 Coding of Moving Pictures and Audio

1. Introduction

In this document, the result of the core experiment on Depth Image-based Rendering (DIBR), AFX A8.3, is reported. This core experiment is for the depth image-based representation nodes that uses textures with depth information. The nodes have been accepted and included in a proposal for Committee Draft during Pattaya meeting. However, the streaming of this information through octreeUrl field of OctreeImage node and depthImageUrl field of DepthImage node still remained on-going. This document describes the streaming format to be linked by these url fields. The streaming format includes the compression of octree field of OctreeImage node and depth/color fields of PointTexture node.

2. Streaming Format for OctreeUrl

2.1. Stream Format

The OctreeImage node includes the octreeUrl field, which specifies the address of the octreeImage stream. This stream may optionally contain the following contents.

header for flags
octreeresolution
octree
octreeimages (Multiple DepthImage nodes)
   nearPlane not used
   farPlane not used
   diTexture→SimpleTexture without depth The octree field specifies a set of octree internal nodes. Each internal node is represented by a byte. 1 in ith bit of this byte means that the children nodes exist for the ith child of that internal node, while 0 means that it does not. The order of the octree internal nodes shall be the order of breadth first traversal of the octree. The order of eight children of an internal node is shown in FIG. 2.

The octree field of OctreeImage node is in a compact format. However, this field may be further compressed in order to have efficient streaming. The following section describes the compression scheme for the octree field of OctreeImage node.

2.2. Compression Scheme for Octree Field

In octree representation of DIBR, the data consists of the octree field, which represents the geometry component. Octree is a set of points in the enclosing cube, completely representing the object surface.

Non-identical reconstruction of the geometry from compressed representation leads to highly noticeable artifacts. Hence, geometry must be compressed without loss of information.

2.2.1. Octree Compression

For the compression of octree field represented in the depth-first traversal octree form, we developed a lossless compression method using some ideas of the PPM (Prediction by Partial Matching) approach. The main idea we use is "prediction" (i.e. probability estimation) of the next symbol by several previous symbols that are called 'context'. For each context, there exists a probability table, containing the estimated probability of occurrence of each symbol in this context. This is used in combination with an arithmetic coder called range coder.

The two main features of the method are:
1. using parent node as a context for the child node;
2. using 'orthogonal invariance' assumption to reduce number of contexts;

The second idea is based on the observation that 'transition probability' for pairs of 'parent-child' nodes is typically invariant under orthogonal transforms (rotation and symmetry). This assumption is illustrated in Annex 1. This assumption allows us to use more complex context without having too many probability tables. This, in turn, allowed us to achieve quite good results in terms of volume and speed, because the more contexts are used, the sharper is probability estimate, and thus the more compact is the code.

Coding is the process of constructing and updating the probabilistic table according to the context model. In the proposed method, the context is modeled as the parent-child hierarchy in octree structure. First, we define Symbol as a byte node whose bits indicate the occupancy of subcube after internal subdivision. Therefore, each node in octree can be a symbol and its numeric value will be 0-255. The probabilistic table (PT) contains 256 integer values. Value of i-th variable ($0 \leq i \leq 255$), divided by the sum of all the variables, equals to the frequency (estimate of probability) of the i-th symbol occurrence. The Probabilistic Context Table (PCT) is set of PTs. Probability of a symbol is determined from one and only one of the PTs. The number of the particular PT depends on the context. An example of PCT is shown in Table 1.

TABLE 1

Component of a Probabilistic Context Tables (PCT)

| ID of PTs | 0 | 1 | ... | 255 | Context description |
|---|---|---|---|---|---|
| 0 | $P_{0,0}$ | $P_{0,1}$ | ... | $P_{0,255}$ | 0-Context: Context independent |
| 1..27 (27) | $P_{i,0}$ | $P_{i,1}$ | ... | $P_{i,255}$ | 1-Context: Parent Symbol |
| 28...243 (27*8) | $P_{j,0}$ | $P_{j,1}$ | ... | $P_{j,255}$ | 2-Context: Parent Symbol and Node Symbol |

Coder works as follows. It first uses 0-context model (i.e. a single PT for all the symbols, starting from uniform distribution, and updating the PT after each new coded symbol). The tree is traversed in depth-first order. When enough statistics is gathered (empirically found value is 512 coded symbols), the coder switches to 1-context model. It has 27 contexts, which are specified as follows.

Consider a set of 32 fixed orthogonal transforms, which include symmetries and rotations by 90 degrees about the coordinate axes (see Annex 2). Then, we can categorize the symbols according to the filling pattern of their subcubes. In our method, there will be 27 sets of symbols, called groups here, with the following property: 2 symbols are connected by one of these fixed transforms, if and only if they belong to the same group.

In the byte notation the groups are represented by 27 sets of numbers (see Annex 2). We assume that the probability table depends not on the parent node itself (in which case there would have been 256 tables), but only on the group (denoted ParentSymbol in FIG. 2) to which the parent node belongs (hence 27 tables).

At the switching moment, PT's for all the contexts are set to copies of the 0-context PT. Then, each of the 27 PTs is updated when it is used for coding.

After 2048 (another heuristic value) symbols are coded in 1-context model, we switch to 2-context model, which uses the pairs (ParentSymbol, NodeSymbol) as contexts. NodeSymbol is simply position of the current node in the parent node. So, we have 27*8 contexts for 2-context model. At the moment of switching to that model, PTs obtained for each context are used for each node 'inside' this context, and from this time are updated independently.

In some more technical detail, the encoding for 1-context and 2-context models proceeds as follows. For the context of the current symbol (i.e. the parent node), its group is determined. This is done by table lookup (geometric analysis was performed at the stage of the program development). Then, we apply an orthogonal transform that takes our context into a "standard" (arbitrary selected once and for all) element of the group it belongs to. The same transform is applied to the symbol itself (these operations are also implemented as table lookup, of course—all the computations for all the possible combinations were done in advance). Effectively, this is computation of the correct position of the current symbol in probability table for the group containing its context. Then the corresponding probability is fed to the RangeCoder.

In short, given a parent symbol and subnode position, ContextID is determined which identifies the group ID and the position of PT in PCT. The probability distribution in PT and the ContextID is fed into a range coder. After encoding, PCT is updated to be used in next encoding. Note that the range coder is a variation of arithmetic coding which does renormalization in bytes instead of bits thus running twice faster, and with 0.01% worse compression than a standard implementation of arithmetic coding.

The decoding process is essentially an inverse of the encoding process. This is absolutely standard procedure which needs not to be described, since it uses exactly the same methods of determining the contexts, updating probabilities, etc.

2.3. Test Results

Figure 3:
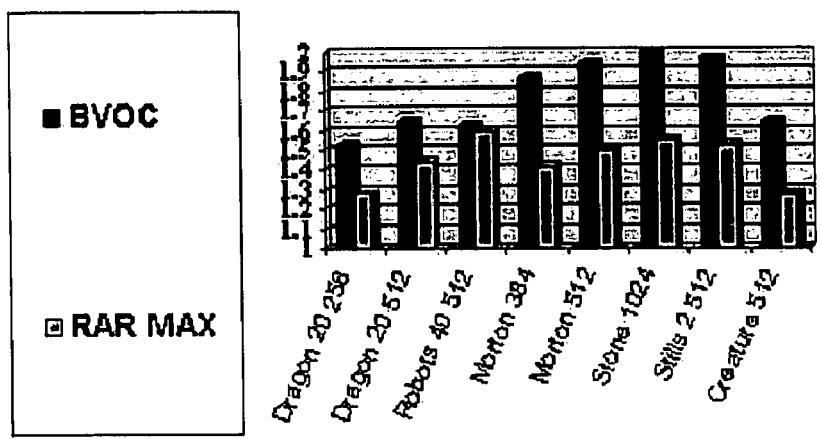
FIG. 3 is a graph showing Octree compression ration.

FIG. 3 is a table for comparison of our approach, for both still and animated models (ordinates denote compression ratio.). Octree compression ratio varies around 1.5-2 times compared to original octree size, and outperforms general-purpose lossless compressions (Lempel-Ziv based, like RAR program) by as much as 30%.

3. Streaming Format for DepthImageUrl 3.1. Stream Format

The DepthImage node includes depthImageUrl field, which specifies the address of the depth image stream. This stream may optionally contain the following contents.

1 byte header for the on/off flags of the fields below position orientation fieldOfView nearPlane farPlane orthogonal diTexture (SimpleTexture or PointTexture)

The definition of PointTexture node, which can be used in the diTexture field of DepthImage node, is as follows.

```
PointTexture {
    field    SFInt32    width    256
    field    SFInt32    height   256
    field    MFInt32    depth    []
    field    MFColor    color    []
}
```

The PointTexture node defines multiple layers of IBR points. The width and height field specifies the width and height of the texture. The depth field specifies a multiple depths of each point (in normalized coordinates) in the projected plane in the order of traversal, which starts from the point in the lower left corner and traverses to the right to finish the horizontal line before moving to the upper line. For each point, the number of depths (pixels) is first stored and that number of depth values shall follow. The color field specifies color of current pixel. The order shall be the same as the depth field except that number of depths (pixels) for each point is not included.

The depth and color fields of PointTexture are in a raw format, and the size of these fields will most likely be very large. Therefore, these fields need to be compressed in order to have efficient streaming. The following section describes the compression scheme for the fields of PointTexture node.

3.2. Compression Scheme for PointTexture 3.2.1. Compression of Depth Field

The depth field of PointTexutre node is simply a set of points in a 'discretized enclosing cube'. We assume the bottom plane to be the plane of projection. Given the m*n*l dimension grids for a model, points being the centers of the cells (in octree case, we call them voxels) of this grid, we can consider occupied voxels as 1's and empty voxels as 0's. The resulting set of bits (m*n*l bits) is then organized in a stream of bytes. This is done by traversing voxels in the depth (orthogonal to projection plane) direction by layers of depth 8, and in usual ("column-wise") order in the projection plane (padding, if necessary, the last layer of bytes with zeros in case the depth dimension is not a multiple of 8). Thus, we can think of our set of points as of a stack of 8-bit gray scale images (variant—16-bit images). Correspondence of voxels and bits is illustrated in FIG. 4(a).

For example, in FIG. 4(b), black squares correspond to points on the object. Horizontal plane is the projection plane. Consider the 'slice' of the height 16 (its upper boundary is shown by thick line). Let us interpret the 'columns' as bytes. That is, a column above the point marked in the figure represents the stack of 2 bytes with values 18 and 1 (or a 16-bit unsigned integer 274). If we apply the best available PPM-based compression methods to the union of bytes obtained this way, quite good results are obtained. However, if a simple 1-context method is directly applied here (no orthogonal invariance or hierarchical contexts can be used here, of course), this results in slightly lower degree of compression. Below we give a table of volumes required for different types of LDI geometry representations: BVOC, the above byte array compressed by the best PPM compressor, and the same array compressed by our currently used compressor (figures in Kbytes).

| Model | BVOC representation of geometry | Best PPM compression of byte array | Simple 1-context compression of byte array |
|---|---|---|---|
| "Angel" | 31.4 | 27.5 | 32 |
| "Morton" | 23.4 | 23.3 | 30.5 |
| "Grasshopper" | 16.8 | 17.0 | 19.7 |

3.2.2. Compression of Color Field

The color field of PointTexutre node is a set of colors attributed to points of the object. Unlike octree case, color field is in one-to-one correspondence with depth field. The idea is to represent color information as a single image, which could be compressed by one of the known lossy techniques. Cardinality of this image is much smaller than that of reference images in octree or DepthImage case, and it is a substantial motivation for such an approach. The image can be obtained by scanning depth points in this or that natural order.

Consider first the scanning order dictated by our original storage format for LDI (PointTexture)—'depth-first' scanning of the geometry. Multipixels are scanned in the natural order across the projection plane, as if they were simple pixels, and points inside the same multipixel are scanned in depth direction. This order of scanning produces a 1D array of colors (1st nonzero multipixel, 2nd nonzero multipixel, etc). As soon as depth is known, colors of points can be successively reconstructed from this array. To make image compression methods applicable, we must 1-1 map this long string onto 2D array. This can be done in many ways.

Figure 5:
FIG. 5 is a diagram showing color component of "Angel" model after rearranging its color data.

The approach used in the tests below is so-called "blocky scan", when the color string is arranged in 8*8 blocks, and arrange those blocks in column-wise order ('blocky scan'). The resulting image is shown in FIG. 5.

Compression of this image was performed by several methods, including standard JPEG. It turns out that at least for this type of color scan, far better results are obtained when using texture compression method. This method is based on adaptive local palletizing of each 8*8 block. It has two modes; 8- and 12-times compression (as compared to 'raw' true-color 24-bit per pixel BMP-format). Success of this method in this type of images can be explained exactly from its palette character, which allows us to account for sharp (even non edge-like!) local color variations, arising from 'mixing' the points from front and back surfaces (which can differ greatly, as in case of "Angel"). The aim of searching for optimal scan is to reduce these variations as much as possible.

3.3 Test Results

Examples of models in the original and compressed formats are shown in Annex 3. Quality of some models (e.g., Angel) is still not quite satisfactory after compression, while others are very good ('Grasshopper'). However, we feel that this problem can be solved with the aid of proper scanning. Potentially, even 12-times compression mode could be used, so the overall compression increases still more. Finally, the lossless compression will be improved so as to approach the best PPM-based results in geometry compression.

Here, we give a table of compression ratios.

| Model | Ratio for the best PPM method | Ratio for simple 1-context method |
|---|---|---|
| "Angel" | 7.1 | 6.7 |
| "Morton" | 7.5 | 6.7 |
| "Grasshopper" | 7.8 | 7.4 |

4. Conclusion

In this document, the result of the core experiment on Depth Image-based Representation, AFX A8.3, is reported. The DIBR stream has been introduced, which are linked through url fields of DIBR nodes. These streams consist of all the items in the DIBR node together with a flag for each item to make it optional. Also, the compression of octree and PointTexture data are investigated.

Annex 1. Geometric meaning of the context orthogonal invariance in BVO compression algorithm.

Figure 6:
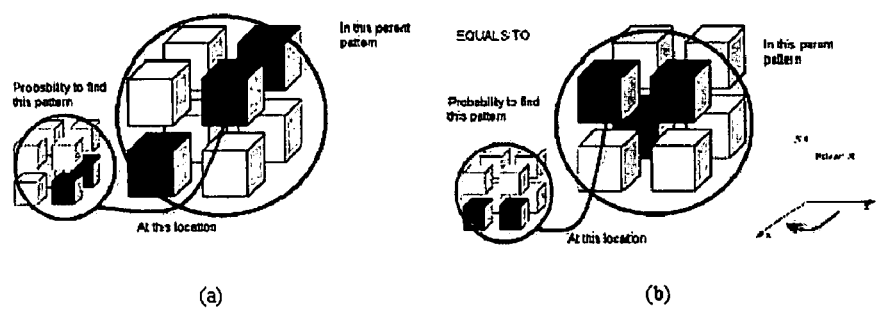
FIG. 6 is a diagram showing the orthogonal in variance of node occurrence probability: (a) shows the original current and parent node, and (b) shows the current and parent node, rotated around y axis by 90 degrees.

Assumption of orthogonal invariance is illustrated in FIG. 6. Consider rotation about the vertical axis by 90 degrees clockwise. Consider the arbitrary filling patterns of the node and its parent before (top picture), and after rotation (bottom picture). Then, two different patterns can be treated as same pattern.

Annex 2. Groups and Transforms.

1. 32 fixed orthogonal transforms.

Each transform is specified by a 5-bit word. Combination of bits is composition of the following basic transforms (i.e., if k-th bit is 1, the corresponding transform is performed)

1 st bit—swap x and y coordinates;
2nd bit—swap y and z coordinates;
3rd bit—symmetry in (y-z) plane;
4th bit—symmetry in (x-z) plane;
5th bit—symmetry in (x-y) plane;

2. 27 Groups.

For each group, here's the order of the group and number of nonzero bits in its elements: NumberOfGroup, QuantityOfGroup and NumberOfFillBits(SetVoxels).

| Group | Group order (number of elements) | # (nonzero bits in each element of the group) |
|---|---|---|
| 0 | 1 | 0 |
| 1 | 8 | 1 |
| 2 | 8 | 2 |
| 3 | 4 | 2 |
| 4 | 12 | 2 |
| 5 | 24 | 3 |
| 6 | 6 | 4 |
| 7 | 8 | 3 |
| 8 | 8 | 4 |
| 9 | 4 | 2 |
| 10 | 24 | 3 |
| 11 | 16 | 4 |
| 12 | 8 | 4 |
| 13 | 24 | 4 |
| 14 | 24 | 5 |
| 15 | 4 | 4 |
| 16 | 16 | 5 |
| 17 | 8 | 6 |
| 18 | 2 | 4 |
| 19 | 8 | 5 |
| 20 | 4 | 6 |
| 21 | 2 | 4 |
| 22 | 8 | 5 |
| 23 | 12 | 6 |
| 24 | 4 | 6 |
| 25 | 8 | 7 |
| 26 | 1 | 8 |

3. Symbols and Transforms.

For each symbol (s), here is the index of the group (g) it belongs to and value of the transform (t) taking it into the 'standard' element of the group.

Binary number of symbol maps to the voxel binary coordinates as follows: i-th bit of the number has binary coordinates x=i&1, y=i&(1<<1), z=i&(1<<2).

| s | 0  | 1  | 2  | 3  | 4  | 5  | 6  | 7  | 8  | 9  | 10 | 11 | 12 | 13 | 14 |
|---|----|----|----|----|----|----|----|----|----|----|----|----|----|----|----|
| g | 0  | 1  | 1  | 2  | 1  | 3  | 4  | 5  | 1  | 4  | 3  | 5  | 2  | 5  | 5  |
| t | 0  | 0  | 4  | 0  | 8  | 0  | 0  | 0  | 12 | 4  | 4  | 4  | 8  | 8  | 12 |
| s | 15 | 16 | 17 | 18 | 19 | 20 | 21 | 22 | 23 | 24 | 25 | 26 | 27 | 28 | 29 |
| g | 6  | 1  | 2  | 4  | 5  | 4  | 5  | 7  | 8  | 9  | 10 | 10 | 11 | 10 | 12 |
| t | 0  | 16 | 2  | 1  | 1  | 2  | 2  | 0  | 0  | 0  | 0  | 5  | 0  | 10 | 0  |

| s | 241 | 242 | 243 | 244 | 245 | 246 | 247 | 248 | 249 | 250 | 251 | 252 | 253 | 254 | 255 |
|---|-----|-----|-----|-----|-----|-----|-----|-----|-----|-----|-----|-----|-----|-----|-----|
| g | 14  | 14  | 17  | 14  | 20  | 23  | 25  | 14  | 23  | 20  | 25  | 17  | 25  | 25  | 26  |
| t | 16  | 20  | 16  | 24  | 16  | 16  | 16  | 28  | 20  | 20  | 20  | 24  | 24  | 28  | 0   |

Annex 3. PointTexture Compression Screenshots.

Figure 7:
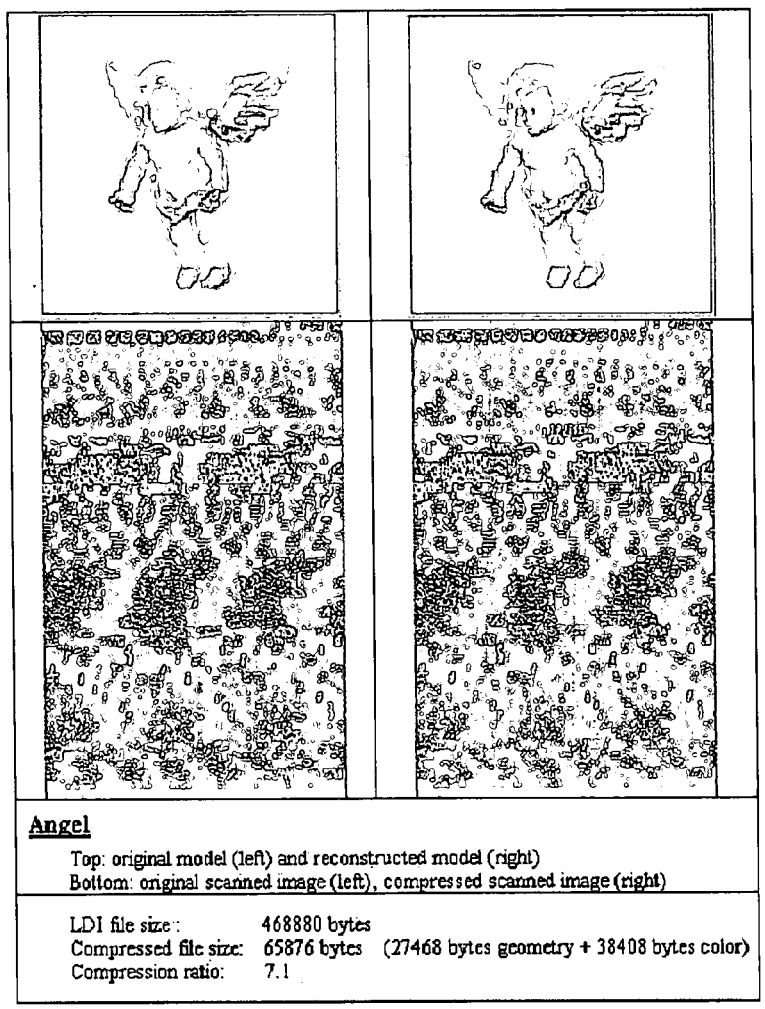
FIGS. 7, 8, and 9 are geometry compression figures for the best PPM-based method.
Figure 8:
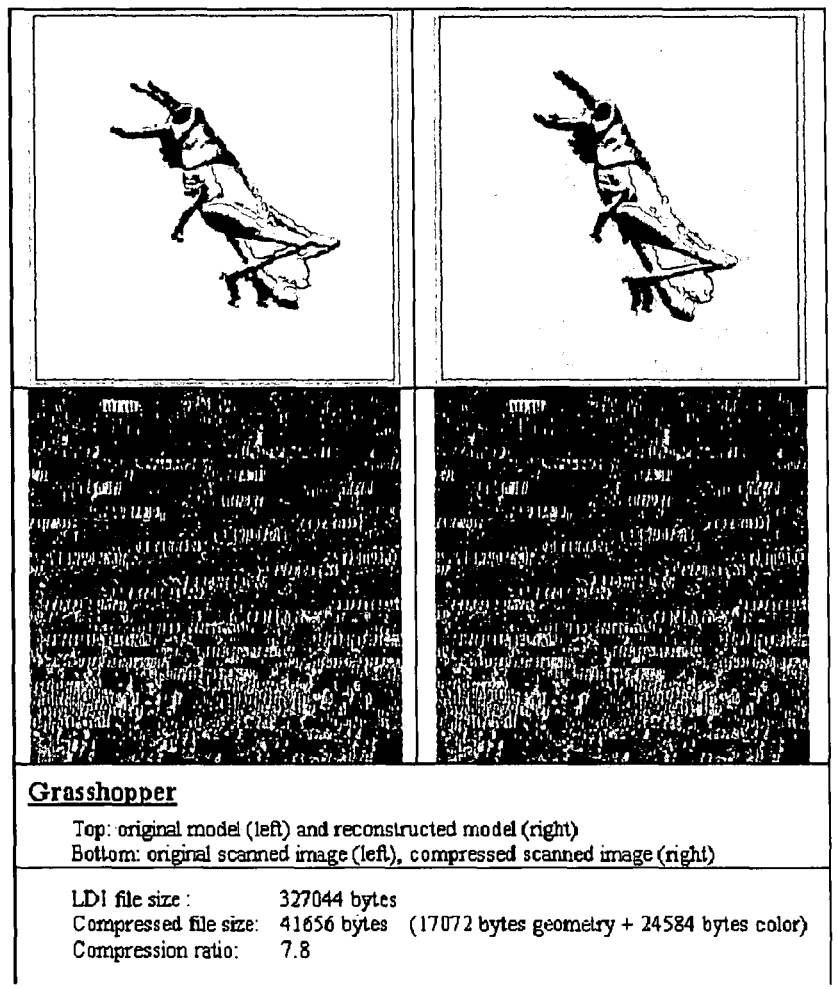
Figure 9:
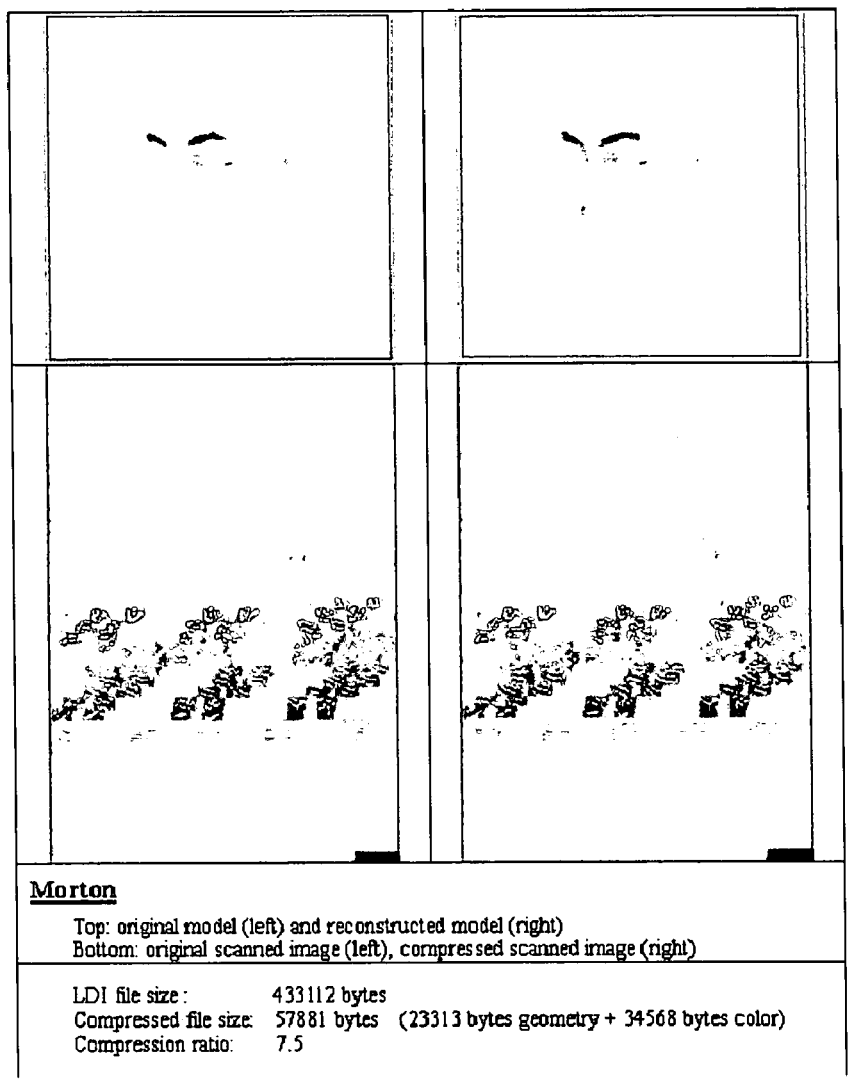

In FIGS. 7, 8, and 9, Geometry compression figures are given for the best PPM-based method.

III. Result of Core Experiment on Depth Image-Based Representation (AFX A8.3)

1. Introduction

In this document, the result of the core experiment on Depth Image-based Representation (DIBR), AFX A8.3, is reported. This core experiment is for the depth image-based representation nodes that uses textures with depth information. The nodes have been accepted and included in a proposal for Committee Draft during Pattaya meeting. However, the streaming of this information through OctreeImage node and DepthImage node still remained ongoing. This document describes the streaming format to be linked by these nodes. The streaming format includes the compression of octree field of OctreeImage node and depth/color fields of PointTexture node.

2. Compression of DIBR Formats

We describe here a novel technique for efficient lossless compression of linkless octree data structure, allowing a reduction in the volume of this already compact representation about 1.5-2 times in our experiments. We also suggest several techniques for lossless and lossy compression of the PointTexture format, using intermediate voxel representation in combination with entropy coding and specialized block-based texture compression method.

2.1. OctreeImage Compression

The fields of octreeimages and octree in OctreeImage are compressed separately. The described methods have been developed, based on the notion that octree field must be compressed losslessly while some degree of visually acceptable distortion allowed for octreeimages. Octreeimages field are compressed by means of MPEG-4 image compression (for static model), or video compression tools (for animated model).

2.1.1. Octree Field Compression

Octree compression is the most important part of the OctreeImage compression, since it deals with compression of already very compact linkless binary tree representation. However, in our experiments, the method explained below reduced the volume of this structure to about half of the original. In the animated OctreeImage version, Octree field is compressed separately for each 3D frame.

2.1.1.1. Context Model

Compression is performed by a variant of adaptive arithmetic coding (implemented as 'range encoder') that makes explicit use of the geometric nature of the data. The Octree is a stream of bytes. Each byte represents a node (i.e., subcube) of the tree, in which its bits indicate the occupancy of the subcube after internal subdivision. The bit pattern is called filling pattern of the node. The described compression algorithm processes bytes one by one, in the following manner.

A context for the current byte is determined.

'probability' (normalized frequency) of occurrence of the current byte in this context is retrieved from the 'probability table' (PT) corresponding to the context.

The probability value is fed to the range encoder.

Current PT is updated by adding 1 to the frequency of the current byte occurrence in the current context (and, if necessary, renormalized afterwards, see details below).

Thus, coding is the process of constructing and updating the PTs according to the context model. In the context-based adaptive arithmetic coding schemes (such as 'Prediction with Partial Matching'), context of a symbol is usually a string of several preceding symbols. However, in our case, compression efficiency is increased by exploiting the octree structure and geometric nature of the data. The described approach is based on the two ideas that are apparently new in the problem of octree compression.

A. For the current node, the context is either its parent node, or the pair {parent node, current node position in the parent node};

B. It is assumed that 'probability' of the given node occurrence at the particular geometric location in the particular parent node is invariant with respect to a certain set of orthogonal (such as rotations or symmetries) transforms.

Assumption 'B' is illustrated in the FIG. 6, for the transform R, which is the rotation by −90° on the x-z plane. The basic notion behind 'B' is the observation that probability of occurrence of a particular type of child node in a particular type of parent node should depend only on their relative position. This assumption is confirmed in our experiments, by analysis of probability tables. It allows us to use more complex context without having too many probability tables. This, in turn, helps to achieve quite good results in terms of data size and speed. Note that the more contexts are used, the sharper is the estimated probability, and thus the more compact is the code.

Let us introduce the set of transforms for which we will assume the invariance of probability distributions. In order to apply in our situation, such transforms should preserve the enclosing cube. Consider a set G of the orthogonal transforms in Euclidean space, which are obtained by all compositions in any number and order of the 3 basis transforms (generators) $m_1$, $m_2$, and $m_3$, given by $$m_1 = \begin{pmatrix} 0 & 1 & 0 \\ 1 & 0 & 0 \\ 0 & 0 & 1 \end{pmatrix}, m_2 = \begin{pmatrix} 1 & 0 & 0 \\ 0 & 0 & 1 \\ 0 & 1 & 0 \end{pmatrix}, m_3 = \begin{pmatrix} -1 & 0 & 0 \\ 0 & 1 & 0 \\ 0 & 0 & 1 \end{pmatrix}$$

where, $m_1$ and $m_2$ are reflections to the planes x=y and y=z, respectively, and $m_3$ is reflection to the plane x=0. One of the classical results of the theory of groups generated by reflections states that G contains 48 distinct orthogonal transforms, and is, in a sense, the maximal group of orthogonal transforms that take the cube into itself (so-called Coxeter group). For example, rotation R in FIG. 6 is expressed through the generators as $$R = m_3 \cdot m_2 \cdot m_1 \cdot m_2$$

where '·' is matrix multiplication.

Transform from G, applied to an octree node, produces a node with different filling pattern of subcubes. This allows us to categorize the nodes according to the filling pattern of their subcubes. Using the group theory language, we say that G acts on the set of all filling patterns of the octree nodes. Computations show that there exist 22 distinct classes (also called orbits in group theory), in which, by definition, two nodes belong to the same class, if and only if they are connected by a transform from G. Number of elements in a class varies from 1 to 24, and is always a divisor of 48.

The practical consequence of 'B' is that the probability table depends not on the parent node itself, but only on the class to which the parent node belongs. Note that there would be 256 tables for a parent-based context and additional 256×8=2048 tables for parent-and-child position-based context in former case, while we need only 22 tables for parent-class-based context plus 22×8=176 tables in latter case. Therefore, it is possible to use equivalently complex context with relatively small number of probability tables. The constructed PT would have the form as shown in Table 2.

TABLE 2

Enumeration of probability tables.

| ID of PTs | 0 | 1 | ... | 255 | Context description |
|---|---|---|---|---|---|
| 0 | P0,0 | P0,1 | ... | P0,255 | 0-Context: Context independent |
| 1..22 (22) | Pi,0 | Pi,1 | ... | Pi,255 | 1-Context: {parent node class} |
| 23...198 (176) | Pj,0 | Pj,1 | ... | Pj,255 | 2-Context: {parent node class, current node position} |

2.1.1.2. Encoding Process

To make the statistics for probability tables more accurate, it is collected in different ways at three stages of encoding process.

At the first stage we do not use contexts at all, accepting the '0-context model', and keep a single probability table with 256 entries, starting from the uniform distribution;

As soon as the first 512 nodes (it is an empirically found number) are encoded, we switch to the '1-context model' using parent node as a context. At the switching moment, the 0-context PT is copied to the PTs for all 22 contexts.

After 2048 nodes (another heuristic value) are encoded, we switch to '2-context model'. At this moment, the 1-context PTs of the parent patterns are copied to the PTs for each position in the same parent pattern.

Key point of the algorithm is the determination of context and probability for the current byte. This is implemented as follows. In each class we fix a single element, which is called 'standard element'. We store a class map table (CMT) indicating the class to which each of the possible 256 nodes belongs, and the precomputed transform from G that takes this particular node into the standard element of its class. Thus, in order to determine the probability of the current node N, we perform the following steps:

Look at the parent P of the current node;
Retrieve the class from CMT, to which P belongs, and the transform T that takes P into the standard node of the class. Let the class number be c;
Apply T to P, and find the child position p in standard node to which current node N is mapped;
Apply T to N. Then, newly obtained filling pattern TN is at the position p in the standard node of the class c.
Retrieve the required probability from the entry TN of the probability table corresponding to the class-position combination (c, p).

For the 1-context model, the above steps are modified in an obvious way. Needless to say, all the transforms are precomputed, and implemented in a lookup table.

Note that at the stage of decoding of the node N its parent P is already decoded, and hence transform T is known. All the steps at the stage of decoding are absolutely similar to the corresponding encoding steps.

Finally, let us outline the probability update process. Let P be a probability table for some context. Denote P(N) the entry of P corresponding to the probability of occurrence of the node N in this context. In our implementation, P(N) is an integer, and after each occurrence of N, P(N) is updated as:

$$P(N) = P(N) + A,$$

where A is an integer increment parameter varying typically from 1 to 4 for different context models. Let S(P) be the sum of all entries in P. Then the 'probability' of N that is fed to the arithmetic coder (range coder in our case) is computed as P(N)/S(P). As soon as S(P) reaches a threshold value $2^{16}$, all the entries are renormalized: in order to avoid occurrence of zero values in P, entries equal to 1 are left intact, while the others are divided by 2.

2.2. PointTexture Compression

The PointTexture node contains two fields to be compressed, that is, depth and color. The main difficulties with PointTexture data compression are due to the following requirements:

Geometry must be compressed in a lossless fashion, since distortions in this type of geometry representation are often highly noticeable.

Color information has no natural 2D structure, and thus image compression techniques are not immediately applicable.

In this section we suggest three methods for PointTexture model compression:

Lossless method for the standard node representation.
Lossless method for lower resolution node representation.
Lossless geometry and lossy color compression for lower resolution node representation.

The methods correspond to three levels of 'fidelity' of the object description. First method assumes that we must store the depth information up to its original 32 bits precision. However, in practice, the depth information can be often quantized by much smaller number of bits without loss of quality. In particular, when the PointTexture model is converted from polygonal model, the quantization resolution is chosen according to actual size of visible details the original model possesses, as well as to the desirable output screen resolution. In this case 8-11 bits may well satisfy the requirements, and depth values are initially stored in this lower resolution format. Now, our second method deals with lossless compression of this 'lower resolution' representation. The key observation here is that for such a relatively small (compared to standard 32) number of bits, an intermediate voxel representation of the model can be used, and allows us to compress the depth field substantially without loss of information. Color information in both cases is losslessly compressed and stored in a PNG format, after arranging the color data as an auxiliary 2D image.

Finally, the third method allows us to achieve much higher compression, combining lossless compression of the geometry with lossy compression of the color data. The latter is performed by a specialized block-based texture compression technique. In the following three subsections the methods are described in full detail.

2.1.1. Lossless PointTexture Compression for the Standard Node Representation

This is simple lossless coding method, which works as follows.
  depth field is compressed by the adaptive range coder, similar to the one used in Octree field compression. For this format, we use a version in which probability table is kept for each of 1-symbol contexts, and context is simply the previous byte. Therefore, 256 PTs are used. The depth field is considered as a stream of bytes, and geometrical structure is not used explicitly.
  color field is compressed after conversion to a planar true color image.

Colors of the points in the PointTexture model are first written in temporary 1D array, in the same order as depth values in depth field. If the total number of points in the model is L, then we compute the smallest integer l such that $l \cdot l \geq L$, and 'wrap' this long 'string' of color values into the square image with side l (if necessary, padding by black pixels). This image is then compressed by one of the MPEG-4 lossless image compression tools. In our approach, we used a Portable Network Graphics (PNG) format. Image obtained in this way from the 'Angel' model is shown in FIG. 10(a).

2.2.2. Lossless PointTexture Compression for the Lower Resolution Node Representation In many cases 16-bit resolution for depth information is exceedingly fine. In fact, resolution in depth should correspond to resolution of the screen on which the model is to be visualized. In situations where small variations in model depth at different points lead to displacement in the screen plane much smaller than pixel size, it is reasonable to use lower resolution in depth, and models are often represented in the format where depth values occupy 8-11 bits. Such models are usually obtained from other formats, e.g., polygonal model, by discretizing the depth and color values on the proper spatial grid.

Such a reduced resolution representation can itself be considered as a compressed form of standard model with 32-bit depth. However, there exists more compact representation for such models, using the intermediate voxel space. Indeed, points of the model can be assumed to belong to nodes of uniform spatial grid with spacing determined by discretization step. We can always assume that the grid is uniform and orthogonal, since in case of perspective model we can work in parametric space. Using this observation, depth and color fields of lower resolution PointTexture are compressed as follows.
  color field is compressed by a lossless image compression technique, as in the previous method;
  depth field is first transformed into voxel representation, and then compressed by the variant of range coder described in the previous subsection.

Figure 4:
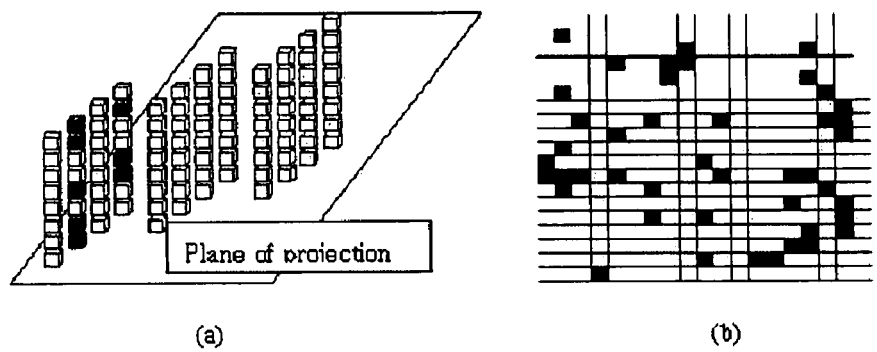
FIG. 4 is a diagram of examples of Layered depth image (LDI): (a) shows projection of the object, where dark cells (voxels) correspond to 1's and white cells to 0's, and (b) shows a 2D section in (x, depth)

Intermediate voxel model is constructed as follows. According to the depth resolution s of the model, consider the discrete voxel space of the size width×height×$2^s$ ('width' and 'height' parameters are explained in PointTexture specification). For our purposes, we don't need to work with a potentially huge voxel space as a whole, but only with its 'thin' cross-sections. Denote (r, c) the row-column coordinates in the projection plane, and let d be depth coordinate. We transform 'slices' {c=const}, i.e., cross-sections of the model by 'vertical planes', into the voxel representation. Scanning the slice along the 'columns' parallel to the projection plane, we set voxel (r, c, d) to 'black' if and only if there exists a point of the model with depth value d that projects into (r, c). The process is illustrated in FIG. 4.

As soon as the slice is constructed, it is compressed by the 1-context range coder, and compression of the next slice begins. In this way, we avoid working with very large arrays. Probability tables are not initialized for each new slice. For a wide range of models only a tiny fraction of voxels are black, and this allows us to achieve rather high compression ratio. Decompression is performed by obvious inversion of the described operations.

Comparison of the depth field compression by this method and by the octree representation will be described. Overall compression ratio of the model is determined, however, by the color field, since such an irregular image cannot be strongly compressed without distortions. In the next subsection we consider a combination of lossless geometry and lossy color compression technique.

2.2.3. Lossless Geometry and Lossy Color Compression for Lower Resolution PointTexture Representation Like the previous one, this method transforms the depth field into the voxel representation, which is then compressed by adaptive 1-context range coder. color field is also mapped onto the 2D image. However, we make an attempt to organize the mapping so that points that are close in 3D space map into nearby points in 2D image plane. Then a specialized texture compression method (adaptive block partitions, ABP) is applied to the resulting image. Main steps of the algorithm are as follows.
  1. Transform a 'slice' of four successive 'vertical planes' of the PointTexture model into voxel representation
  2. Scan the obtained width×4×$2^s$ voxel array by:
      Traversing the vertical 'plane' of 4×4×4 voxel subcubes along the 'columns' parallel to the projection plane: first the column closest to the projection plane, then the next closest column, etc (i.e., in usual 2D array traversal order).
      Traversing voxels inside each 4×4×4 subcube in the order analogous to the one used in OctreeImage nodes subcubes traversal.
  3. Write the colors of points of the model encountered in this traversal order, into an auxiliary 1 D array;

4. Rearrange the obtained array of colors into a 2D image, so that:
5. Consecutive 64 color samples are arranged, column-wise, into 8-by-8 pixel block, next 64 samples arranged into adjacent 8-by-8 pixel block, and so on.
6. Compress the obtained image by the ABP technique.

This method of scanning 3D array and mapping the result onto the 2D image was chosen from the following considerations. Note that 4×4×4 subcubes and 8×8 image blocks contain the same number of samples. If several successively scanned subcubes contain enough color samples to fill the 8×8 block, it is highly probable that this block will be rather uniform and thus distortion will be hardly noticeable on the 3D model after decompression. ABP algorithm compresses 8×8 blocks independently of one another, with the aid of local palletizing. In our tests, distortion introduced by ABP compression in the final 3D model was drastically smaller than that of JPEG. Another reason for choosing this algorithm was the great speed of decompression (for which it was originally designed). Compression ratio can take two values, 8 and 12. In the PointTexture compression algorithm we fix compression ratio 8.

Unfortunately, this algorithm is not universally applicable. Although the image obtained this way from the color field, shown in FIG. 10(b), is much more uniform than for the 'natural' scanning order, sometimes 2D 8×8 blocks may contain color samples corresponding to distant points in 3D space. In this case lossy ABP method may 'mix' colors form distant parts of the model, which leads to local but noticeable distortion after decompression.

However, for many models the algorithm works fine. In FIG. 11, we show the 'bad' case ('Angel' model) and the 'good' case ('Morton256' model). Reduction of the model volume in both cases is about 7 times.

3. Test Results

In this section we compare the results of compression of two models, 'Angel' and 'Morton256', in two different formats—OctreeImage and PointTexture. Dimensions of reference images for each model were 256×256 pixels.

3.1. PointTexture Compression

In Table 3~Table 5, the results of different compression methods are given. Models for this experiment were obtained from models with 8-bit depth field. Depth values were expanded over the $(1,2^{30})$ range by using quantization step $2^{21}+1$, so as to make bits distribution in 32-bit depth values more uniform, imitating to some extent 'true' 32-bit values.

High compression ratios are not to be expected from this method. Volume reduction is of the same order as for typical lossless compression of true color images. Compressed depth and color fields are of quite comparable size, since geometric nature of the data is not captured by this approach.

Now let us look how much the same models can be losslessly compressed when taken at their 'true' depth resolution. Unlike the previous case, depth field is losslessly compressed about 5-6 times. This is due to the intermediate voxel representation that makes the geometric data redundancy much more pronounced—indeed, only a small fraction of voxels are black. However, since uncompressed size of the models is smaller than for 32-bit case, color field compression ratio now determines the overall compression ratio, which is even smaller than for 32-bit case (although the output files are also smaller). So, it is desirable to be able to compress color field at least as good as depth field.

Our third method uses lossy compression technique called ABP [6] for this purpose. This method gives much higher compression. However, like all the lossy compression techniques, it may lead to unpleasant artifacts in some cases. An example of an object for which this happens is 'Angel' model. In process of scanning the points of the model, spatially distant points do sometimes drop into the same 2D image block. Colors at distant points of this model can differ very much, and local palletizing cannot provide accurate approximation if there are too many different colors in a block. On the other hand, it is local palletizing that allows us to accurately compress a vast majority of the blocks, for which distortion introduced by, say, standard JPEG becomes absolutely unbearable after the reconstructed colors are put back at their 3D locations. However, visual quality of 'Morton256' model compressed by the same method is excellent, and this was the case for most of the models in our experiments.

TABLE 3

Lossless PointTexture compression for the 32-bit depth field (In Bytes).

| Model | | depth field | color field | Total size | Compression ratio | | |
|---|---|---|---|---|---|---|---|
| | | | | | Depth | Color | Total |
| "Morton256" | Original | 691,032 | 321,666 | 1,012,698 | 3.1 | 1.2 | 2.0 |
| | Compressed | 226,385 | 270,597 | 424,562 | | | |
| "Angel" | Original | 665,488 | 302,508 | 967,996 | 3.3 | 1.2 | 2.1 |
| | Compressed | 204,364 | 262,209 | 466,604 | | | |

TABLE 4

Lossless PointTexture compression for the lower resolution node representation (In Bytes).

| Model | | depth field | color field | Total size | Compression ratio | | |
|---|---|---|---|---|---|---|---|
| | | | | | Depth | Color | Total |
| "Morton256" | Original | 172,758 | 321,666 | 494,424 | 5.4 | 1.2 | 1.63 |
| | Compressed | 31,979 | 270,597 | 302,576 | | | |

TABLE 4-continued

Lossless PointTexture compression for
the lower resolution node representation
(In Bytes).

| Model | | depth field | color field | Total size | Compression ratio Depth | Color | Total |
|---|---|---|---|---|---|---|---|
| "Angel" | Original | 166,372 | 302,508 | 468,880 | 5.2 | 1.2 | 1.6 |
| | Compressed | 32,047 | 262,209 | 294,256 | | | |

TABLE 5

Lossless geometry and lossy color compression for
lower resolution PointTexture
(In Bytes).

| Model | | depth field | color field | Total size | Compression ratio Depth | Color | Total |
|---|---|---|---|---|---|---|---|
| "Morton256" | Original | 172,758 | 321,666 | 494,424 | 5.4 | 8.0 | 6.8 |
| | Compressed | 31,979 | 40,352 | 72,331 | | | |
| "Angel" | Original | 166,372 | 302,508 | 468,880 | 5.2 | 7.9 | 6.7 |
| | Compressed | 32,047 | 38,408 | 70,455 | | | |

3.2. OctreeImage Compression

The Table 6 presents sizes of compressed and uncompressed octree components for our two test models. We see that reduction of this field is about 1.6-1.9 times.

However, compared to uncompressed PointTexture models, even with 8-bit depth field, OctreeImage is much more compact. The Table 7 shows compression ratios 7.2 and 11.2. This is more than PointTextures can be compressed without converting to OctreeImage (6.7 and 6.8 times, respectively). However, as we already mentioned, OctreeImage may contain incomplete color information, which is the case with 'Angel' model. In such cases 3D interpolation of colors is used.

To sum up, we can conclude that the experiments presented above prove the efficiency of the developed compression tools. Choice of the best tool for given model depends on its geometrical complexity, character of color distribution, required speed of rendering and other factors.

TABLE 6

Compression ratios given by the
method described in 4.1.2, for OctreeImage
models and their components
(file sizes rounded to Kbytes).

| Model | Octree size | Compressed Octree size | Compression ratio |
|---|---|---|---|
| "Angel" | 50 | 31 | 1.6 |
| "Morton256" | 41 | 22 | 1.9 |

TABLE 7

Noncompressed PointTexture
(8-bit depth field), and compressed
OctreeImage representations for the
same models (file sizes rounded to Kbytes).

| Model | PointTexture | Compressed OctreeImage | Compression ratio |
|---|---|---|---|
| "Angel" | 469 | 65 | 7.2 |
| "Morton256" | 494 | 44 | 11.2 |

5. Comments on Study of ISO/IEC 14496-1/PDAM4

After applying following revisions to Study of ISO/IEC 14496-1/PDAM4 (N4627), the revised Study of ISO/IEC 14496-1/PDAM4 should be incorporated into ISO/IEC 14496-1/FPDAM4.

Clause 6.5.3.1.1, Technical

Problem: The default value of orthographic should be the most generally used value.
Solution: replace the default value of orthographic field from "FALSE" to "TRUE" as follows.
Proposed revision:
 field SFBool orthographic TRUE Clause 6.5.3.1.1, Technical Problem: The streaming of DIBR shall be done with the uniform streaming method for AFX.
Solution: Remove the depthImageUrl field from DepthImage node.
Proposed revision:

```
DepthImage {
   field    SFVec3f      position       0 0 10
   field    SFRotation   orientation    0 0 1 0
   field    SFVec2f      fieldOfView    0.785398   0.785398
```

-continued

| field | SFFloat | nearPlane | 10 |
| field | SFFloat | farPlane | 100 |
| field | SFBool | orthographic | TRUE |
| field | SFNode | diTexture | NULL |

}

Clause 6.5.3.1.2, Editorial

Problem: The term 'normalized' is misleading, as applied to the depth field in current context.
Solution: In 5th paragraph, change 'normalized' to 'scaled'.
Proposed revision:
The nearPlane and farPlane fields specify the distances from the viewpoint to the near plane and far plane of the visibility area. The texture and depth data shows the area closed by the near plane, far plane and the fieldOfView. The depth data are scaled to the distance from nearPlane to farPlane.

Clause 6.5.3.1.2, Technical

Problem: The streaming of DIBR shall be done with the uniform streaming method for AFX.
Solution: Remove the explanation of depthImageUrl field (the 7th paragraph and below).
Proposed revision:

Clause 6.5.3.2.2, Editorial

Problem: The semantics of the depth field is incompletely specified.
Solution: Change the depth field specification in the 3rd paragraph as follows.
Proposed revision:
The depth field specifies the depth for each pixel in the texture field. The size of the depth map shall be the same size as the image or movie in the texture field. Depth field shall be one of the various types of texture nodes (ImageTexture, MovieTexture or PixelTexture), where only the nodes representing gray scale images are allowed. If the depth field is unspecified, the alpha channel in the texture field shall be used as the depth map. If the depth map is not specified through depth field or alpha channel, the result is undefined.
Depth field allows us to compute the actual distance of the 3D points of the model to the plane which passes through the viewpoint and parallel to the near plane and far plane:

$$dist = nearPlane + \left(1 - \frac{d-1}{d_{max}-1}\right)(farPlane - nearPlane),$$

where d is depth value and $d_{max}$ is maximum allowable depth value. It is assumed that for the points of the model, d>0, where d=1 corresponds to far plane, $d=d_{max}$ corresponds to near plane.
This formula is valid for both perspective and orthographic case, since d is distance between the point and the plane. $d_{max}$ is the largest d value that can be represented by the bits used for each pixel:
  (1) If the depth is specified through depth field, then depth value d equals to the gray scale.
  (2) If the depth is specified through alpha channel in the image defined via texture field, then the depth value d is equal to alpha channel value.

The depth value is also used to indicate which points belong to the model: only the point for which d is nonzero belong to the model.
For animated DepthImage-based model, only DepthImage with SimpleTextures as diTextures are used.
Each of the Simple Textures can be animated in one of the following ways:
  (1) depth field is still image satisfying the above condition, texture field is arbitrary MovieTexture
  (2) depth field is arbitrary MovieTexture satisfying the above condition on the depth field, texture field is still image
  (3) both depth and texture are MovieTextures, and depth field satisfies the above condition
  (4) depth field is not used, and the depth information is retrieved from the alpha channel of the MovieTexture that animates the texture field Clause 6.5.3.3.2, Editorial Problem: The semantics of the depth field incompletely specified.
Solution: Replace the depth field specification (3rd paragraph) with the proposed revision.
Proposed revision:
Geometrical meaning of the depth values, and all the conventions on their interpretation adopted for the SimpleTexture, apply here as well.
The depth field specifies a multiple depths of each point in the projection plane, which is assumed to be farPlane (see above) in the order of traversal, which starts from the point in the lower left corner and traverses to the right to finish the horizontal line before moving to the upper line. For each point, the number of depths (pixels) is first stored and that number of depth values shall follow.
Clause 6.5.3.4.1, H.1, Technical
Problem: The field type SFString used for octree field might lead to inconsistent values
Solution: Change the field type for octree field to MFInt32
Proposed revision:
In clause 6.5.3.4.1
field MFInt32 octree

| In clause H.1, table for Octree, change the octree column as follows: | | | | | | | |
|---|---|---|---|---|---|---|---|
| Field name | DEF id | In id | OUT id | DYN id | [m,M] | Q | A |
| octree MFInt32 | 01 | | | | [0,255] | 13,8 | |

Clause 6.5.3.4.1, Technical

Problem: The streaming of DIBR shall be done with the uniform streaming method for AFX.
Solution: Remove the octreeUrl field from OctreeImage node.
Proposed revision:

| OctreeImage { | | | |
| field | SFInt32 | octreeresolution | 256 |
| field | MFInt32 | octree | "" |
| field | MFNode | octreeimages | [] |

}

Clause 6.5.3.4.2, Editorial

Problem: octreeresolution field definition (2nd paragraph) allows misinterpretation.
Solution: Revise the description by adding the word 'allowed'
Proposed revision:
The octreeresolution field specifies maximum allowable number of octree leaves along a side of the enclosing cube. The level of the octree can be determined from octreeresolution using the following equation: octreelevel=int(log2(octreeresolution−1))+1)

Clause 6.5.3.4.2, Technical

Problem: The streaming of DIBR shall be done with the uniform streaming method for AFX.
Solution: Remove the explanation of octreeUrl field (the 5th paragraph and below).
Proposed revision:

Clause 6.5.3.4.2, Editorial

Problem: Animation of the OctreeImage was described incompletely
Solution: Add a paragraph at the end of clause 6.5.3.4.2 describing the OctreeImage animation
Proposed revision:
Animation of the Octreeimage can be performed by the same approach as the first three ways of DepthImage-based animation described above, with the only difference of using octree field instead of the depth field.

Clause H.1, Technical

Problem: The range of depth data in PointTexture node may be too small for future applications. Many graphics tools allow 24 bits or 36 bits depth for their z-buffer. However, depth field in PointTexture has the range of [0, 65535], which is 16 bits.
Solution: In clause H.1, table for PointTexture, change the range of depth column as proposed.
Proposed revision:

| Field name | DEF id | In id | OUT id | DYN id | [m,M] | Q | A |
|---|---|---|---|---|---|---|---|
| Depth | MFInt32 | 10 | | | [0,1] | | |

IV. ISO/IEC JTC 1/SC 29/WG 11 Coding of Moving Pictures and Audio

1. Introduction

In this document, an improvement of OctreeImage in Depth Image-Based Representation (DIBR), AFX A8.3, is described. The OctreeImage node has been accepted and included in a proposal for Committee Draft during Pattaya meeting. However, it has been observed that the rendering quality would be unsatisfactory in some special cases, due to the occlusion of object geometry. This document describes the improved version of the OctreeImage node, i.e., Textured Binary Volumetric Octree (TBVO), as well as its compression method for streaming.

2. Textured Binary Volumetric Octree (TBVO)
2.1. TBVO Overview

The objective of TBVO is to contrive a more flexible representation/compression format with fast visualization, as an improvement of the Binary Volumetric Octree (BVO). This is achieved by storing some additional information on the basis of BVO. BVO-based representation consists of (octree structure+set of reference images), while TBVO-based representation consists of (BVO octree structure+set of reference images+camera indices).

The main BVO visualization problem is that we must determine corresponding camera index of each voxel during rendering. To this end, we need not only project to the cameras, but also make reverse ray casting procedure. We must at least determine the existence of a camera, from which the voxel is visible. Therefore, we must find all the voxels that are projected to a particular camera. But this procedure is very slow if we use brute-force approach. We have developed an algorithm that performs it fast and accurate for majority of object shapes. However, there are still some troubles for voxels that is not visible from any cameras.

A possible solution could be storing explicit color to each voxel. However, in this case, we have experienced some problem in compressing color information. That is, if we group voxel colors as an image format and compress it, the color correlation of neighboring voxels is destroyed such that the compression ratio would be unsatisfactory.

In TBVO, the problem is solved by storing camera (image) index for every voxel. The index is usually same for large group of voxels, and this allows the use of octree structure for economic storage of the additional information. Note that, on the average, only 15% volume increase was observed in the experiments with our models. It's modeling is a little bit more complex, but allows more flexible way of representing objects of any geometry.

Figure 12:
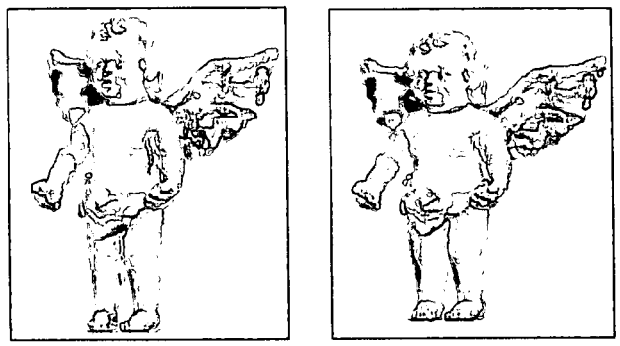
FIG. 12 is a diagram showing a BVO model and a TBVO model of "Angel"
Figure 13:
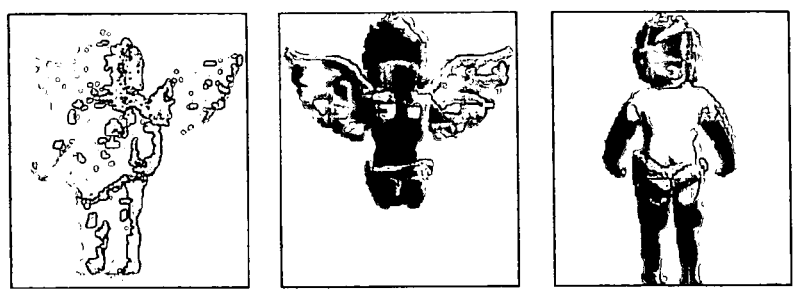
FIG. 13 is a diagram showing additional images taken by additional cameras in TBVO: (a) is a camera index image, (b) is a first additional image, and (c) is a second additional image.

The advantages of TBVO over BVO are that it's rendering is simpler and much faster than BVO's and virtually no restrictions on the object geometry is imposed 2.2. TBVO EXAMPLE In this section, we show a typical example, which illustrates the efficacy and key ingredients of TBVO representation. In FIG. 12(a), a BVO model of "Angel" is shown. Using the usual 6 textures of BVO, a few parts of the body and wing are not observed from any camera, yielding rendered image with a lot of visible 'cracks'. In TBVO representation of the same model, a total of 8 cameras are used (6 faces of a box+2 additional camera). In FIG. 13, (a) is the image of camera index. Different color denotes the different index of camera. Additional cameras are placed inside the cube, watching the front and back face orthographically. In FIG. 13, (b) and (c) are additional Images taken by the additional cameras. As a result, we have obtained a seamless and clear rendering result of the model, as shown in FIG. 12(b).

2.3. Uncompressed TBVO Stream Description

We suppose that 255 cameras are enough, and assign up to 1 byte for the index. The TBVO stream is stream of symbols. Every TBVO-symbol is BVO-symbol or Texture-symbol. Texture-symbol denotes camera index, which could be a specific number or a code of "undefined". Let "undefined" code be '?' for further description.

The TBVO stream is traversed in breadth first order. Let us describe how to write TBVO stream if we have BVO and every leaf voxel has camera number. This must be done in modeling stage. It will traverse all BVO nodes including leaf nodes (which do not have BVO-symbol) in breadth first order. The following pseudo-code will complete writing the stream.

```
If CurNode is not leaf node
{
    Write current BVO-symbol corresponding to this node
}
if all the children have identical camera index (texture-symbol)
{
    if parent of CurNode has '?' camera index
        Write camera index equal for sub-nodes
}
else
{
    Write '?' symbol
}
```

Figure 14:
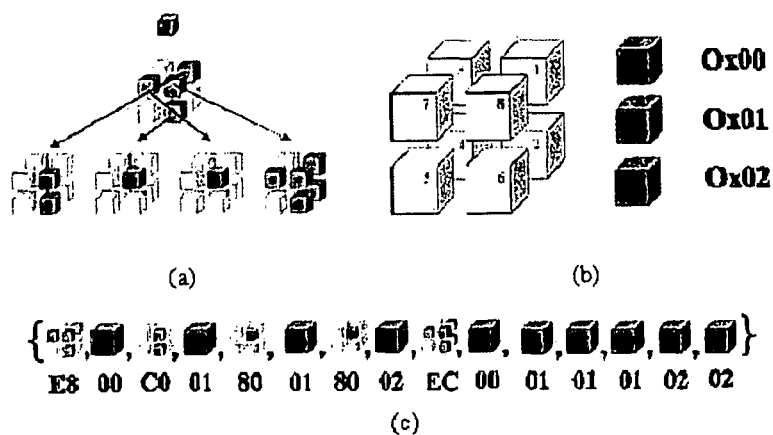
FIG. 14 is a diagram showing an example of writing TBVO stream: (a) shows a TBVO tree structure. Gray color is "undefined" texture symbol. Each color denotes camera index, (b) shows the octree traversal order in a BVO node and camera indices, (c) shows the resultant TBVO stream, in which filled cubes and octree cube denote the texture-bytes and BVO-bytes, respectively.

According to the procedure, for the TBVO tree shown in FIG. 14(*a*), a stream of symbols can be obtained as shown in FIG. 14(*b*). In this example, the texture-symbols are represented in byte. However, in the actual stream, each texture-symbol would only need 2 bits because we only need to represent three values (two cameras and the undefined code).

2.4. TBVO Compression

The fields of octreeimages and octree, in OctreeImage node, are compressed separately. The described methods have been developed, based on the notion that octree field must be compressed losslessly while some degree of visually acceptable distortion is allowed for octreeimages.

2.4.1. Octreeimages Field Compression

Octreeimages field is compressed by means of MPEG-4 image compression (for static model), or video compression tools (for animated model) that are allowed in MPEG-4. In our approach, we used the JPEG format for Octreeimages (after some preprocessing which we call 'minimization' of the JPEG images, retaining for each texture, only the points necessary for 3D visualization; in other words, the parts of given texture that are never used at 3D rendering stage, can be compressed as roughly as we like).

2.4.2 Octree Field Compression

Octree compression is the most important part of the OctreeImage compression, since it deals with compression of already very compact linkless binary tree representation. However, in our experiments, the method explained below reduced the volume of this structure to about half of the original. In the animated OctreeImage version, octree field is compressed separately for each 3D frame.

2.4.2.1. Context Model

Compression is performed by a variant of adaptive arithmetic coding (implemented as 'range encoder') that makes explicit use of the geometric nature of the data. The Octree is a stream of bytes. Each byte represents a node (i.e., subcube) of the tree, in which its bits indicate the occupancy of the subcube after internal subdivision. The bit pattern is called filling pattern of the node. The described compression algorithm processes bytes one by one, in the following manner.

A context for the current byte is determined.
The 'probability' (normalized frequency) of occurrence of the current byte in this context is retrieved from the 'probability table' (PT) corresponding to the context.
The probability value is fed to the range encoder.
Current PT is updated by adding 1 to the frequency of the current byte occurrence in the current context (and, if necessary, renormalized afterwards, see details below).

Thus, coding is the process of constructing and updating the PTs according to the context model. In the context-based adaptive arithmetic coding schemes (such as 'Prediction with Partial Matching'), context of a symbol is usually a string of several preceding symbols. However, in our case, compression efficiency is increased by exploiting the octree structure and geometric nature of the data. The described approach is based on the two ideas that are apparently new in the problem of octree compression.

A. For the current node, the context is either its parent node, or the pair {parent node, current node position in the parent node};

B. It is assumed that 'probability' of the given node occurrence at the particular geometric location in the particular parent node is invariant with respect to a certain set of orthogonal (such as rotations or symmetries) transforms.

Assumption 'B' is illustrated in the FIG. 6, for the transform R, which is the rotation by −90° on the x-z plane. The basic notion behind 'B' is the observation that probability of occurrence of a particular type of child node in a particular type of parent node should depend only on their relative position. This assumption is confirmed in our experiments, by analysis of probability tables. It allows us to use more complex context without having too many probability tables. This, in turn, helps to achieve quite good results in terms of data size and speed. Note that the more contexts are used, the sharper is the estimated probability, and thus the more compact is the code.

Let us introduce the set of transforms for which we will assume the invariance of probability distributions. In order to apply in our situation, such transforms should preserve the enclosing cube. Consider a set G of the orthogonal transforms in Euclidean space, which are obtained by all compositions in any number and order of the 3 basis transforms (generators) $m_1$, $m_2$, and $m_3$, given by $$m_1 = \begin{pmatrix} 0 & 1 & 0 \\ 1 & 0 & 0 \\ 0 & 0 & 1 \end{pmatrix}, m_2 = \begin{pmatrix} 1 & 0 & 0 \\ 0 & 0 & 1 \\ 0 & 1 & 0 \end{pmatrix}, m_3 = \begin{pmatrix} -1 & 0 & 0 \\ 0 & 1 & 0 \\ 0 & 0 & 1 \end{pmatrix}$$

where, $m_1$ and $m_2$ are reflections to the planes x=y and y=z, respectively, and $m_3$ is reflection to the plane x=0. One of the classical results of the theory of groups generated by reflections states that G contains 48 distinct orthogonal transforms, and is, in a sense, the maximal group of orthogonal transforms that take the cube into itself (so-called Coxeter group). For example, rotation R in FIG. 6 is expressed through the generators as $$R = m_3 \cdot m_2 \cdot m_1 \cdot m_2$$

where '·' is matrix multiplication.

Transform from G, applied to an octree node, produces a node with different filling pattern of subcubes. This allows us to categorize the nodes according to the filling pattern of their subcubes. Using the group theory language, we say that G acts on the set of all filling patterns of the octree nodes. Computations show that there exist 22 distinct classes (also called orbits in group theory), in which, by definition, two nodes belong to the same class, if and only if they are connected by a transform from G. Number of elements in a class varies from 1 to 24, and is always a divisor of 48.

The practical consequence of assumption 'B' is that the probability table depends not on the parent node itself, but only on the class to which the parent node belongs. Note that there would be 256 tables for a parent-based context and additional 256×8=2048 tables for parent-and-child position-based context in former case, while we need only 22 tables for parent-class-based context plus 22×8=176 tables in latter case. Therefore, it is possible to use equivalently complex context with relatively small number of probability tables. The constructed PT would have the form as shown in Table 8.

TABLE 8

Enumeration of probability tables.

| ID of PTs | 0 | 1 | ... | 255 | Context description |
|---|---|---|---|---|---|
| 0 | P0,0 | P0,1 | ... | P0,255 | 0-Context: Context independent |
| 1..22 (22) | Pi,0 | Pi,1 | ... | Pi,255 | 1-Context: {parent node class} |
| 23...198 (176) | Pj,0 | Pj,1 | ... | Pj,255 | 2-Context: {parent node class, current node position} |

2.4.2.2. Encoding Process

To make the statistics for probability tables more accurate, it is collected in different ways at three stages of encoding process.

At the first stage we do not use contexts at all, accepting the '0-context model', and keep a single probability table with 256 entries, starting from the uniform distribution;

As soon as the first 512 nodes (it is an empirically found number) are encoded, we switch to the '1-context model' using parent node as a context. At the switching moment, the 0-context PT is copied to the PTs for all 22 contexts.

After next 2048 nodes (another heuristic value) are encoded, we switch to '2-context model'. At this moment, the 1-context PTs of the parent patterns are copied to the PTs for each position in the same parent pattern.

Key point of the algorithm is the determination of context and probability for the current byte. This is implemented as follows. In each class we fix a single element, which is called 'standard element'. We store a class map table (CMT) indicating the class to which each of the possible 256 nodes belongs, and the precomputed transform from G that takes this particular node into the standard element of its class. Thus, in order to determine the probability of the current node N, we perform the following steps:

Look at the parent P of the current node;

Retrieve the class from CMT, to which P belongs, and the transform T that takes P into the standard node of the class. Let the class number be c;

Apply T to P, and find the child position p in standard node to which current node N is mapped;

Apply T to N. Then, newly obtained filling pattern TN is at the position p in the standard node of the class c;

Retrieve the required probability from the entry TN of the probability table corresponding to the class-position combination (c, p).

For the 1-context model, the above steps are modified in an obvious way. Needless to say, all the transforms are precomputed, and implemented in a lookup table.

Note that at the stage of decoding of the node N, its parent P is already decoded, and hence transform T is known. All the steps at the stage of decoding are absolutely similar to the corresponding encoding steps.

Finally, let us outline the probability update process. Let P be a probability table for some context. Denote P(N) the entry of P corresponding to the probability of occurrence of the node N in this context. In our implementation, P(N) is an integer, and after each occurrence of N, P(N) is updated as:

$$P(N)=P(N)+A,$$

where A is an integer increment parameter varying typically from 1 to 4 for different context models. Let S(P) be the sum of all entries in P. Then the 'probability' of N that is fed to the arithmetic coder (range coder in our case) is computed as P(N)/S(P). As soon as S(P) reaches a threshold value $2^{16}$, all the entries are renormalized: in order to avoid occurrence of zero values in P, entries equal to 1 are left intact, while the others are divided by 2.

2.4.2.3 Encoding of the 'Camera Nodes'

The stream of symbols determining the texture (camera) numbers for each voxel, is compressed using its own probability table. In the terms used above, it has a single context. PT entries are updated with larger increment than entries for octree nodes; in the rest, there's no difference with node symbols coding.

2.5. Results of TBVO Compression and Rendering

Figure 16:
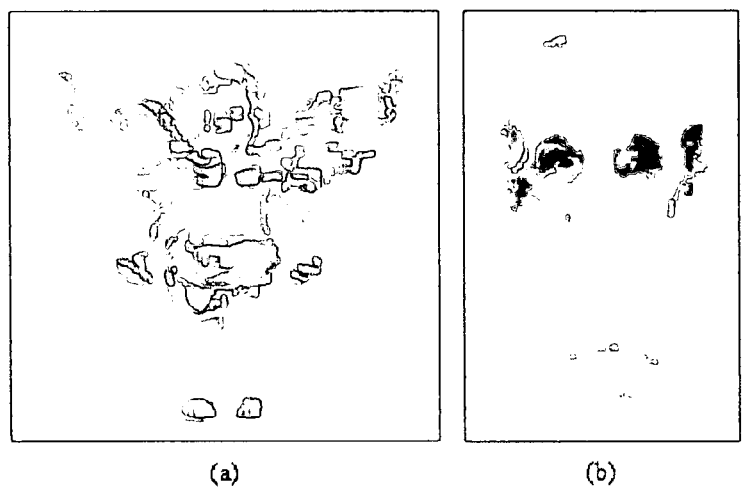
FIG. 16 is a diagram showing peeled images of "Angel" and "Morton" models.

FIGS. 15, 17, 18, and 19 are the results of TBVO compression. In FIG. 16, peeled images of "Angel" and "Morton" models are illustrated. The compressed size is compared with the compressed BVO: in the third column the number in brackets is compressed geometry volume, while the first number is total volume of TBVO-based compressed model (i.e. textures are taken into account). As a measure of visual distortion, PSNR was computed to estimate the color difference after LDI→(T)BVO→LDI transform. Compressed model size is size of all the textures (stored as minimized JPEGs, see 0), plus compressed geometry size. In TBVO case, compressed geometry includes also camera information. The PSNR of TBVO is improved significantly compared with BVO.

TBVO achieves faster rendering than BVO. For the "Angel" model, the frame rate of TBVO-12 is 10.8 fps, while that of BVO is 7.5. For the "Morton" model, TBVO-12 is 3.0 fps, while BVO is 2.1 (on Celeron 850 MHz). On the other hand, it is observed that the rendering is accelerated much further in animated TBVO. For the "Dragon" model, the frame rate of TBVO-12 is 73 fps, while that of BVO is 29 fps (on Pentium IV 1.8 GHz).

A TBVO format provides great flexibility. For example, 2 ways of using 12 cameras are illustrated in FIG. 6—TBVO-12 and TBVO-(6+6). TBVO-12 uses 6 BVO cameras (cube faces) plus 6 images taken from the cube center, and parallel to the faces. (6+6) configuration uses 6 BVO cameras, and then it removes ('peels') all the voxels visible by these cameras and 'photographs' the parts that became visible by the same 6 cameras. Examples of such images are shown in FIG. 16.

Note the drastic difference in quality (subjective and PSNR value) between BVO and TBVO-6 Angel models. Although the same camera locations are used, TBVO allows us to assign camera numbers to all the voxels, even those invisible from all the cameras. These numbers are chosen so as to best match the original colors (i.e. for each point the best color match in all the camera images' is selected, regardless of direct visibility. In the Angel case it gives great result).

Note also the very modest 'geometry' (i.e. BVO+cameras) volume difference between 6 and 12 camera cases. In fact, additional cameras cover, typically, small regions, and thus their identifiers are rare, and their textures are sparse (and well compressed). All this applies not only to 'Angel', but also to 'Morton', 'Palm512', and 'robots512'.

2.6. Node Specification

```
OctreeImage {
    field    SFInt32    octreeresolution    256
    field    MFInt32    octree              []#%q=13,8
    field    MFInt32    cameraID            []#%q=13,8
```

-continued

```
     field    MFNode    octreeimages    □
}
```

The OctreeImage node defines a TBVO structure, in which an octree structure, corresponding camera index array, and a set of octreeimages exist.

The octreeimages field specifies a set of DepthImage nodes with SimpleTexture for diTexture field; depth field in these SimpleTexture nodes is not used. The orthographic field must be TRUE for the DepthImage nodes. For each of SimpleTexture, texture field stores the color information of the object, or part of the object view (for example, its cross-section by a camera plane) as obtained by the orthographic camera whose position and orientation are specified in the corresponding fields of DepthImage. Parts of the object corresponding to each camera are assigned at the stage of model construction. The object partitioning, using the values of position, orientation, and texture fields, is performed so as to minimize the number of cameras (or, equivalently, of the involved octree-images), at the same time to include all the object parts potentially visible from an arbitrary chosen position. The orientation fields must satisfy the condition: camera view vector has only one nonzero component (i.e., is perpendicular to one of the enclosing cube faces). Also, sides of the Simple-Texture image must be parallel to corresponding sides of enclosing cube.

The octree field completely describes object geometry. Geometry is represented as a set of voxels that constitutes the given object. An octree is a tree-like data structure, in which each node is represented by a byte. 1 in ith bit of this byte means that the children nodes exist for the ith child of that internal node; while 0 means that it does not. The order of the octree internal nodes shall be the order of breadth first traversal of the octree. The order of eight children of an internal node is shown in FIG. 14(b). The size of the enclosing cube of the total octree is 1×1×1, and the center of the octree cube shall be the origin (0, 0, 0) of the local coordinate system.

The cameraID field contains an array of camera indices assigned to voxels. At the rendering stage, color attributed to an octree leave is determined by orthographically projecting the leave onto one of the octreeimages with a particular index. The indices are stored in a octree-like fashion: if a particular camera can be used for all the leaves contained in a specific node, the node containing index of the camera is issued into the stream; otherwise, the node containing a fixed 'further subdivision' code is issued, which means that camera index will be specified separately for the child subnodes of the current node (in the same recursive fashion). If the cameraID is empty, then the camera indices are determined during rendering stage (as in BVO case).

The octreeresolution field specifies maximum allowable number of octree leaves along a side of the enclosing cube. The level of the octree can be determined from octreeresolution using the following equation:

$$octreelevel = \lceil \log_2(octreeresolution) \rceil$$

2.7. Bitstream Specification
2.7.1. Octree Compression
2.7.1.1. Overview

The OctreeImage node in Depth Image-Based Representation defines the octree structure and their projected textures. Each texture, stored in the octreeImages array, is defined through DepthImage node with SimpleTexture. The other fields of the OctreeImage node can be compressed by octree compression.

2.7.1.2. Octree
2.7.1.2.1. Syntax

```
class Octree ( )
{
    OctreeHeader ( );
    aligned bit (32)*  next;
    while (next == 0x000001C8)
    {
        aligned bit (32) octree_frame_start_code;
        OctreeFrame(octreeLevel);
        aligned bit (32)* next;
    }
}
```

2.7.1.2.2. Semantics

The compressed stream of the octree contains an octree header and one or more octree frame, each preceded by octree_frame_start_code. The value of the octree_frame_start_code is always 0x000001C8. This value is detected by look-ahead parsing (next) of the stream.

2.7.1.3. OctreeHeader
2.7.1.3.1. Syntax

```
class OctreeHeader ( )
{
    unsigned int (5) octreeResolutionBits;
    unsigned int (octreeResolutionBits) octreeResolution;
    int octreeLevel = ceil(log(octreeResolution)/log(2));
    unsigned int (3) textureNumBits;
    unsigned int (textureNumBits) numOfTextures;
}
```

2.7.1.3.2. Semantics

This class reads the header information for the octree compression.

The octreeResolution, which length is described by octreeResolutionBits, contains the value of octreeResolution field of OctreeImage node. This value is used to derive the octree level.

The numOfTextures, which is textureNumBits long, describes the number of textures (or cameras) used in the OctreeImage node. This value is used for the arithmetic coding of camera ID for each node of the octree. If the value of textureNumBits is 0, then the texture symbols are not coded by setting the curTexture of the root node to 255.

2.7.1.4. OctreeFrame
2.7.1.4. 1. Syntax

```
class OctreeFrame (int octreeLevel)
{
  for (int curLevel=0; curLevel < octreeLevel; curLevel++0
  {
    for (int nodeIndex=0; nodeIndex < nNodesInCurLevel; nodeIndex++)
    {
      int nodeSym = ArithmeticDecodeSymbol (contextID);
      if (curTexture == 0)
      {
        curTexture = ArithmeticDecodeSymbol (textureContextID);
      }
    }
  }
  for (int nodeIndex=0; nodeIndex < nNodesInCurLevel; nodeIndex++)
    if (curTexture == 0)
      curTexture = ArithmeticDecodeSymbol (textureContextID);
}
```

2.7.1.4.2. Semantics

This class reads a single frame of octree in a breadth first traversal order. Starting from 1st node in the level 0, after reading every node in the current level, the number of nodes in the next level is known by counting all the 1's in each node symbol. In the next level, that number of nodes (nNodesInCurLevel) will be read from the stream.

For decoding of each node, an appropriate contextID is given, as described in clause 2.7.1.6.

If the texture (or camera) ID for the current node (curTexture) is not defined by the parent node, then the texture ID is also read from the stream, using the context for texture ID, defined by textureContextID. If a non-zero value is retrieved (the texture ID is defined), then this value will also be applied to all the children nodes in the following levels. After decoding every node, the textureID will be assigned to the leaf nodes of the octree that still have not been assigned the textureID value.

2.7.1.5. Adaptive Arithmetic Decoding

In this section, the adaptive arithmetic coder used in octree compression is described, using the C++ style syntactic description. aa_decode( ) is the function, which decodes a symbol, using a model specified through the array cumul_freq[] and PCT is an array of probability context tables, as described in clause 2.7.1.6.

```
int ArithmeticDecodeSymbol (int contextID)
{
    unsigned int MAXCUM = 1<<13;
    unsigned int TextureMAXCUM = 256;
    int *p, allsym, maxcum;
    if (contextID != textureContextID)
    {
        p = PCT[contextID];
        allsym = 256;
        maxcum = MAXCUM;
    }
    else
    {
        p = TexturePCT;
        allsym = numOfTextures;
        maxcum = TextureMAXCUM;
    }
    int cumul_freq[allsym];
    int cum=0;
    for (int i=allsym-1; i>=0; i--)
    {
        cum += p[i];
        cumul_freq[i] = cum;
    }
    if (cum > maxcum)
    {
        cum=0;
```

```
        for (int i=allsym-1; i>=0; i--)
        {
            PCT[contextID][i] = (PCT[contextID][i]+1)/2;
            cum += PCT[contextID][i];
            cumul_freq[i] = cum;
        }
    }
    return aa_decode(cumul_freq);
}
```

2.7.1.6. Decoding Process

The overall structure of decoding process is described in clause 0 (see also encoding process description above). It shows how one obtains the TBVO nodes from the stream of bits that constitute the arithmetically encoded (compressed) TBVO model.

At each step of decoding process we must update the context number (i.e. the index of probability table we use), and the probability table itself. We call Probabilistic model the union of all probability tables (integer arrays). j-th element of i-th probability table, divided by the sum of its elements, estimate the probability of occurrence of the j-th symbol in i-th context.

The process of updating the probability table is as follows. At the start, probability tables are initialized so that all the entries are equal to 1. Before decoding a symbol, the context number (ContextID) must be chosen. ContextID is determined from previously decoded data, as indicated in 0 and 0 below. When ContextID is obtained, the symbol is decoded using binary arithmetic decoder. After that, the probability table is updated, by adding adaptive step to the decoded symbol frequency. If the total (cumulative) sum of table elements becomes greater than cumulative threshold, than the normalization is performed (see 2.7.1.5.1).

2.7.1.6.1. Context Modeling of Texture Symbol

Texture symbol is modeled with only one context. This means that only one probability table is used. The size of this table is equal to number numOfTextures plus one. At the start, this table is initialized to all '1'-s. The maximum allowable entry value is set to 256. The adaptive step is set to 32. This combination of parameter values allows adapting to highly variable stream of the texture numbers.

2.7.1.6.2. Context Modeling of Node Symbol

There are 256 different node symbols, each symbol representing a 2×2×2 binary voxel array. 3D orthogonal transformation may be applied to these arrays, transforming the corresponding symbols into each other.

Consider a set of 48 fixed orthogonal transforms, that is, rotations by 90*n (n=0,1,2,3) degrees about the coordinate axes, and symmetries. Their matrices are given below, in the order of their numbers:

$$\text{Orthogonal Transforms } [48] = \left\{ \begin{pmatrix} 1 & 0 & 0 \\ 0 & 1 & 0 \\ 0 & 0 & 1 \end{pmatrix}, \begin{pmatrix} 0 & 1 & 0 \\ 1 & 0 & 0 \\ 0 & 0 & 1 \end{pmatrix}, \begin{pmatrix} 1 & 0 & 0 \\ 0 & 0 & 1 \\ 0 & 1 & 0 \end{pmatrix}, \begin{pmatrix} -1 & 0 & 0 \\ 0 & 1 & 0 \\ 0 & 0 & 1 \end{pmatrix}, \right.$$

$$\begin{pmatrix} 0 & 1 & 0 \\ 0 & 0 & 1 \\ 1 & 0 & 0 \end{pmatrix}, \begin{pmatrix} 0 & -1 & 0 \\ 1 & 0 & 0 \\ 0 & 0 & 1 \end{pmatrix}, \begin{pmatrix} 0 & 0 & 1 \\ 1 & 0 & 0 \\ 0 & 1 & 0 \end{pmatrix}, \begin{pmatrix} -1 & 0 & 0 \\ 0 & 0 & 1 \\ 0 & 1 & 0 \end{pmatrix},$$

$$\begin{pmatrix} 0 & 0 & 1 \\ 0 & 1 & 0 \\ 1 & 0 & 0 \end{pmatrix}, \begin{pmatrix} 0 & 0 & -1 \\ 1 & 0 & 0 \\ 0 & 1 & 0 \end{pmatrix}, \begin{pmatrix} 0 & 1 & 0 \\ -1 & 0 & 0 \\ 0 & 0 & 1 \end{pmatrix}, \begin{pmatrix} 0 & 1 & 0 \\ 0 & 0 & 1 \\ -1 & 0 & 0 \end{pmatrix},$$

$$\left. \begin{pmatrix} 0 & -1 & 0 \\ -1 & 0 & 0 \\ 0 & 0 & 1 \end{pmatrix}, \begin{pmatrix} 0 & 0 & 1 \\ -1 & 0 & 0 \\ 0 & 1 & 0 \end{pmatrix}, \begin{pmatrix} 0 & 0 & 1 \\ 0 & 1 & 0 \\ -1 & 0 & 0 \end{pmatrix}, \begin{pmatrix} 0 & 0 & -1 \\ -1 & 0 & 0 \\ 0 & 1 & 0 \end{pmatrix}, \right\}$$

-continued $$\begin{pmatrix} 0 & -1 & 0 \\ 0 & 0 & 1 \\ 1 & 0 & 0 \end{pmatrix}, \begin{pmatrix} 0 & 0 & -1 \\ 0 & 1 & 0 \\ 1 & 0 & 0 \end{pmatrix}, \begin{pmatrix} 0 & 0 & 1 \\ 0 & -1 & 0 \\ 1 & 0 & 0 \end{pmatrix}, \begin{pmatrix} 0 & 0 & 1 \\ 1 & 0 & 0 \\ 0 & -1 & 0 \end{pmatrix},$$

$$\begin{pmatrix} 0 & 0 & -1 \\ 0 & -1 & 0 \\ 1 & 0 & 0 \end{pmatrix}, \begin{pmatrix} 1 & 0 & 0 \\ 0 & -1 & 0 \\ 0 & 0 & 1 \end{pmatrix}, \begin{pmatrix} 1 & 0 & 0 \\ 0 & 0 & 1 \\ 0 & -1 & 0 \end{pmatrix}, \begin{pmatrix} -1 & 0 & 0 \\ 0 & -1 & 0 \\ 0 & 0 & 1 \end{pmatrix},$$

$$\begin{pmatrix} 1 & 0 & 0 \\ 0 & 0 & -1 \\ 0 & 1 & 0 \end{pmatrix}, \begin{pmatrix} 1 & 0 & 0 \\ 0 & 1 & 0 \\ 0 & 0 & -1 \end{pmatrix}, \begin{pmatrix} -1 & 0 & 0 \\ 0 & 0 & -1 \\ 0 & 1 & 0 \end{pmatrix}, \begin{pmatrix} 0 & 1 & 0 \\ 0 & 0 & -1 \\ 1 & 0 & 0 \end{pmatrix},$$

$$\begin{pmatrix} 0 & 1 & 0 \\ 1 & 0 & 0 \\ 0 & 0 & -1 \end{pmatrix}, \begin{pmatrix} 0 & -1 & 0 \\ 0 & 0 & -1 \\ 1 & 0 & 0 \end{pmatrix}, \begin{pmatrix} -1 & 0 & 0 \\ 0 & 0 & 1 \\ 0 & -1 & 0 \end{pmatrix}, \begin{pmatrix} 0 & 0 & -1 \\ 1 & 0 & 0 \\ 0 & -1 & 0 \end{pmatrix},$$

$$\begin{pmatrix} 0 & 0 & 1 \\ -1 & 0 & 0 \\ 0 & -1 & 0 \end{pmatrix}, \begin{pmatrix} 0 & 0 & 1 \\ 0 & -1 & 0 \\ -1 & 0 & 0 \end{pmatrix}, \begin{pmatrix} 0 & 0 & -1 \\ -1 & 0 & 0 \\ 0 & -1 & 0 \end{pmatrix}, \begin{pmatrix} 0 & -1 & 0 \\ 0 & 0 & 1 \\ -1 & 0 & 0 \end{pmatrix},$$

$$\begin{pmatrix} 0 & -1 & 0 \\ 1 & 0 & 0 \\ 0 & 0 & -1 \end{pmatrix}, \begin{pmatrix} 1 & 0 & 0 \\ 0 & 0 & -1 \\ 0 & -1 & 0 \end{pmatrix}, \begin{pmatrix} 1 & 0 & 0 \\ 0 & -1 & 0 \\ 0 & 0 & -1 \end{pmatrix}, \begin{pmatrix} -1 & 0 & 0 \\ 0 & 0 & -1 \\ 0 & -1 & 0 \end{pmatrix},$$

$$\begin{pmatrix} 0 & 0 & -1 \\ 0 & -1 & 0 \\ -1 & 0 & 0 \end{pmatrix}, \begin{pmatrix} 0 & 0 & -1 \\ 0 & 1 & 0 \\ -1 & 0 & 0 \end{pmatrix}, \begin{pmatrix} -1 & 0 & 0 \\ 0 & -1 & 0 \\ 0 & 0 & -1 \end{pmatrix}, \begin{pmatrix} 0 & -1 & 0 \\ 0 & 0 & -1 \\ -1 & 0 & 0 \end{pmatrix},$$

$$\begin{pmatrix} 0 & -1 & 0 \\ -1 & 0 & 0 \\ 0 & 0 & -1 \end{pmatrix}, \begin{pmatrix} 0 & 1 & 0 \\ 0 & 0 & -1 \\ -1 & 0 & 0 \end{pmatrix}, \begin{pmatrix} 0 & 1 & 0 \\ -1 & 0 & 0 \\ 0 & 0 & -1 \end{pmatrix}, \begin{pmatrix} -1 & 0 & 0 \\ 0 & 1 & 0 \\ 0 & 0 & -1 \end{pmatrix} \Bigg\}$$

There are 22 sets of symbols—called classes,—such that 2 symbols are connected by such a transform if and only if they belong to the same class. The coding method constructs PCT's as follows: ContextID of a symbol equals either to the number of class to which its parent belongs, or to a combined number (parent class, current node position in the parent node). This allows a great reduction in the number of contexts, reducing the time needed to gain meaningful statistics.

For each class, a single base symbol is determined (see Table 9), and for each symbol, the orthogonal transform that takes it into the base symbol of its class is precomputed (in actual encoding/decoding process, look-up table is used.). After the ContexID for a symbol is determined, the transform, inverse (i.e. transposed matrix) to the one taking its parent into the base element is applied. In Table 10, context and the corresponding direct transforms for each symbol are given.

TABLE 9

Example of base symbol for each class

| Class | Example of base symbol | Class order (Number of elements) |
|---|---|---|
| 0 | 0 | 1 |
| 1 | 1 | 8 |
| 2 | 3 | 12 |
| 3 | 6 | 12 |
| 4 | 7 | 24 |
| 5 | 15 | 6 |
| 6 | 22 | 8 |
| 7 | 23 | 8 |
| 8 | 24 | 4 |
| 9 | 25 | 24 |
| 10 | 27 | 24 |
| 11 | 30 | 24 |
| 12 | 31 | 24 |

TABLE 9-continued

Example of base symbol for each class

| Class | Example of base symbol | Class order (Number of elements) |
|---|---|---|
| 13 | 60 | 6 |
| 14 | 61 | 24 |
| 15 | 63 | 12 |
| 16 | 105 | 2 |
| 17 | 107 | 8 |
| 18 | 111 | 12 |
| 19 | 126 | 4 |
| 20 | 127 | 8 |
| 21 | 255 | 1 |

The context model depends on the number N of already decoded symbols:

For N<512 there is only one context. Probability table is initialized to all '1'-s. Number of symbols in probability table is 256. Adaptive step is 2. Maximum cumulative frequency is 8192.

For 512≦N<2560 (=2048+512), 1-context (in the sense that context number is single parameter, number of the class) model is used. This model uses 22 PCT's. ContextID is number of the class to which the parent of the decoded node belongs. This number can always be determined from the lookup table (see Table 10), because the parent is decoded earlier than the child. Each of the 22 PCT's is initialized by the PCT from previous stage. Number of symbols in each probability table is 256. Adaptive step is 3. Maximum cumulative frequency is also 8192. After symbol is decoded it is transformed using inverse orthogonal transform defined above. The orthogonal transform number can be found in Table 10 with Node Symbol ID equal to parent of the current node symbol.

When 2560 symbols are decoded, the decoder switches to 2-context (in the sense that context number is now composed of the two parameters as explained below). This model uses 176 (=22*8, i.e. 22 classes by 8 positions) PCT's. ContextID here depends on the parent class and the position of the current node in the parent node. Initial probability tables for this model depend only on its context, but not position: for all 8 positions PCT is a clone of the PCT obtained for the given class at the previous stage. Number of symbols in each probability table is 256. Adaptive step is 4. Maximum cumulative frequency is also 8192.

After symbol is decoded it is also transformed using the inverse orthogonal transform (to the one given in the Table 10) as is in the previous model.

One can easily obtain the geometry of base elements for each class, using the Table 10. Base elements are exactly the symbols for which the Transform ID is 0 (number 0 is assigned to the identical transform).

TABLE 10

Joint look up table for node symbol, its class number and orthogonal transform that takes the symbol to the fixed base element of this class

| Node Symbol ID | Class ID | Orthogonal Transform ID |
|---|---|---|
| 0 | 0 | 0 |
| 1 | 1 | 0 |
| 2 | 1 | 3 |
| 3 | 2 | 0 |
| 4 | 1 | 10 |
| 5 | 2 | 1 |
| 6 | 3 | 0 |
| 7 | 4 | 0 |
| 8 | 1 | 12 |
| 9 | 3 | 3 |
| 10 | 2 | 5 |
| 11 | 4 | 3 |
| 12 | 2 | 21 |
| 13 | 4 | 10 |
| 14 | 4 | 12 |
| 15 | 5 | 0 |
| 16 | 1 | 11 |
| 17 | 2 | 4 |
| 18 | 3 | 2 |
| 19 | 4 | 2 |
| 20 | 3 | 6 |
| 21 | 4 | 6 |
| 22 | 6 | 0 |
| 23 | 7 | 0 |
| 24 | 8 | 0 |
| 25 | 9 | 0 |
| 26 | 9 | 7 |
| 27 | 10 | 0 |
| 28 | 9 | 13 |
| 29 | 10 | 1 |
| 30 | 11 | 0 |
| 31 | 12 | 0 |
| 32 | 1 | 30 |
| 33 | 3 | 7 |
| 34 | 2 | 16 |
| 35 | 4 | 7 |
| 36 | 8 | 2 |
| 37 | 9 | 2 |
| 38 | 9 | 3 |
| 39 | 10 | 2 |
| 40 | 3 | 9 |
| 41 | 6 | 3 |
| 42 | 4 | 9 |
| 43 | 7 | 3 |
| 44 | 9 | 15 |
| 45 | 11 | 3 |
| 46 | 10 | 5 |

TABLE 10-continued

Joint look up table for node symbol, its class number and orthogonal transform that takes the symbol to the fixed base element of this class

| Node Symbol ID | Class ID | Orthogonal Transform ID |
|---|---|---|
| 47 | 12 | 3 |
| 48 | 2 | 22 |
| 49 | 4 | 11 |
| 50 | 4 | 30 |
| 51 | 5 | 2 |
| 52 | 9 | 14 |
| 53 | 10 | 4 |
| 54 | 11 | 2 |
| 55 | 12 | 2 |
| 56 | 9 | 31 |
| 57 | 11 | 7 |
| 58 | 10 | 16 |
| 59 | 12 | 7 |
| 60 | 13 | 0 |
| 61 | 14 | 0 |
| 62 | 14 | 3 |
| 63 | 15 | 0 |
| 64 | 1 | 32 |
| 65 | 3 | 13 |
| 66 | 8 | 6 |
| 67 | 9 | 6 |
| 68 | 2 | 18 |
| 69 | 4 | 13 |
| 70 | 9 | 10 |
| 71 | 10 | 6 |
| 72 | 3 | 24 |
| 73 | 6 | 10 |
| 74 | 9 | 26 |
| 75 | 11 | 10 |
| 76 | 4 | 24 |
| 77 | 7 | 10 |
| 78 | 10 | 21 |
| 79 | 12 | 10 |
| 80 | 2 | 19 |
| 81 | 4 | 14 |
| 82 | 9 | 11 |
| 83 | 10 | 8 |
| 84 | 4 | 32 |
| 85 | 5 | 6 |
| 86 | 11 | 6 |
| 87 | 12 | 6 |
| 88 | 9 | 37 |
| 89 | 11 | 13 |
| 90 | 13 | 1 |
| 91 | 14 | 1 |
| 92 | 10 | 18 |
| 93 | 12 | 13 |
| 94 | 14 | 10 |
| 95 | 15 | 1 |
| 96 | 3 | 25 |
| 97 | 6 | 11 |
| 98 | 9 | 36 |
| 99 | 11 | 11 |
| 100 | 9 | 38 |
| 101 | 11 | 14 |
| 102 | 13 | 4 |
| 103 | 14 | 4 |
| 104 | 6 | 34 |
| 105 | 16 | 0 |
| 106 | 11 | 34 |
| 107 | 17 | 0 |
| 108 | 11 | 39 |
| 109 | 17 | 1 |
| 110 | 14 | 20 |
| 111 | 18 | 0 |
| 112 | 4 | 25 |
| 113 | 7 | 11 |
| 114 | 10 | 22 |
| 115 | 12 | 11 |
| 116 | 10 | 19 |
| 117 | 12 | 14 |

TABLE 10-continued

Joint look up table for node symbol, its class number and orthogonal transform that takes the symbol to the fixed base element of this class

| Node Symbol ID | Class ID | Orthogonal Transform ID |
|---|---|---|
| 118 | 14 | 11 |
| 119 | 15 | 4 |
| 120 | 11 | 42 |
| 121 | 17 | 4 |
| 122 | 14 | 31 |
| 123 | 18 | 2 |
| 124 | 14 | 37 |
| 125 | 18 | 6 |
| 126 | 19 | 0 |
| 127 | 20 | 0 |
| 128 | 1 | 34 |
| 129 | 8 | 9 |
| 130 | 3 | 15 |
| 131 | 9 | 9 |
| 132 | 3 | 26 |
| 133 | 9 | 24 |
| 134 | 6 | 12 |
| 135 | 11 | 12 |
| 136 | 2 | 20 |
| 137 | 9 | 12 |
| 138 | 4 | 15 |
| 139 | 10 | 9 |
| 140 | 4 | 26 |
| 141 | 10 | 23 |
| 142 | 7 | 12 |
| 143 | 12 | 12 |
| 144 | 3 | 36 |
| 145 | 9 | 25 |
| 146 | 6 | 30 |
| 147 | 11 | 30 |
| 148 | 6 | 32 |
| 149 | 11 | 32 |
| 150 | 16 | 3 |
| 151 | 17 | 3 |
| 152 | 9 | 42 |
| 153 | 13 | 16 |
| 154 | 11 | 31 |
| 155 | 14 | 16 |
| 156 | 11 | 37 |
| 157 | 14 | 18 |
| 158 | 17 | 5 |
| 159 | 18 | 3 |
| 160 | 2 | 31 |
| 161 | 9 | 30 |
| 162 | 4 | 31 |
| 163 | 10 | 17 |
| 164 | 9 | 39 |
| 165 | 13 | 5 |
| 166 | 11 | 15 |
| 167 | 14 | 5 |
| 168 | 4 | 34 |
| 169 | 11 | 9 |
| 170 | 5 | 9 |
| 171 | 12 | 9 |
| 172 | 10 | 20 |
| 173 | 14 | 12 |
| 174 | 12 | 15 |
| 175 | 15 | 5 |
| 176 | 4 | 36 |
| 177 | 10 | 25 |
| 178 | 7 | 30 |
| 179 | 12 | 30 |
| 180 | 11 | 38 |
| 181 | 14 | 19 |
| 182 | 17 | 16 |
| 183 | 18 | 7 |
| 184 | 10 | 31 |
| 185 | 14 | 35 |
| 186 | 12 | 31 |
| 187 | 15 | 16 |
| 188 | 14 | 39 |
| 189 | 19 | 3 |
| 190 | 18 | 9 |
| 191 | 20 | 3 |
| 192 | 2 | 37 |
| 193 | 9 | 32 |
| 194 | 9 | 34 |
| 195 | 13 | 21 |
| 196 | 4 | 37 |
| 197 | 10 | 27 |
| 198 | 11 | 26 |
| 199 | 14 | 21 |
| 200 | 4 | 39 |
| 201 | 11 | 24 |
| 202 | 10 | 29 |
| 203 | 14 | 23 |
| 204 | 5 | 24 |
| 205 | 12 | 24 |
| 206 | 12 | 26 |
| 207 | 15 | 21 |
| 208 | 4 | 38 |
| 209 | 10 | 28 |
| 210 | 11 | 36 |
| 211 | 14 | 22 |
| 212 | 7 | 32 |
| 213 | 12 | 32 |
| 214 | 17 | 18 |
| 215 | 18 | 13 |
| 216 | 10 | 37 |
| 217 | 14 | 33 |
| 218 | 14 | 34 |
| 219 | 19 | 10 |
| 220 | 12 | 37 |
| 221 | 15 | 18 |
| 222 | 18 | 24 |
| 223 | 20 | 10 |
| 224 | 4 | 42 |
| 225 | 11 | 25 |
| 226 | 10 | 34 |
| 227 | 14 | 30 |
| 228 | 10 | 38 |
| 229 | 14 | 32 |
| 230 | 14 | 40 |
| 231 | 19 | 11 |
| 232 | 7 | 34 |
| 233 | 17 | 20 |
| 234 | 12 | 34 |
| 235 | 18 | 15 |
| 236 | 12 | 39 |
| 237 | 18 | 26 |
| 238 | 15 | 20 |
| 239 | 20 | 12 |
| 240 | 5 | 25 |
| 241 | 12 | 25 |
| 242 | 12 | 36 |
| 243 | 15 | 22 |
| 244 | 12 | 38 |
| 245 | 15 | 19 |
| 246 | 18 | 25 |
| 247 | 20 | 11 |
| 248 | 12 | 42 |
| 249 | 18 | 36 |
| 250 | 15 | 31 |
| 251 | 20 | 30 |
| 252 | 15 | 37 |
| 253 | 20 | 32 |
| 254 | 20 | 34 |
| 255 | 21 | 0 |

Hereinafter, MPEG-4 node specification and compression techniques of octree image formats used in the depth image-based 3D representing apparatus and method according to the present invention will be described in detail.

This invention describes a family of data structures, depth image-based representations (DIBR), that provide effective and efficient representations based mostly on images and depth maps, fully utilizing the advantages described above. Let us briefly characterize main DIBR formats—SimpleTexture, PointTexture, and OctreeImage.

Figure 20:
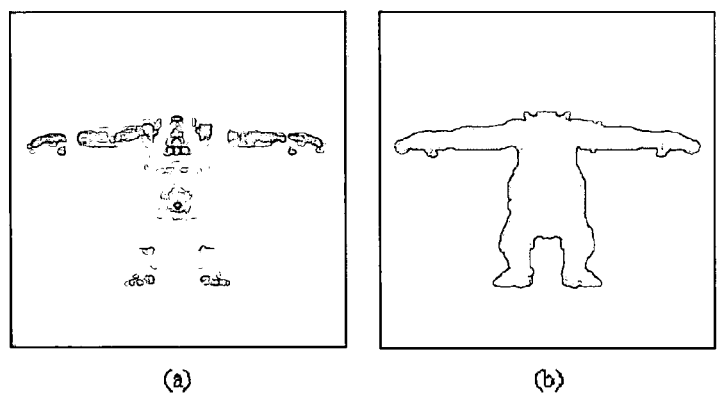
FIG. 20 is a diagram of an example of the texture image and depth map.
Figure 21:
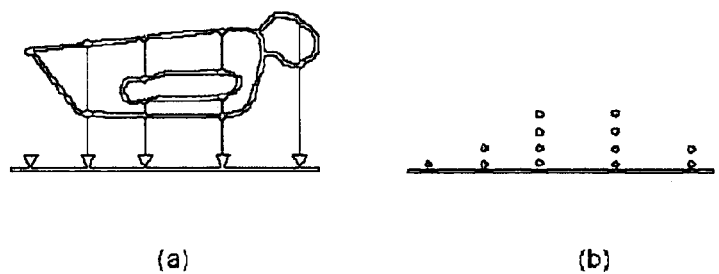
FIG. 21 is a diagram of an example of Layered depth image (LDI): (a) shows Projection of the object, and (b) shows layered pixels.

FIG. 20 is a diagram of an example of the texture image and depth map, and FIG. 21 is a diagram of an example of Layered depth image (LDI). (a) shows projection of the object and (b) shows layered pixels.

SimpleTexture is a data structure that consists of an image, corresponding depth map, and camera description (its position, orientation and type, orthogonal or perspective). Representation capabilities of a single SimpleTexture are restricted to objects like facade of a building: a frontal image with depth map allows reconstruction of facade views at substantial range of angles. However, collection of SimpleTextures produced by properly positioned cameras allows representation of the whole building—in case reference images cover all the potentially visible parts of the building surface. Of course, the same applies to trees, human figures, cars, etc. Moreover, union of SimpleTextures provides quite natural means for handling 3D animated data. In this case reference images are replaced with reference videostreams. Depth maps for each 3D frame can be represented either by alpha-channel values of these videostreams, or by separate gray-scale videostreams. In this type of representation, images can be stored in lossy compressed formats like, say, JPEG. This significantly reduces the volume of the color information, especially in animated case. However, geometry information (depth maps) should be compressed losslessly, which affects the overall reduction in storage.

For the objects of complex shape, it is sometimes difficult to cover the whole visible surface with reasonable number of reference images. Preferable representation for such cases might be PointTexture. This format also stores reference image and depth map, but in this case both are multivalued: for each line of sight provided by the camera (orthographic or perspective), color and distance are stored for every intersection of the line with the object. Number of intersections may vary from line to line. Union of several PointTextures provides a very detailed representation even for complex objects. But the format lacks most of 2D regularity of SimpleTexture, and thus has no natural image-based compressed form. For the same reason it is only used for still objects.

OctreeImage format occupies an intermediate position between 'mostly 2D' SimpleTexture and 'mostly 3D' PointTexture: it stores geometry of the object in the octree-structured volumetric representation (hierarchically organized voxels of usual binary subdivision of enclosing cube), while the color component is represented by a set of images. This format contains also additional octree-like data structure, which stores, for each leaf voxel, the index of a reference image containing its color. At the stage of rendering of the OctreeImage, color of the leaf voxel is determined by orthographically projecting it on the corresponding reference image. We have developed a very efficient compression method for the geometry part of OctreeImage. It is a variant of adaptive context-based arithmetic coding, where the contexts are constructed with the explicit usage of geometric nature of the data. Usage of the compression together with lossy compressed reference images makes OctreeImage a very space-efficient representation. Like SimpleTexture, OctreeImage has animated version: reference videostreams instead of reference images, plus two additional streams of octrees representing geometry and voxel-to-image correspondence for each 3D frame. Very useful feature of an OctreeImage format is its built-in mid-mapping capability.

The DIBR family has been developed for the new version of MPEG-4 standard, and adopted for inclusion into MPEG's Animation Framework eXtension (AFX). AFX provides more enhanced features for synthetic MPEG-4 environments, and includes a collection of interoperable tools that produce a reusable architecture for interactive animated contents (compatible with existing MPEG-4). Each AFX tool shows the compatibility with a BIFS node, a synthetic stream, and an audio-visual stream. The current version of the AFX consists of higher-level descriptions of animation (e.g., bone and skin based animation), enhanced rendering (e.g., procedural texturing, light-field mapping), compact representations (e.g., NURBS, solid representation, subdivision surfaces), low bit-rate animations (e.g., interpolator compression) and others, as well as our proposed DIBR.

DIBR formats were designed so as to combine advantages of different ideas suggested earlier, providing a user with flexible tools best suited for a particular task. For example, non-animated SimpleTexture and PointTexture are particular cases of the known formats, while OctreeImage is an apparently new representation. But in MPEG-4 context, all the three basic DIBR formats can be considered as building blocks, and their combinations by means of MPEG-4 constructs not only embrace many of the image-based representations suggested in the literatures, but also give a great potential for constructing new such formats.

Now, Depth Image-Based Representation will be described.

Taking into account the ideas outlined in the previous section, as well as some of our own developments, we suggested the following set of image-based formats for use in MPEG-4 AFX: SimpleTexture, PointTexture, DepthImage, and OctreeImage. Note that SimpleTexture and OctreeImage have animated versions.

SimpleTexture is a single image combined with depth image. It is equivalent to RT, while PointTexture is equivalent to LDI.

Based on SimpleTexture and PointTexture as building blocks, we can construct a variety of representations using MPEG-4 constructs. Formal specification will be given later, and here we describe the result geometrically.

DepthImage structure defines either SimpleTexture or PointTexture together with bounding box, position in space and some other information. A set of DepthImages can be unified under a single structure called Transform node, and this allows construction of a variety of useful representations. Most commonly used are the two of them that do not have a specific MPEG-4 name, but in our practice we called them Box Texture (BT), and Generalized Box Texture (GBT). BT is a union of six SimpleTextures corresponding to a bounding cube of an object or a scene, while GBT is an arbitrary union of any number of SimpleTextures that together provide a consistent 3D representation. Example of BT is given in FIG. 22, where reference images, depth maps and the resulting 3D object are shown. BT can be rendered with the aid of incremental warping algorithm, but we use different approach applicable to GBT as well. An example of GBT representation is shown in FIG. 23, where 21 SimpleTextures are used to represent a complex object, the palm tree.

It should be noted that unification mechanism allows, for instance, the use of several LDIs with different cameras to represent the same object, or parts of the same object. Hence, data structures like image-based objects, cells of LDI tree, cells of surfels-based tree structure, are all particular cases of this format, which obviously offers much greater flexibility in adapting location and resolution of SimpleTextures and PointTextures to the structure of the scene.

Next, OctreeImage: Textured Binary Volumetric Octree (TBVO), will be described.

In order to utilize multiresolution geometry and texture with more flexible representation and fast rendering, we develop OctreeImage representation, which is based on Textured Binary Volumetric Octree (TBVO). The objective of TBVO is to contrive a flexible representation/compression format with fast high quality visualization. TBVO consists of three main components—Binary Volumetric Octree (BVO) which represents geometry, a set of reference images, and image indices corresponding to the octree nodes.

Figure 24:
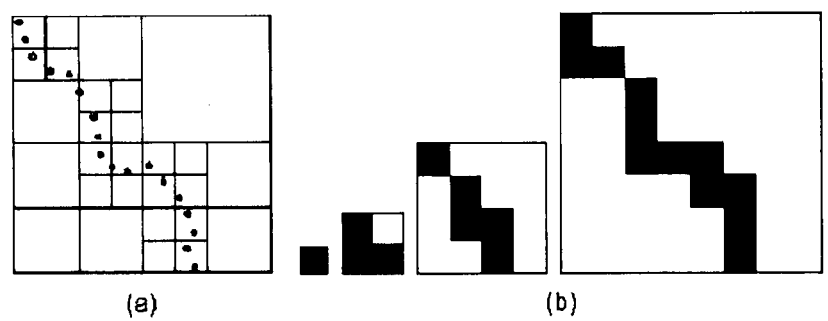
FIG. 24 is a diagram an example showing Octree representation illustrated in 2D: (a) shows a 'point cloud', (b) shows the corresponding mid-maps.

Geometric information in BVO form is a set of binary (occupied or empty) regularly spaced voxels combined in larger cells in usual octree manner. This representation can be easily obtained from DepthImage data through the intermediate 'point cloud' form, since each pixel with depth defines a unique point in 3D space. Conversion of the point cloud to BVO is illustrated in FIG. 24. An analogous process allows converting polygonal model to BVO. Texture information of the BVO can be retrieved from reference images. A reference image is texture of voxels at a given camera position and orientation. Hence, BVO itself, together with reference images, does already provide the model representation. However, it turned out that additional structure storing the reference image index for each BVO leave allows visualizing much faster and with better quality.

The main BVO visualization problem is that we must determine corresponding camera index of each voxel during rendering. To this end, we must at least determine the existence of a camera, from which the voxel is visible. This procedure is very slow if we use brute-force approach. In addition to this problem, there are still some troubles for voxels that are not visible from any cameras, yielding undesirable artifacts in the rendered image.

A possible solution could be storing explicit color to each voxel. However, in this case, we have experienced some problem in compressing color information. That is, if we group voxel colors as an image format and compress it, the color correlation of neighboring voxels is destroyed such that the compression ratio would be unsatisfactory.

In TBVO, the problem is solved by storing camera (image) index for every voxel. The index is usually same for large group of voxels, and this allows the use of octree structure for economic storage of the additional information. Note that, on the average, only 15% volume increase, in comparison to representation using only BVO and reference images, was observed in the experiments with our models. It's modeling is a little bit more complex, but allows more flexible way of representing objects of any geometry.

Note that TBVO is a very convenient representation for rendering with the aid of splats, because splat size is easily computed from voxel size. Voxel color is easily determined using the reference images and the image index of the voxel.

Now, streaming of textured binary volumetric octree will be described.

We suppose that 255 cameras are enough, and assign up to 1 byte for the index. The TBVO stream is stream of symbols. Every TBVO-symbol is BVO-symbol or Texture-symbol. Texture-symbol denotes camera index, which could be a specific number or a code of "undefined".

Let "undefined" code be '?' for further description. The TBVO stream is traversed in breadth first order. Let us describe how to write TBVO stream if we have BVO and every leaf voxel has image index. This must be done in modeling stage. It will traverse all BVO nodes including leaf nodes (which do not have BVO-symbol) in breadth first order. In FIG. 25, the pseudo-code, which completes writing the stream, is shown.

An example of writing TBVO bitstream is shown in FIG. 14. For the TBVO tree shown in FIG. 14(a), a stream of symbols can be obtained as shown in FIG. 14(c), according to the procedure. In this example, the texture-symbols are represented in byte. However, in the actual stream, each texture-symbol would only need 2 bits because we only need to represent three values (two cameras and the undefined code).

Next, DIBR Animation will be described.

Animated versions were defined for two of the DIBR formats: DepthImage containing only SimpleTextures, and OctreeImage. Data volume is one of the crucial issues with 3D animation. We have chosen these particular formats because video streams can be naturally incorporated in the animated versions, providing substantial data reduction.

For DepthImage, animation is performed by replacing reference images by MPEG-4 MovieTextures. High-quality lossy video compression does not seriously affect appearance of the resulting 3D objects. Depth maps can be stored (in near lossless mode) in the alpha channels of reference video streams. At rendering stage, 3D frame is rendered after all the reference image and depth frames are received and decompressed.

Animation of OctreeImage is similar—reference images are replaced by MPEG-4 MovieTextures, and a new stream of octree appears.

MPEG-4 Node Specification will now be defined.

The DIBR formats are described in detail in MPEG-4 AFX nodes specifications. DepthImage contains fields determining the parameters of view frustum for either SimpleTexture or PointTexture. OctreeImage node represents object in the form of TBVO-defined geometry and a set of reference image formats. Scene-dependent information is stored in special fields of the DIBR data structures, allowing the correct interaction of DIBR objects with the rest of the scene. The definition of DIBR nodes is shown in FIG. 26.

FIG. 27 illustrates spatial layout of the DepthImage, in which the meaning of each field is shown. Note that the DepthImage node defines a single DIBR object. When multiple DepthImage nodes are related to each other, they are processed as a group, and thus, should be placed under the same Transform node. The diTexture field specifies the texture with depth (SimpleTexture or PointTexture), which shall be mapped into the region defined in the DepthImage node.

The OctreeImage node defines an octree structure and their projected textures. The octreeResolution field specifies maximum number of octree leaves along a side of the enclosing cube. The octree field specifies a set of octree internal nodes. Each internal node is represented by a byte. 1 in ith bit of this byte means that the children nodes exist for the ith child of that internal node, while 0 means that it does not. The order of the octree internal nodes shall be the order of breadth first traversal of the octree. The order of eight children of an internal node is shown in FIG. 14(b). The voxelImageIndex field contains an array of image indices assigned to voxel. At the rendering stage, color attributed to an octree leaf is determined by orthographically projecting the leaf onto one of the images with a particular index. The indices are stored in an octree-like fashion: if a particular image can be used for all the leaves contained in a specific voxel, the voxel containing index of the image is issued into the stream; otherwise, the voxel containing a fixed 'further subdivision' code is issued, which means that image index will be specified separately for each children of the current voxel (in the same recursive fashion). If the voxelImageIndex is empty, then the image indices are determined during rendering stage. The images field specifies a set of DepthImage nodes with SimpleTexture for diTexture field. However, the nearPlane and farPlane field of the DepthImage node and the depth field in the Simple-Texture node are not used.

Compression of octreeImage format-will now be described.

In this section, we consider compression method for OctreeImage. Typical test results are presented and commented later. Please notice that compression of PointTexture is not supported yet, which is going to be implemented in the next version of AFX.

The fields octreeimages and octree in OctreeImage are compressed separately. The proposed methods have been developed, based on the notion that octree field must be compressed losslessly while some degree of visually acceptable distortion allowed for octreeimages.

OctreeImages field is compressed by means of image compression (for static model), or video compression tools (for animated model) supported by MPEG-4. In our approach, we used JPEG format for OctreeImages. Additional preprocessing of images by discarding irrelevant pixels and suppressing compression artifacts at the object/background boundary increases simultaneously compression rate and rendering quality.

Octree compression is the most important part of the OctreeImage compression, since it deals with compression of already very compact linkless binary tree representation. However, in our experiments, the method explained below reduced the volume of this structure to about half of the original. In the animated OctreeImage version Octree field is compressed separately for each 3D frame.

Compression is performed by a variant of context-based adaptive arithmetic coding that makes explicit use of the geometric nature of the data. The Octree is a stream of bytes. Each byte represents a node (i.e., subcube) of the tree, in which its bits indicate the occupancy of the subcube after internal subdivision. The bit pattern is called filling pattern of the node. The proposed compression algorithm processes bytes one by one, in the following manner.

a context for the current byte is determined.
'probability' (normalized frequency) of occurrence of the current byte in this context is retrieved from the 'probability table' (PT) corresponding to the context.
the probability value is fed to the arithmetic coder.
current PT is updated by adding a specified step to the frequency of the current byte occurrence in the current context (and, if necessary, renormalized afterwards, see details below).

Thus, coding is the process of constructing and updating the PTs according to the context model. In the context-based adaptive arithmetic coding schemes (such as 'Prediction with Partial Matching'), context of a symbol is usually a string of several preceding symbols. However, in our case, compression efficiency is increased by exploiting the octree structure and geometric nature of the data. The proposed approach is based on the two ideas that are apparently new in the problem of octree compression.

A1: For the current node, the context is either its parent node, or the pair {parent node, current node position in the parent node};
A2: It is assumed that 'probability' of the given node occurrence at the particular geometric location in the particular parent node is invariant with respect to a certain set of orthogonal (such as rotations or symmetries) transforms.

Assumption 'A1' is illustrated in the FIG. 6, for the transform R, which is the rotation by −90° on the x-z plane. The basic notion behind 'A2' is the observation that probability of occurrence of a particular type of child node in a particular type of parent node should depend only on their relative position. This assumption is confirmed in our experiments, by analysis of probability tables. It allows us to use more complex context without having too many probability tables. This, in turn, helps to achieve quite good results in terms of data size and speed. Note that the more complex contexts are used, the sharper is the estimated probability, and thus the more compact is the code.

Let us introduce the set of transforms for which we will assume the invariance of probability distributions. In order to apply in our situation, such transforms should preserve the enclosing cube.

Consider a set G of the orthogonal transforms in Euclidean space, which are obtained by all compositions in any number and order of the 3 basis transforms (generators) $m_1$, $m_2$, and $m_3$, given by $$m_1 = \begin{pmatrix} 0 & 1 & 0 \\ 1 & 0 & 0 \\ 0 & 0 & 1 \end{pmatrix}, m_2 = \begin{pmatrix} 1 & 0 & 0 \\ 0 & 0 & 1 \\ 0 & 1 & 0 \end{pmatrix}, m_3 = \begin{pmatrix} -1 & 0 & 0 \\ 0 & 1 & 0 \\ 0 & 0 & 1 \end{pmatrix} \quad (1)$$

wherein $m_1$ and $m_2$ are reflections to the planes x=y and y=z, respectively, and $m_3$ is reflection to the plane x=0. One of the classical results of the theory of groups generated by reflections states that G contains 48 distinct orthogonal transforms, and is, in a sense, the maximal group of orthogonal transforms that take the cube into itself (so-called Coxeter group). For example, rotation R in FIG. 6 is expressed through the generators as $$R = m_3 \cdot m_2 \cdot m_1 \cdot m_2, \quad (2)$$

where '·' is matrix multiplication.

Transform from G, applied to an octree node, produces a node with different filling pattern of subcubes. This allows to categorize the nodes according to the filling pattern of their subcubes. Using the group theory language, we say that G acts on the set of all filling patterns of the octree nodes. Computations show that there exist 22 distinct classes (also called orbits in group theory), in which, by definition, two nodes belong to the same class, if and only if they are connected by a transform from G. Number of elements in a class varies from 1 to 24 (and is always, in accordance with group theory, a divisor of 48).

The practical consequence of 'A2' is that the probability table depends not on the parent node itself, but only on the class to which the parent node belongs. Note that there would be 256 tables for a parent-based context and additional 256× 8=2048 tables for parent-and-child position-based context in former case, while we need only 22 tables for parent-class-based context plus 22×8=176 tables in latter case. Therefore, it is possible to use equivalently complex context with relatively small number of probability tables. The constructed PT would have the form as shown in Table 11.

TABLE 11

Enumeration of probability tables.

| ID of PTs | 0 | 1 | ... | 255 | Context description |
|---|---|---|---|---|---|
| 0 | P0,0 | P0,1 | ... | P0,255 | 0-Context: Context independent |
| 1..22 (22) | Pi,0 | Pi,1 | ... | Pi,255 | 1-Context: {parent node class} |
| 23...198 (176) | Pj,0 | Pj,1 | ... | Pj,255 | 2-Context: {parent node class, current node position} |

To make the statistics for probability tables more accurate, it is collected in different ways at three stages of encoding process.

At the first stage we do not use contexts at all, accepting the '0-context model', and keep a single probability table with 256 entries, starting from the uniform distribution.

As soon as the first 512 nodes (it is an empirically found number) are encoded, we switch to the '1-context model' using parent node as a context. At the switching moment, the 0-context PT is copied to the PTs for all 22 contexts. After 2048 nodes (another heuristic value) are encoded, we switch to '2-context model'. At this moment, the 1-context PTs of the parent patterns are copied to the PTs for each position in the same parent pattern.

Key point of the algorithm is the determination of context and probability for the current byte. This is implemented as follows. In each class we fix a single element, which is called 'standard element'. We store a class map table (CMT) indicating the class to which each of the possible 256 nodes belongs, and the precomputed transform from G that takes this particular node into the standard element of its class. Thus, in order to determine the probability of the current node N, we perform the following steps:

Look at the parent P of the current node;

Retrieve the class from CMT, to which P belongs, and the transform T that takes P into the standard node of the class. Let the class number be c;

Apply T to P, and find the child position p in standard node to which current node N is mapped;

Apply T to N. Then, newly obtained filling pattern TN is at the position p in the standard node of the class c.

Retrieve the required probability from the entry TN of the probability table corresponding to the class-position combination (c, p).

For the 1-context model, the above steps are modified in an obvious way. Needless to say, all the transforms are precomputed, and implemented in a lookup table.

Note that at the stage of decoding of the node N its parent P is already decoded, and hence transform T is known. All the steps at the stage of decoding are absolutely similar to the corresponding encoding steps.

Finally, let us outline the probability update process. Let P be a probability table for some context. Denote P(N) the entry of P corresponding to the probability of occurrence of the node N in this context. In our implementation, P(N) is an integer, and after each occurrence of N, P(N) is updated as:

$$P(N)=P(N)+A$$

where, A is an integer increment parameter varying typically from 1 to 4 for different context models. Let S(P) be the sum of all entries in P. Then the 'probability' of N that is fed to the arithmetic coder (range coder in our case) is computed as P(N)/S(P). As soon as S(P) reaches a threshold value $2^{16}$, all the entries are renormalized: in order to avoid occurrence of zero values in P, entries equal to 1 are left intact, while the others are divided by 2.

The stream of symbols determining the image index for each voxel, is compressed using its own probability table. In the terms used above, it has a single context. PT entries are updated with larger increment than entries for octree nodes: this allows to adapt the probabilities to high variability of the involved symbol frequencies; in the rest, there's no difference with node symbols coding.

Rendering methods for DIBR formats are not part of AFX, but it is necessary to explain the ideas used to achieve simplicity, speed and quality of DIBR objects rendering. Our rendering methods are based on splats, small flat color patches used as 'rendering primitives'. Two approaches outlined below are oriented at two different representations: DepthImage and OctreeImage. In our implementation, OpenGL functions are employed for splatting to accelerate the rendering. Nevertheless, software rendering is also possible, and allows optimized computation using the simple structure of DepthImage or OctreeImage.

The method we use for rendering DepthImage objects, is extremely simple. It should be mentioned, however, that it depends on the OpenGL functions and works much faster with the aid of hardware accelerator. In this method, we transform all the pixels with depth from SimpleTextures and PointTextures that are to be rendered, into 3D points, then position small polygons (splats) at these points, and apply rendering functions of OpenGL. Pseudo-code of this procedure for SimpleTexture case is given in FIG. 28. PointTexture case is treated exactly in the same way.

Size of splat must be adapted to the distance between the point and the observer. We used the following simple approach. First, the enclosing cube of given 3D object is subdivided into a coarse uniform grid. Splat size is computed for each cell of the grid, and this value is used for the points inside the cell. The computation is performed as follows:

Map the cell on the screen by means of OpenGL.

Calculate length L of the largest diagonal of projection (in pixels).

Estimate D (splat diameter) as $$c\frac{L}{N},$$

where N is average number of points per cell side and C is a heuristic constant, approximately 1.3.

We'd like to emphasize that this method could certainly be improved by sharper radius computations, more complex splats, antialiasing. However, even this simple approach provides good visual quality.

The same approach works for OctreeImage, where the nodes of the octree at one of coarser levels are used in the above computations of splat size. However, for the Octree-Image color information should first be mapped on the set of voxels. This can be done very easily, because each voxel has its corresponding reference image index. The pixel position in a reference image is also known during the parsing of octree stream. As soon as the colors of OctreeImage voxels are determined, splat sizes are estimated and the OpenGL-based rendering is used as described above.

DIBR formats have been implemented and tested on several 3D models. One of the models ("Tower") was obtained by scanning actual physical object (Cyberware color 3D scanner was used), the others were converted from the 3DS-MAX demo package. Tests were performed on Intel Pentium-IV 1.8 GHz with OpenGL accelerator.

We will explain the methods of conversion from polygonal to DIBR formats, and then present the modeling, representation, and compression results of the different DIBR formats. Most of the data is for DepthImage and OctreeImage models; these formats have animated versions and can be effectively compressed. All the presented models have been constructed with the orthographic camera since it is, in general, preferable way to represent 'compact' objects. Note that the perspective camera is used mostly for economic DIBR representation of the distant environments.

DIBR model generation begins with obtaining sufficient number of SimpleTextures. For polygonal object the SimpleTextures are computed, while for the real-world object the data is obtained from digital cameras and scanning devices. Next step depends on the DIBR format we want to use.

DepthImage is simply a union of the obtained SimpleTextures. Although, depth maps may be stored in compressed form, only lossless compression is acceptable since even small distortion in geometry is often highly noticeable.

Reference images can be stored in lossy compressed form, but in this case a preprocessing is required. While it is generally tolerable to use popular methods like JPEG lossy compression, the boundary artifacts become more noticeable in the 3D object views generated—especially due to the boundaries between object and background of the reference image, where the background color appears to 'spill' into the object. The solution we have used to cope with the problem is to extend the image in the boundary blocks into the background using average color of the block and fast decay of intensity, and then apply the JPEG compression. The effect resembles 'squeezing' the distortion into the background where it is harmless since background pixels are not used for rendering. Internal boundaries in lossy compressed reference images may also produce artifacts, but these are generally less visible.

Figure 29:
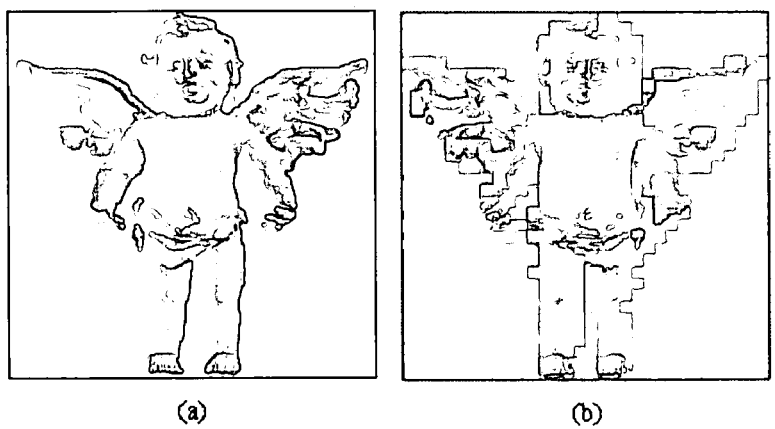
FIG. 29 is a diagram of an example showing the compression of reference image in SimpleTexture: (a) shows the original reference image, and (b) shows the modified reference image in a JPEG format.

To generate OctreeImage models we use an intermediate point-based representation (PBR). Set of points that constitute PBR is union of the colored points obtained by shifting pixels in reference images by distances specified in the corresponding depth maps. Original SimpleTextures should be constructed so that the resulting. PBR would provide sufficiently accurate approximation of the object surface. After that, PBR is converted into OctreeImage as outlined in FIG. 24, and is used to generate a new complete set of reference images that satisfy restrictions imposed by this format. At the same time, additional data structure voxelImageIndex representing reference image indices for octree voxels, is generated. In case reference images should be stored in lossy formats, they are first preprocessed as explained in previous subsection. Besides, since TBVO structure explicitly specifies the pixel containing its color of each voxel, redundant pixels are discarded, which further reduces the volume of voxelImageIndex. Examples of the original and processed reference images in the JPEG format are shown in FIG. 29.

Note that quality degradation due to lossy compression is negligible for OctreeImages, but sometimes still noticeable for DepthImage objects.

PointTexture models are constructed using projection of the object onto a reference plane. If this does not produce enough samples (which may be the case for the surface parts nearly tangent to vector of projection), additional SimpleTextures are constructed to provide more samples. The obtained set of points is then reorganized into the PointTexture structure.

In Table 12, we compare data sizes of the several polygonal models and their DIBR versions. Numbers in the model names denote the resolution (in pixels) of their reference images.

TABLE 12

Static DIBR models compression (Model size in kilobytes)

| Model | Palm512 | | Angel256 | | Morton512 | | Tower256 | |
|---|---|---|---|---|---|---|---|---|
| Number of SimpleTextures | 21 | | 6 | | 6 | | 5 | |
| Size of original 3DS-MAX Model (ZIP-archived) | 4040 | | 151 | | 519 | | N/A | |
| DepthImage Size | 3319 | | 141 | | 838 | | 236 | |
| Depth Images | 1903 | 1416 | 41 | 100 | 519 | 319 | 118 | 118 |
| OctreeImage Size | 267 | | 75 | | 171 | | 83.4 | |
| Compressed Images Octrees | 135 | 132 | 38.5 | 36.5 | 88 | 83 | 47.4 | 36 |

Depth maps in DepthImages were stored in PNG format, while reference images in high-quality JPEG. Data in Table 12 indicate that DepthImage model size is not always smaller than size of the archived polygonal model. However, compression provided by OctreeImage is usually much higher. This is a consequence of unification of depth maps into a single efficiently compressed octree data structure, as well as of sophisticated preprocessing which removes redundant pixels from reference images. On the other hand, DepthImage structure provides a simple and universal means for representing complex objects like "Palm" without difficult preprocessing.

Table 13 presents OctreeImage-specific data, giving the idea of efficiency of the compression developed for this format. Table entries are data sizes of compressed and uncompressed part of the models comprising octree and voxelImageIndex components. It is shown that reduction of this part varies from 2 to 2.5 times. Note that "Palms" model in Table 13 is not the same one as "Palm" in Table 12.

TABLE 13

Compression results for octree and voxelImageIndex fields in OctreeImage format (File sizes being rounded to kilobytes)

| Model | Number of Ref. Images | Size of Octree and voxelImageIndex Component | | Compression Ratio |
|---|---|---|---|---|
| | | Uncompressed | Compressed | |
| Angel256 | 6 | 81.5 | 38.5 | 2.1 |
| | 12 | 86.2 | 41.7 | 2.1 |
| Morton512 | 6 | 262.2 | 103.9 | 2.5 |
| | 12 | 171.0 | 88.0 | 2.0 |
| Palms512 | 6 | 198.4 | 85.8 | 2.3 |
| | 12 | 185.1 | 83.1 | 2.2 |
| Robot512 | 6 | 280.4 | 111.9 | 2.5 |
| | 12 | 287.5 | 121.2 | 2.4 |

Data on rendering speed will now be presented. Rendering speed of DepthImage "Palm512" is about 2 fps (note that it is 21 Simple textures), while other static models we tested with reference image side 512 are rendered at 5-6 fps. Note that rendering speed depends mostly on the number and resolution of the reference images, but not on the complexity of the scene. This is an important advantage over the polygonal representations, especially in animated case. Animated OctreeImage "Dragon512" is visualized at 24 frames per second (fps). Animated OctreeImage "Dragon512" is visualized at 24 frames per second (fps). The compression results are as follows.

Compressed size of octree plus voxelImageIndex component: 910 KB (696 KB and 214 KB respectively)

Figure 22:
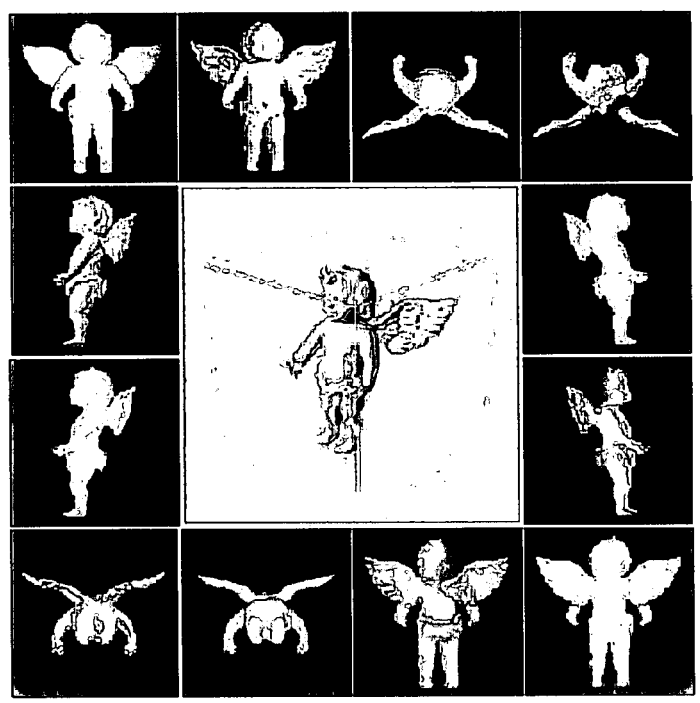
FIG. 22 is a diagram of an example of Box Texture (BT), in which Six SimpleTextures (pairs of image and depth map) are used to render the model shown in the center.
Figure 23:
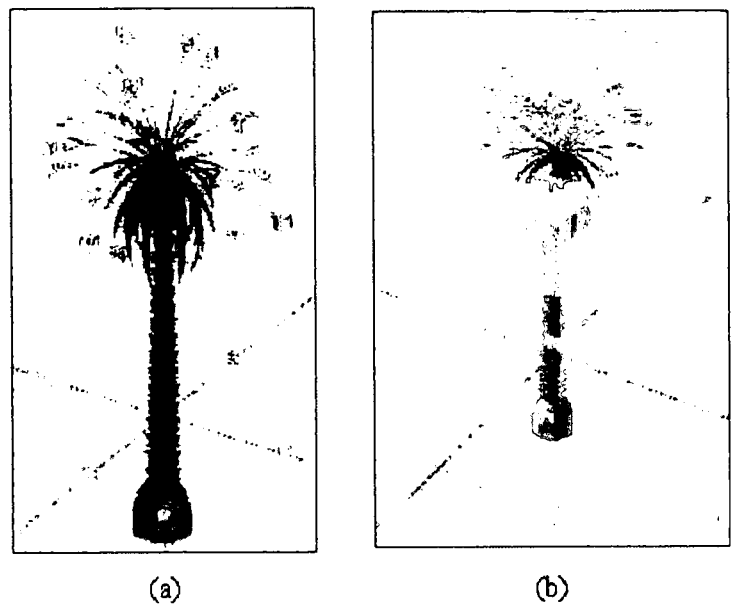
FIG. 23 is a diagram of an example of Generalized Box Texture (GBT): (a) shows camera locations for 'Palm' model, (b) shows reference image planes for the same model (21 SimpleTextures are used)
Figure 30:
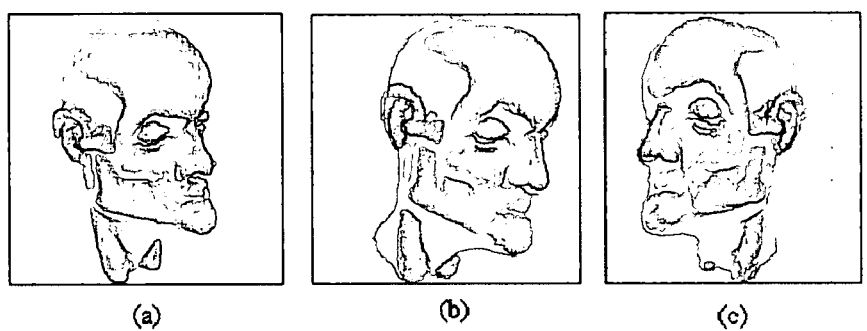
FIG. 30 is a diagram of an example showing the rendering result of "Morton" model in different formats: (a) is in an original polygonal format, (b) is in a DepthImage format, and (c) is in an OctreeImage format.
Figure 31:
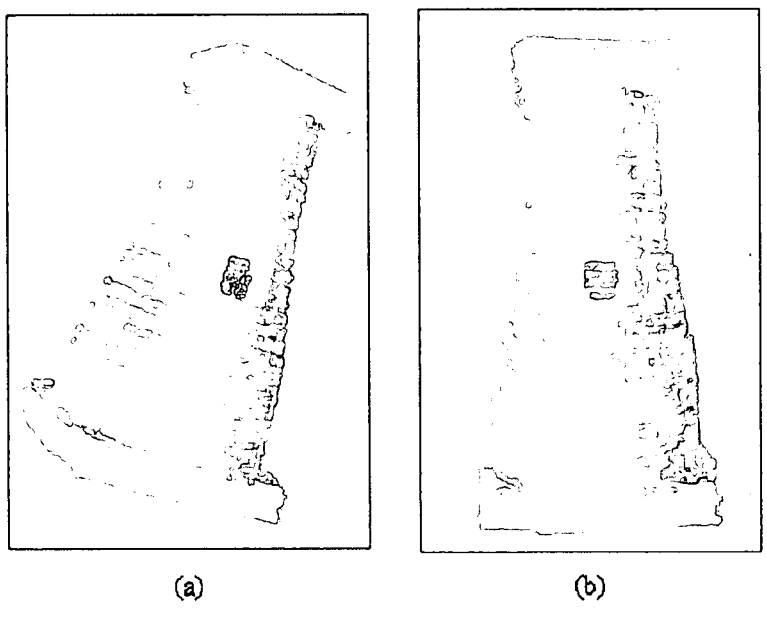
FIG. 31 is a diagram of rendering examples: (a) shows the scanned "Tower" model in a DepthImage format, (b) shows the same model, in an OctreeImage format (scanner data were used without noise removal, hence the black dots in the upper part of the model)

Six reference videostreams in compressed AVI format: 1370 KB Total data volume: 2280 KB "Angel256" DepthImage model is shown in FIG. 22. FIGS. 30 through 34 show several other DIBR and polygonal models. FIG. 30 compares appearance of polygonal and DepthImage "Morton" model. DepthImage model uses reference images in the JPEG format and rendering is performed by simplest splatting described in Section 5, but image quality is quite acceptable. FIG. 31 compares two versions of the scanned "Tower" model. Black dots in the upper part of the model are due to noisy input data. FIG. 32 demonstrates more complex "Palm" model, composed of 21 SimpleTextures. It also shows good quality, although leaves are, in general, wider than in the 3DS-MAX original—which is a consequence of simplified splatting.

Figure 33:
FIG. 33 is a diagram of rendering example, showing a frame from "Dragon512" animation in OctreeImage.
Figure 34:
FIG. 34 is a diagram of rendering example of "Angel512" model in a PointTexture format.

FIG. 33 presents a 3D frame from "Dragon512" OctreeImage animation. FIG. 34 demonstrates ability of a PointTexture format to provide models of excellent quality.

An apparatus and method for representing depth image-based 3D objects according to the present invention will now be described with reference to FIGS. 35 through 54.

Figure 35:
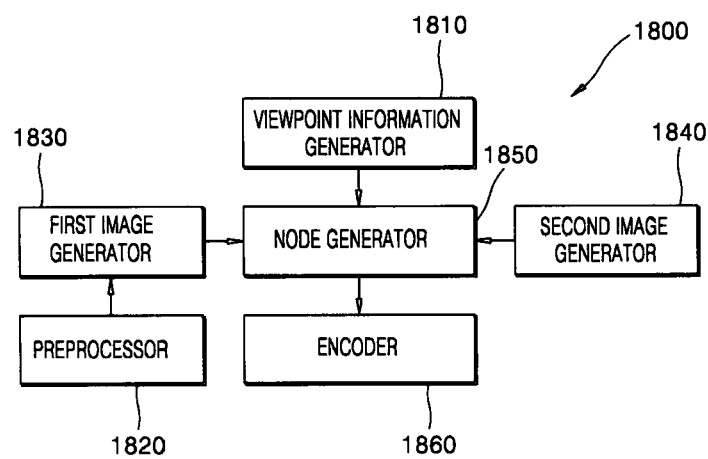
FIG. 35 is a block diagram of an apparatus for representing depth image based 3D objects using SimpleTexture according to an embodiment of the present invention.

FIG. 35 is a block diagram of an apparatus for representing depth image based 3D objects using SimpleTexture according to an embodiment of the present invention.

Referring to FIG. 35, a depth image based 3D object representing apparatus 1800 includes a viewpoint information generator 1810, a preprocessor 1820, a first image generator 1830, a second image generator 1840, a node generator 1850 and an encoder 1860.

The viewpoint information generator 1810 generates at least one piece of viewpoint information. The viewpoint information includes a plurality of fields defining an image plane for an object. The fields constituting the viewpoint information include a position field, an orientation field, a visibility field, a projection method field, and a distance field.

In the position and orientation fields, a position and an orientation in which an image plane is viewed are recorded. The position in the position field is a relative location of the viewpoint to the coordinate system's origin, while the orientation in the orientation field is a rotation amount of the viewpoint relative to the default orientation.

In the visibility field, a visibility area from the viewpoint to the image plane is recorded.

In the projection method field, a projection method from the viewpoint to the image plane is recorded. In the present invention, the projection method includes an orthogonal projection method in which the visibility area is represented by width and height, and a perspective projection method in which the visibility area is represented by a horizontal angle and a vertical angle. When the orthogonal projection method is selected, the width and the height of the visibility area correspond to the width and height of an image plane, respectively. When the perspective projection method is selected, the horizontal and vertical angles of the visibility area correspond to angles formed to horizontal and vertical sides by views ranging from a viewpoint to the image plane.

In the distance field, a distance from a viewpoint to a closer boundary plane and a distance from the viewpoint to a farther boundary plane are recorded. The distance field is composed of a nearPlane field and a farPlane field. The distance field defines an area for depth information.

The first image generator 1830 generates color images on the basis of color information corresponding to the viewpoint information on the respective pixel points constituting an object. In the case of a video format for generating an animated object, the depth information and the color information are a plurality of sequences of image frames. The second image generator 1840 generates depth images corresponding to the viewpoint information on the basis of the depth information on the respective pixel points constituting an object. The node generator 1850 generates image nodes composed of viewpoint information, a color image and a depth image corresponding to the viewpoint information.

Figure 36:
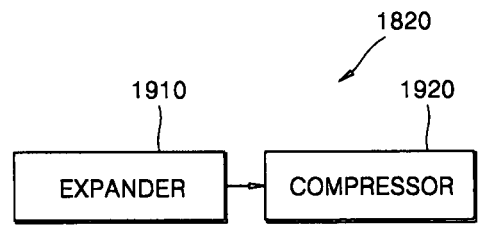
FIG. 36 is a detailed block diagram of a preprocessor 1820.

The preprocessor 1820 preprocesses pixels in the boundary between the object and background of the color image. FIG. 36 shows the preprocessor 1820 in detail. Referring to FIG. 36, the preprocessor 1820 includes an expanding portion 1910 and a compressing portion 1920. The expanding portion 1910 extends colors of pixels in the boundary to the background using the average color of blocks and fast decay of intensity. The compressing portion 1920 performs block-based compression to then squeeze the distortion into the background. The encoder 1920 encodes the generated image nodes to output bitstreams.

Figure 37:
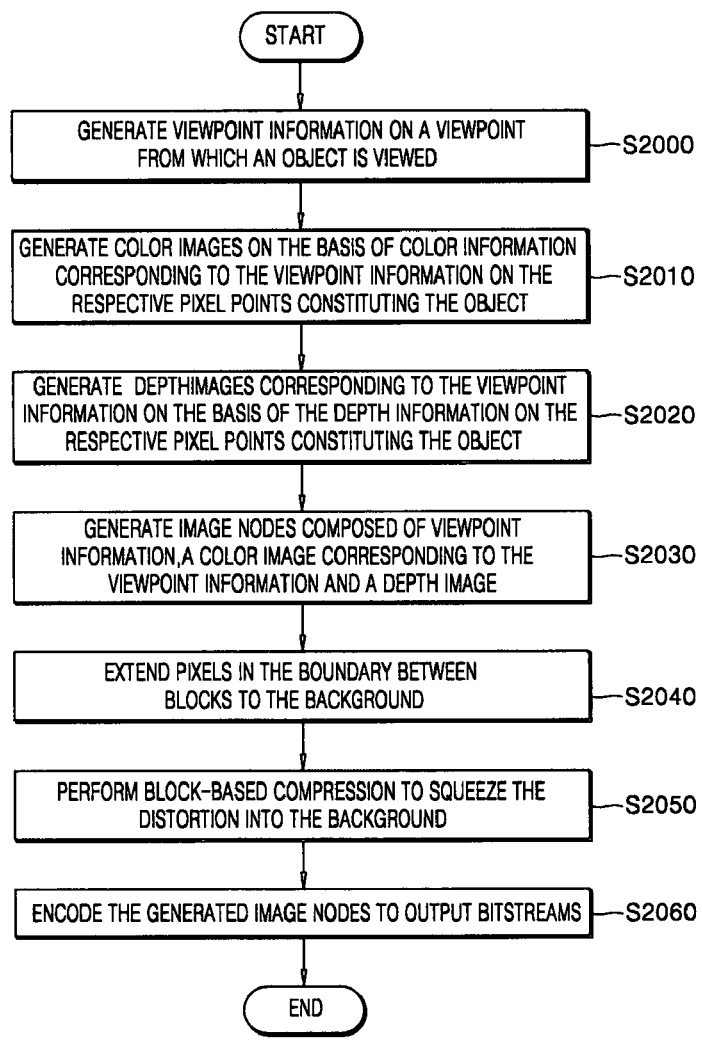
FIG. 37 is a flow diagram showing the process of implementing a method for representing depth image based 3D objects using SimpleTexture according to the embodiment of the present invention.

FIG. 37 is a flow diagram showing the process of implementing a method for representing depth image based 3D objects using SimpleTexture according to the embodiment of the present invention.

Referring to FIG. 37, in step S2000, the viewpoint information generator 1810 generates viewpoint information on a viewpoint from which an object is viewed. In step S2010, the first image generator 1830 generates color images on the basis of color information corresponding to the viewpoint information on the respective pixel points constituting the object. In step S2020, the second image generator 1840 generates depth images corresponding to the viewpoint information on the basis of the depth information on the respective pixel points constituting the object. In step S2030, the node generator 1850 generates image nodes composed of viewpoint information, a color image and a depth image corresponding to the viewpoint information.

In step S2040, the expanding portion 1910 extends colors of pixels in the boundary between blocks to the background using the average color of blocks and fast decay of intensity. In step S2050, the compressing portion 1920 performs block-based compression to then squeeze the distortion into the background. In step S2060, the encoder 1920 encodes the generated image nodes to output bitstreams.

The same apparatus and method for representing depth image-based 3D objects according to the present invention having been described above with reference to FIGS. 35 through 37 are also applied to SimpleTexture-based object representation, and the structure of a SimpleTexture is illustrated in FIG. 26.

Figure 38:
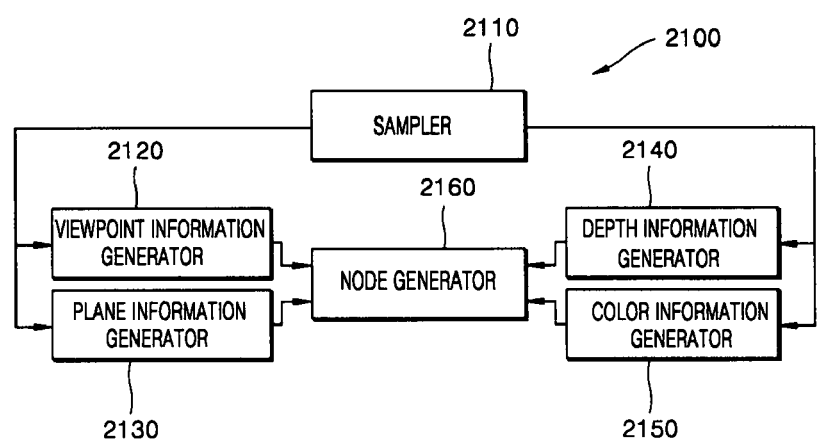
FIG. 38 is a block diagram of an apparatus for representing depth image based 3D objects using PointTexture according to the present invention.

FIG. 38 is a block diagram of an apparatus for representing depth image based 3D objects using PointTexture according to the present invention.

Referring to FIG. 38, a depth image-based 3D object representing apparatus 2100 includes a sampler 2110, a viewpoint information generator 2120, a plane information generator 2130, a depth information generator 2140, a color information generator 2150 and a node generator 2160.

The sampler 2110 generates samples for an image plane by projecting an object onto a reference plane. The samples for the image plane are composed of image pairs of a color image and a depth image.

The viewpoint information generator 2120 generates viewpoint information on a viewpoint from which an object is viewed. The viewpoint information includes a plurality of fields defining an image plane for an object. The fields constituting the viewpoint information include a position field, an orientation field, a visibility field, a projection method field, and a distance field.

In the position and orientation fields, a position and an orientation in which an image plane is viewed are recorded. A viewpoint is defined by the position and orientation. In the visibility field, the width and height of a visibility from the viewpoint to the image plane are recorded. In the projection method field, a projection method selected from an orthogonal projection method in which the visibility area is represented by width and height, and a perspective projection method in which the visibility area is represented by a horizontal angle and a vertical angle, is recorded. In the distance field, a distance from a viewpoint to a closer boundary plane and a distance from the viewpoint to a farther boundary plane are recorded. The distance field is composed of a nearPlane field and a farPlane field. The distance field defines an area for depth information.

The plane information generator 2130 generates plane information defining the width, height and depth of an image plane composed of a set of points obtained from the samples for the image plane corresponding to the viewpoint information. The plane information is composed of a plurality of fields. The fields constituting the plane information include a first field in which the width of the image plane is recorded, a second field in which the height of the image plane is recorded, and a depthResolution field in which the resolution of the depth information is recorded.

The depth information generator 2140 generates a sequence of depth information on depths of all projected points of an object projected onto the image plane. The color information generator 2150 generates a sequence of color information on the respective projected points. In the sequence of depth information, the number of projected points and the depth values of the respective projected points are sequentially recorded. In the sequence of color information, color values corresponding to the depth values of the respective projected points are sequentially recorded.

The node generator 2160 generates node composed of plane information corresponding to the image plane, the sequence of depth information and the sequence of color information.

Figure 39:
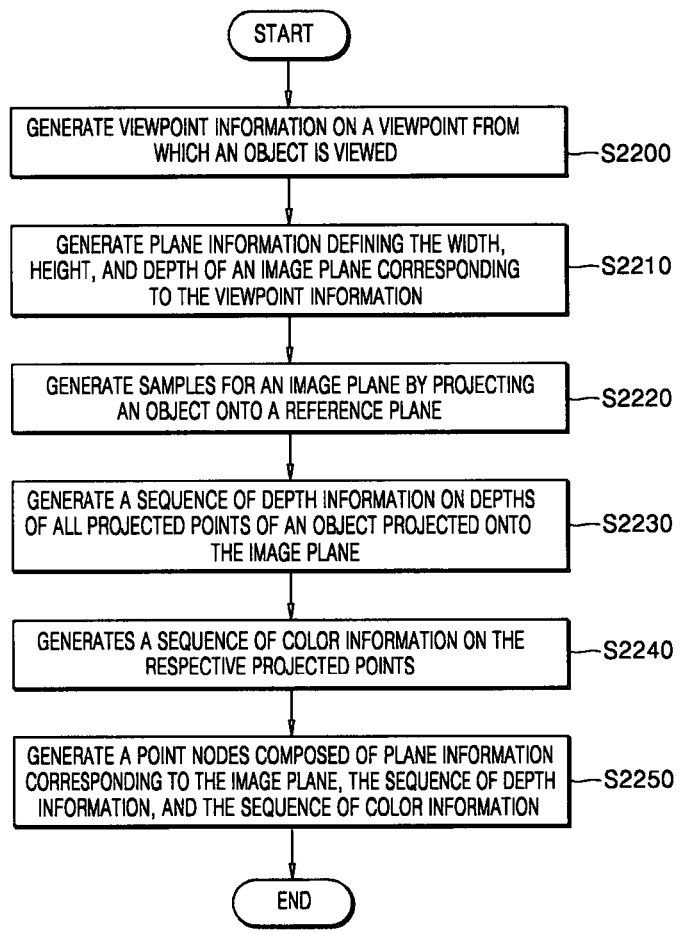
FIG. 39 is a flow diagram showing the process of implementing a method for representing depth image based 3D objects using PointTexture according to the present invention.

FIG. 39 is a flow diagram showing the process of implementing a method for representing depth image based 3D objects using PointTexture according to the present invention.

Referring to FIG. 39, in step S2200, the viewpoint information generator 2120 generates viewpoint information on a viewpoint from which an object is viewed. In step S2210, the plane information generator 2130 generates plane information defining the width, height and depth of an image plane corresponding to the viewpoint information. In step S2220, the sampler 2110 generates samples for an image plane by projecting an object onto a reference plane. Step S2220 is performed for the purpose of providing as many samples as possible for an image plane. If there are plenty of samples for an image plane, step S2220 is not performed.

In step S2230, the depth information generator 2140 generates sequence of depth information on depths of all projected points of an object projected onto the image plane. In step S2240, the color information generator 2150 generates a sequence of color information on the respective projected points. In step S2250, the node generator 2160 generates node composed of plane information corresponding to the image plane, a sequence of depth information and a sequence of color information.

The same apparatus and method for representing depth image-based 3D objects according to the present invention having been described above with reference to FIGS. 35 through 37 are applied to PointTexture-based object representation, and the structure of a PointTexture is illustrated in FIG. 26.

Figure 40:
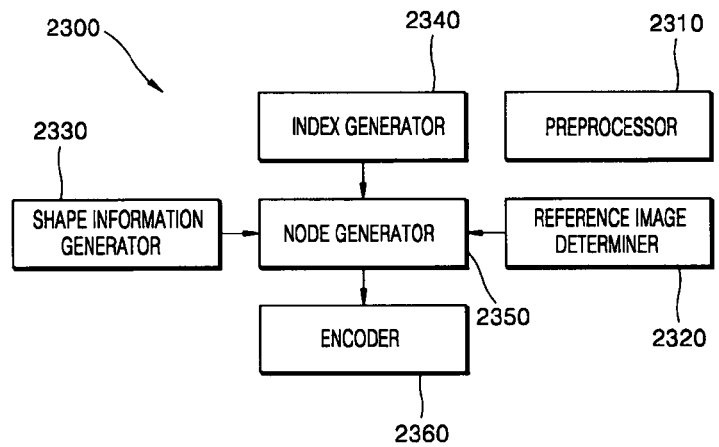
FIG. 40 is a block diagram of an apparatus for representing depth image based 3D objects using Octree according to the present invention.

FIG. 40 is a block diagram of an apparatus for representing depth image based 3D objects using Octree according to the present invention.

Referring to FIG. 40, a depth image-based 3D object representing apparatus 2300 includes a preprocessor 2130, a reference image determiner 2320, a shape information generator 2330, an index generator 2340, a node generator 2350 and an encoder 2360.

Figure 41:
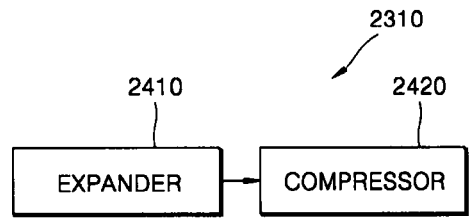
FIG. 41 is a detailed block diagram of a preprocessor 2310.

The preprocessor 2130 preprocesses a reference image. The detailed structure of the preprocessor 2130 is shown in FIG. 41. Referring to FIG. 41, the preprocessor 2310 includes an expanding portion 2410 and a compressing portion 2420. The expanding portion 2410 extends colors of pixels in the boundary between blocks in the reference image to the background using the average color of blocks and fast decay in intensity. The compressing portion 2420 performs block-based compression on the reference image to then squeeze the distortion into the background.

The reference image determiner 2320 determines a reference image containing a color image for each cube divided by the shape information generator 2330. The reference image is a DepthImage node composed of viewpoint information and a color image corresponding to the viewpoint information. Here, the viewpoint information includes a plurality of fields defining an image plane for the object. The respective fields constituting the viewpoint information are described as above and a detailed explanation thereof will not given. The color image contained in the DepthImage node may be either a SimpleTexture or a PointTexture.

The shape information generator 2330 generates shape information for an object by dividing an octree containing the object into 8 subcubes and defining the divided subcubes as children nodes. The shape information generator 2330 iteratively performs subdivision until each subcube becomes smaller than a predetermined size. The shape information includes a resolution field in which the maximum number of octree leaves along a side of the cube containing the object is recorded, and an octree field in which a sequence of internal node structures is recorded, and an index field in which indices of the reference images corresponding to each internal node are recorded.

Figure 42:
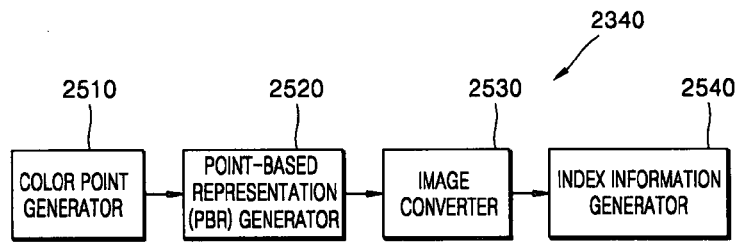
FIG. 42 is a detailed block diagram of an index generator 2340.

The index generator 2340 generates index information of the reference image corresponding to the shape information. FIG. 42 is a detailed block diagram of the index generator 2340. Referring to FIG. 42, the index generator 2340 includes a color point generator 2510, a point-based representation (PBR) generator 2520, an image converter 2530 and an index information generator 2540.

The color point generator 2510 acquires color points by shifting pixels existing in the reference image by a distance defined in the depth map corresponding thereto. The PBR generator 2520 generates an intermediate PBR image by a set of color points. The image converter 2530 converts the PBR image into an octree image represented by the cube corresponding to each point. The index information generator 2540 generates index information of the reference image corresponding to each cube.

The node generator 2350 generates octree nodes including shape information, index information and reference image.

Figure 43:
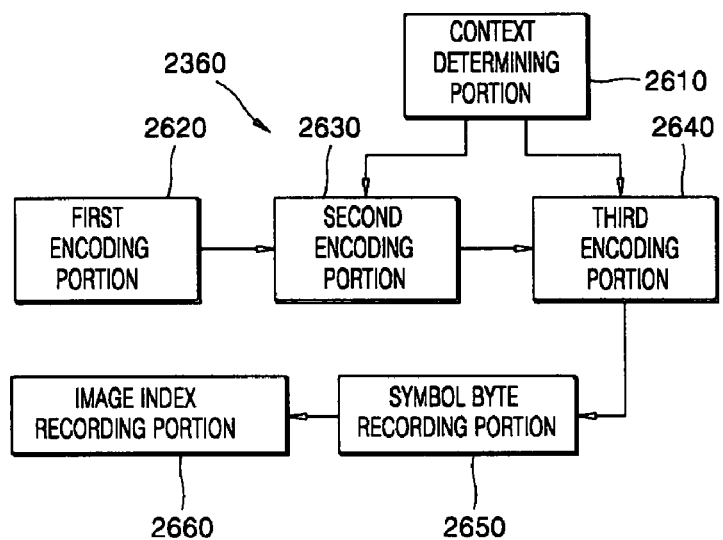
FIG. 43 is a detailed block diagram of an encoder 2360.

The encoder 2360 encodes the octree nodes to output bitstreams. The detailed structure of the encoder 2360 is shown in FIG. 43. Referring to FIG. 43, the encoder 2360 includes a context determining portion 2610, a first encoding portion 2620, a second encoding portion 2630, a third encoding portion 2640, a symbol byte recording portion 2650 and an image index recording portion 2660.

The context determining portion 2610 determines a context of the current octree node on the basis of the number of encoding cycles for the octree node. The first encoding portion 2620 encodes the first 512 nodes by a 0-context model and arithmetic coding while keeping a single probability table with 22 entries. The first encoding portion 2620 starts coding from uniform distribution.

The second encoding portion 2630 encodes nodes from the $513^{th}$ node to the $2048^{th}$ node following after the $512^{th}$ node is encoded by a 1-context model using a parent node as a context. At the switching moment from the 0-context to the 1-context model, the second encoding portion 2630 copies the 0-context model probability table to all of the 1-context probability tables.

Figure 44:
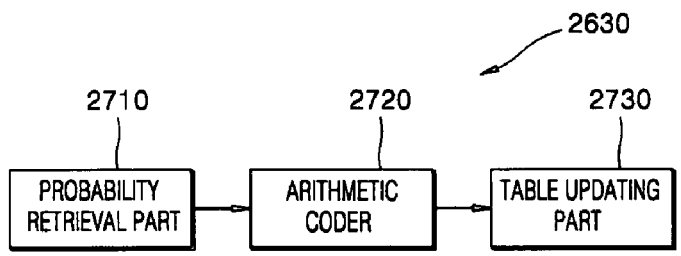
FIG. 44 is a detailed block diagram of a second encoding portion 2630.

FIG. 44 is a detailed block diagram of the second encoding portion 2630. Referring to FIG. 44, the second encoding portion 2630 includes a probability retrieval part 2710, an arithmetic coder 2720 and a table updating part 2730. The probability retrieval part 2710 retrieves the probability of generating the current node in a context from the probability table corresponding to the context. The arithmetic coder 2720 compresses octrees by a probability sequence containing the retrieved probability. The table updating part 2730 updates probability tables with a predetermined increment, e.g., 1, to the generation frequencies of the current node in the current context.

The third encoding portion 2640 encodes nodes following after the $2048^{th}$ nodes by a 2-context model and arithmetic coding using parent and children nodes as contexts. At the switching moment from the 1-context to the 2-context model, the third encoding portion 2640 copies the 1-context model probability tables for a parent node pattern to the 2-context probability tables corresponding to the respective positions at the same parent node pattern.

Figure 45:
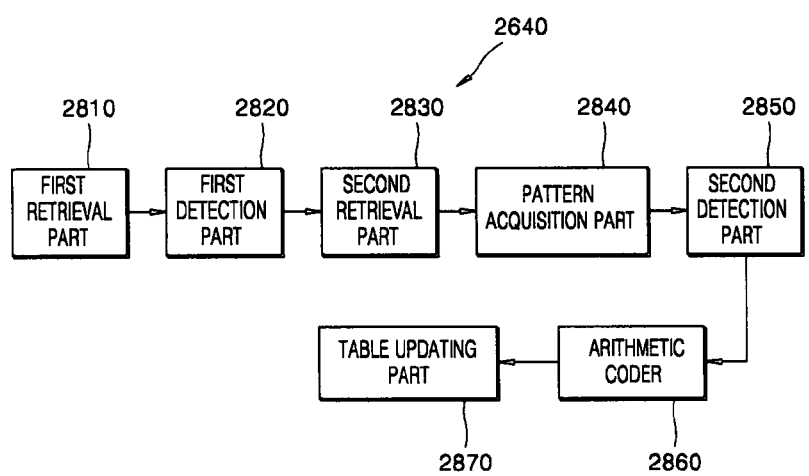
FIG. 45 is a detailed block diagram of a third encoding portion 2640.

FIG. 45 is a detailed block diagram of the third encoding portion 2640. Referring to FIG. 45, the third encoding portion 2640 includes a first retrieval part 2810, a first detection part 2820, a second retrieval part 2830, a pattern acquisition part 2840, a second detection part 2850, an arithmetic coder 2860 and a table updating part 2870.

The first retrieval part 2810 retrieves a parent node of the current node. The first detection part 2820 detects a class to which the retrieved parent node belongs and detects transform by which the parent node is transformed to the standard node of the detected class. The second retrieval part 2830 applies the detected transform to the parent node and retrieves the position of the current node in the transformed parent node. The pattern acquisition part 2840 applies the transform to the current node and acquires a pattern as a combination of the detected class and the position index of the current node. The second detection part 2850 detects necessary probabilities from entries of the probability table corresponding to the acquired pattern. The arithmetic coder 2860 compresses octrees by a probability sequence containing the retrieved probability. The table updating part 2870 updates probability tables with a predetermined increment, e.g., 1, to the generation frequencies of the current node in the current context.

If the current node is not a leaf node, the symbol byte recording portion 2650 records symbol bytes corresponding to the current node on bitstreams. If all children nodes of the current node have the same reference image index and the parent node of the current node has an "undefined" reference image index, the image index recording part 2660 records the same reference image index on the bitstreams for subnodes of the current node. If the children nodes of the current node have different reference image indices, the image index recording part 2660 records an "undefined" reference image index for subnodes of the current node.

Figure 46:
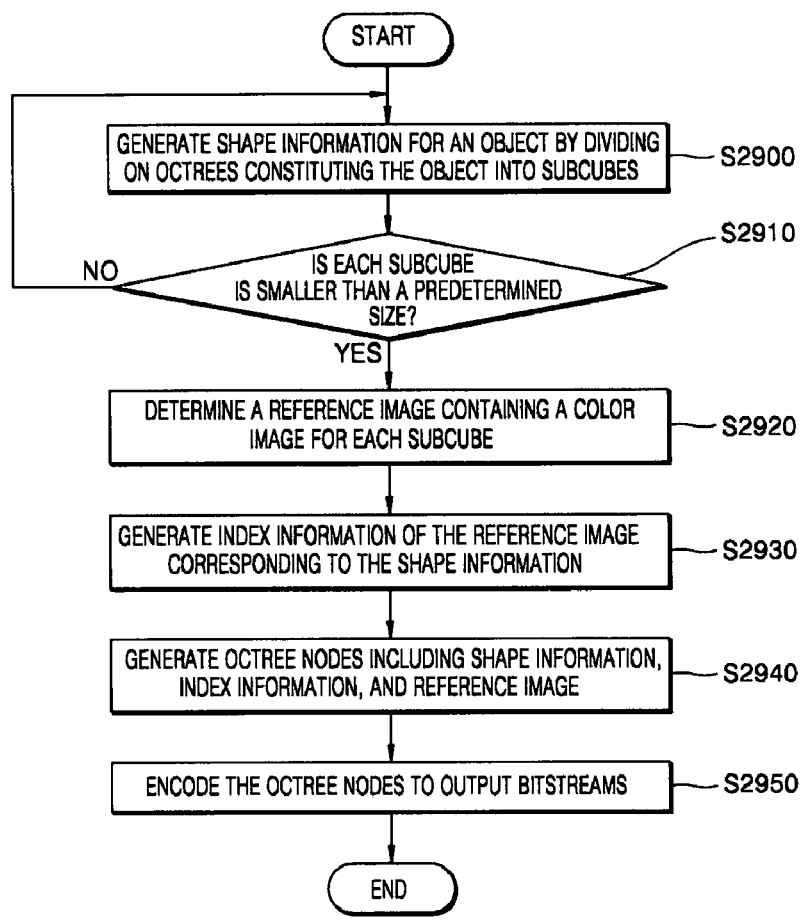
FIG. 46 is a flow diagram showing the process of implementing a method for representing depth image based 3D objects using Octrees according to the embodiment of the present invention.

FIG. 46 is a flow diagram showing the process of implementing a method for representing depth image based 3D objects using Octree according to the embodiment of the present invention. Referring to FIG. 46, in step S2900, the shape information generator 2330 generates shape information for an object by dividing an octree containing the object into subcubes and defining the divided subcubes as children nodes. The shape information includes a resolution field in which the maximum number of octree leaves along a side of the cube containing the object is recorded, an octree field in which a sequence of internal node structures is recorded, and an index field in which indices of the reference images corresponding to each internal node are recorded. Each internal node is represented by a byte. Node information recorded in a bit sequence constituting the byte represents presence or absence of children nodes of children nodes belonging to the internal node. In step S2910, subdivision is iteratively performed to produce 8 subcubes if each subcube is bigger than a predetermined size (This value can be empirically found.).

In step S2920, the reference image determiner 2320 determines a reference image containing a color image for each cube divided by the shape information generator 2330. The reference image is a DepthImage node composed of viewpoint information and a color image corresponding to the viewpoint information. The constitution of the viewpoint information is described as above. A preprocessing step may be performed for the reference image.

Figure 47:
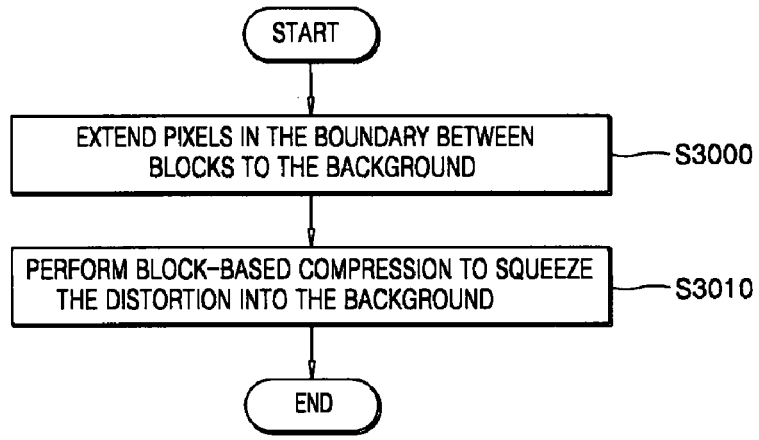
FIG. 47 is a flow diagram showing the process of implementing preprocessing a reference image.

FIG. 47 is a flow diagram showing the process of implementing preprocessing a reference image. Referring to FIG. 47, in step S3000, the expanding portion 1910 extends colors of pixels in the boundary between blocks to the background using the average color of blocks and fast decay of intensity. In step S3010, block-based compression is performed to then squeeze the distortion into the background.

In step S2930, the index generator 2340 generates index information of the reference image corresponding to the shape information.

Figure 48:
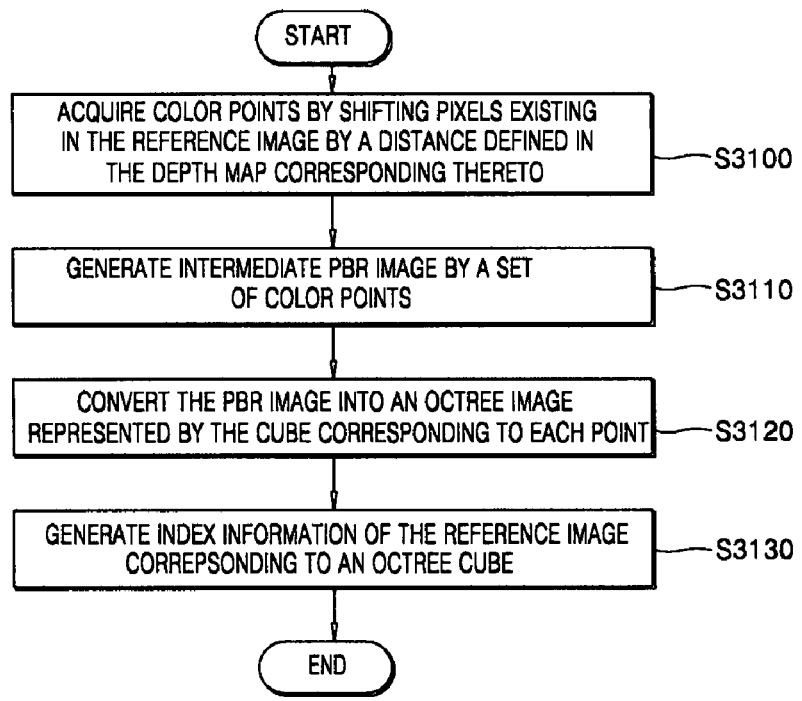
FIG. 48 is a flow diagram showing the process of implementing index generation.

FIG. 48 is a flow diagram showing the process of implementing index generation. Referring to FIG. 48, in step S3100, the color point generator 2510 acquires color points by shifting pixels existing in the reference image by a distance defined in the depth map corresponding thereto. In step S3110, the PBR generator 2520 generates an intermediate PBR image by a set of color points. In step S3120, the image converter 2530 converts the PBR image into an octree image represented by the cube corresponding to each point. In step S3130, the index information generator 2540 generates index information of the reference image corresponding to each cube.

In step S2940, the node generator 2350 generates octree nodes including shape information, index information and reference image.

In step S2950, the encoder 2360 encodes the octree nodes to output bitstreams.

Figure 49:
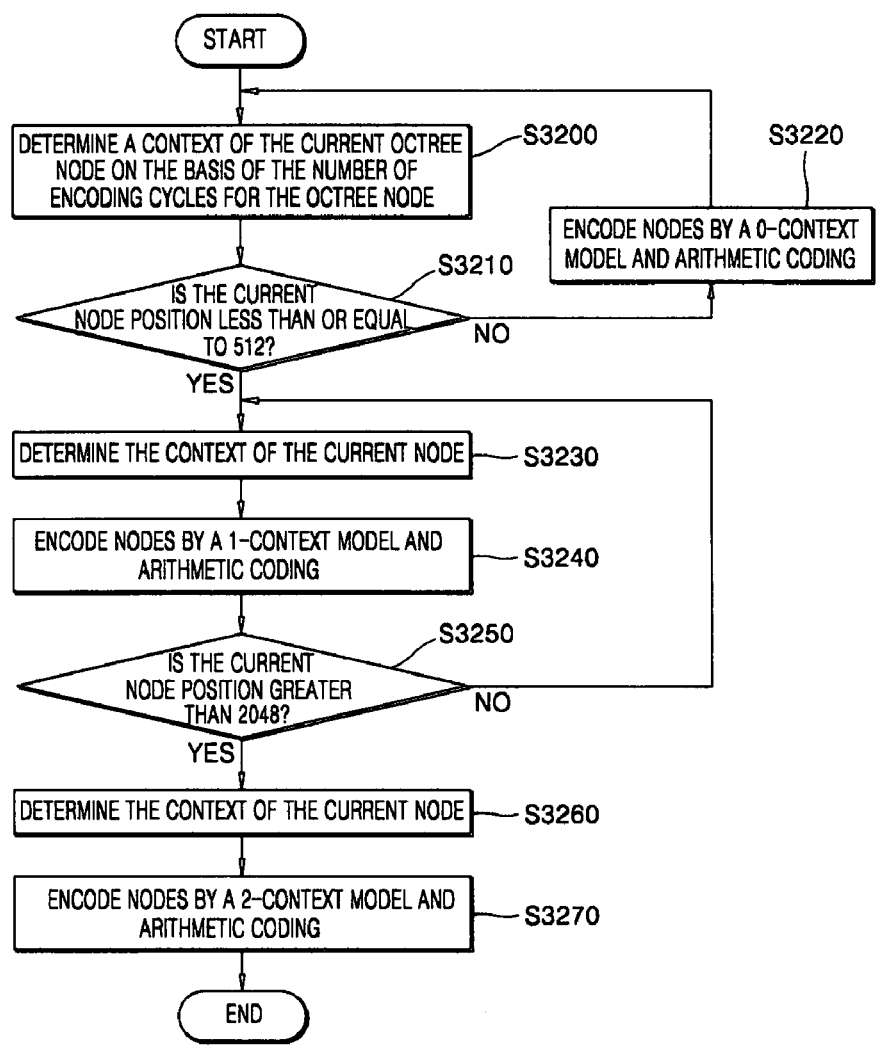
FIG. 49 is a flow diagram showing the process of implementing encoding.

FIG. 49 is a flow diagram showing the process of implementing encoding. Referring to FIG. 49, in step S3200, the context determining portion 2610 determines a context of the current octree node on the basis of the number of encoding cycles for the octree node. In step S3210, it is determined whether or not the current node position is less than or equal to 512. If yes, in step S3220, the first encoding step is performed by a 0-context model and arithmetic coding. If the current node position is greater than 512 in step S3210, the context of the current node is determined (step S3430) and the second encoding step is performed by a 1-context model using a parent node as a context (S3240). If the current node position is greater than 2048 in step S3250, the context of the current node is determined (step S3260) and the third encoding step is performed by a 2-context model using a parent node as a context (S3270).

Here, the 0-context is context-independent, and the 1-context is a class of the parent node. The total number of classes is 22. When the classes are connected by orthogonal transforms G generated by basis transforms, two nodes belong to the same class. The basis transforms $m_1, m_2$, and $m_3$, are given by $$m_1 = \begin{pmatrix} 0 & 1 & 0 \\ 1 & 0 & 0 \\ 0 & 0 & 1 \end{pmatrix}, m_2 = \begin{pmatrix} 1 & 0 & 0 \\ 0 & 0 & 1 \\ 0 & 1 & 0 \end{pmatrix}, m_3 = \begin{pmatrix} -1 & 0 & 0 \\ 0 & 1 & 0 \\ 0 & 0 & 1 \end{pmatrix}$$

where, $m_1$ and $m_2$ are reflections to the planes x=y and y=z, respectively, and $m_3$ is reflection to the plane x=0. The 2-context includes a class of the parent node and a position of the current node at the parent node.

Figure 50:
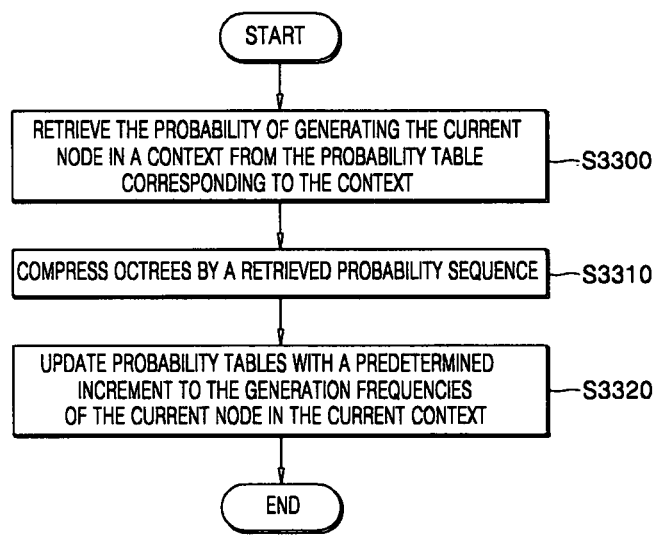
FIG. 50 is a flow diagram showing the process of implementing a second encoding step.

FIG. 50 is a flow diagram showing the process of implementing a second encoding step. Referring to FIG. 50, in step S3300, the probability retrieval part 2710 retrieves the probability of generating the current node in a context from the probability table corresponding to the context. In step S3310, the arithmetic coder 2720 compresses octrees by a probability sequence containing the retrieved probability. In step S3320, the table updating part 2730 updates probability tables with a predetermined increment, e.g., 1, to the generation frequencies of the current node in the current context.

Figure 51:
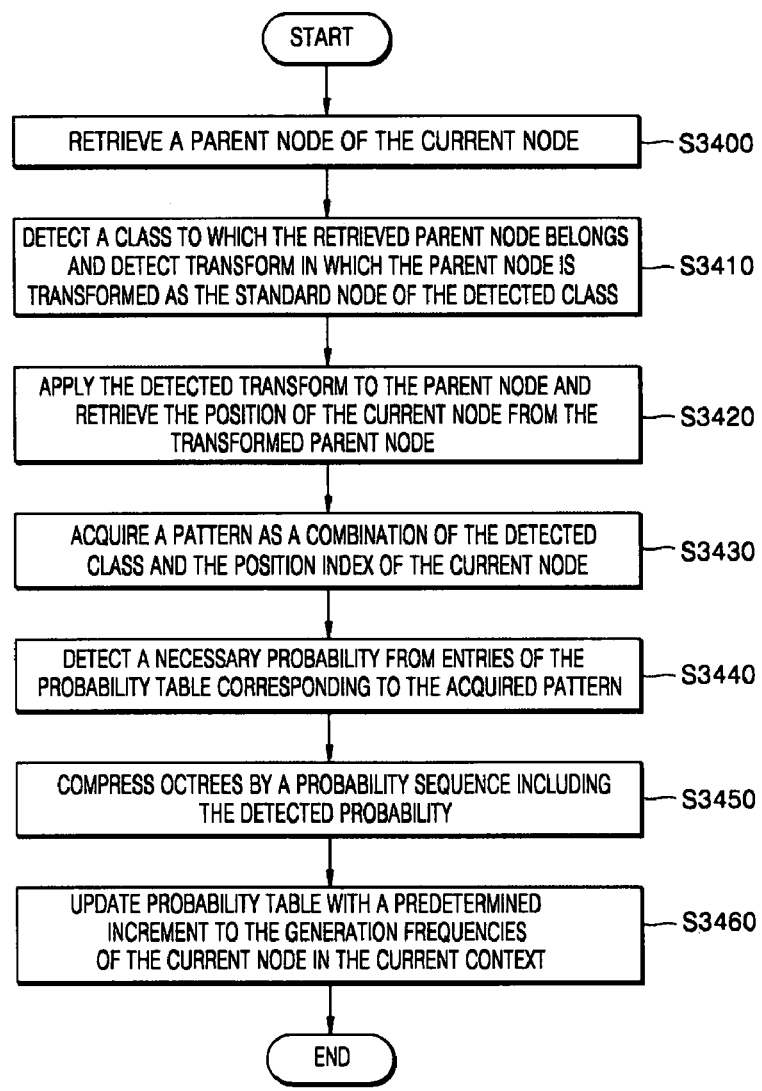
FIG. 51 is a flow diagram showing the process of implementing a third encoding step.

FIG. 51 is a flow diagram showing the process of implementing a third encoding step. Referring to FIG. 51, in step S3400, the first retrieval part 2810 retrieves a parent node of the current node. In step S3410, the first detection part 2820 detects a class to which the retrieved parent node belongs and detects transform in which the parent node is treated as the standard node of the detected class. In step S3420, the second retrieval part 2830 applies the detected transform to the parent node and retrieves the position of the current node from the transformed parent node. In step S3430, the pattern acquisition part 2840 applies the detected transform to the current node and acquires a pattern as a combination of the detected class and the position index of the current node. In step S3440, the second detection part 2850 detects necessary probabilities from entries of the probability table corresponding to the acquired pattern. In step S3450, the arithmetic coder 2860 compresses octrees by a probability sequence containing the retrieved probability. In step S3460, the table updating part 2870 updates probability tables with a predetermined increment, e.g., 1, to the generation frequencies of the current node in the current context.

Figure 52:
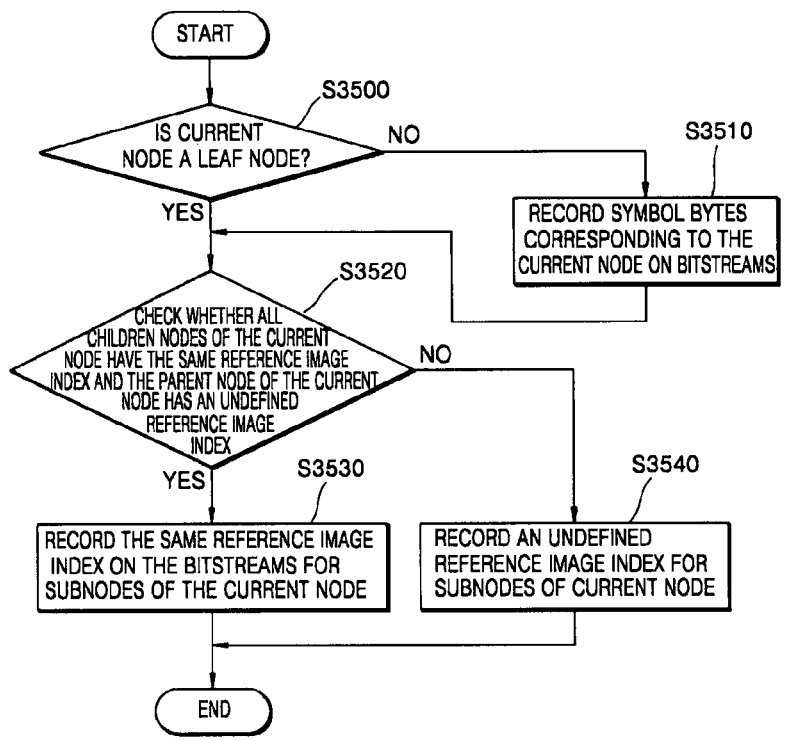
FIG. 52 is a flow diagram showing the process of generating bitstreams in the encoding steps.

FIG. 52 is a flow diagram showing the process of generating bitstreams during encoding. Referring to FIG. 52, if the current node is not a leaf node in step S3500, the symbol byte recording portion 2650 records symbol bytes corresponding to the current node on bitstreams in step S3510 and proceeds to step S3520. If the current node is a leaf node, the routine goes directly to step S3520 without performing step S3510.

If all children nodes of the current node have the same reference image index and the parent node of the current node has an "undefined" reference image index in step S3520, the image index recording part 2660 records the same reference image index on the bitstreams for subnodes of the current node in step S3530. If the children nodes of the current node have different reference image indices in step S3520, the image index recording part 2660 records an "undefined" reference image index for subnodes of the current node in step S3540.

Figure 53:
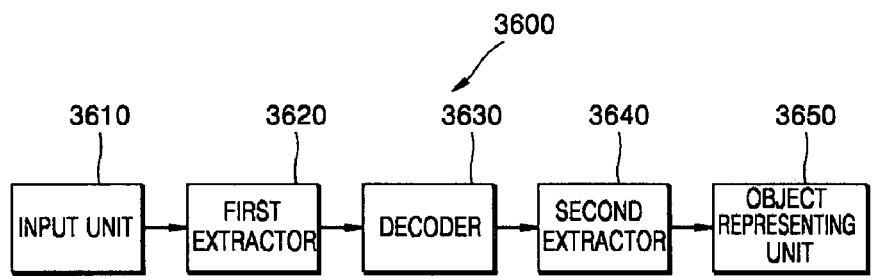
FIG. 53 is a block diagram of an apparatus for representing depth image based 3D objects using Octree according to another embodiment of the present invention.
Figure 54:
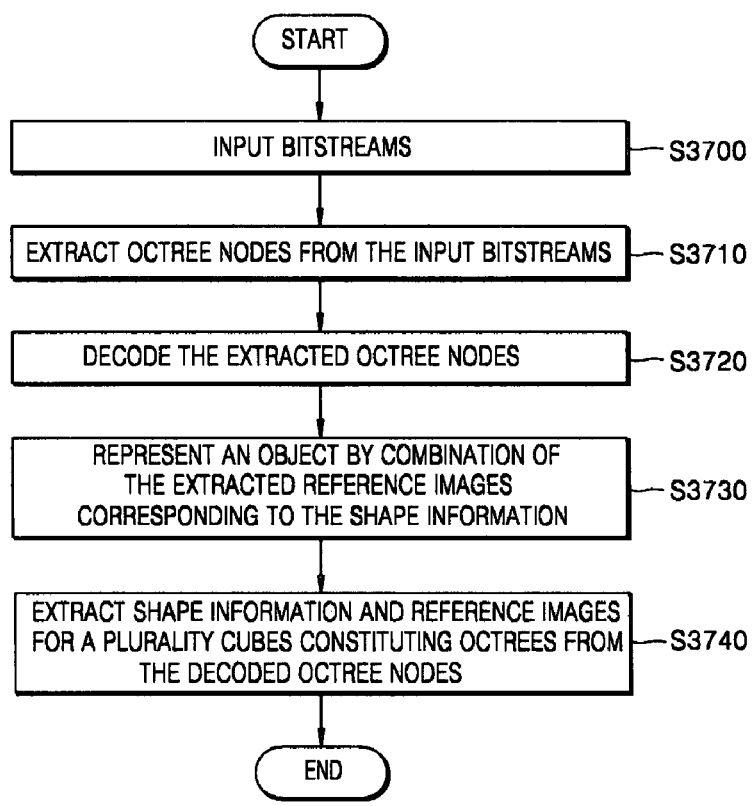
FIG. 54 is a flow diagram showing the process of implementing a method for representing depth image based 3D objects using Octree according to another embodiment of the present invention.

FIG. 53 is a block diagram of an apparatus for representing depth image based 3D objects using Octree according to another embodiment of the present invention, and FIG. 54 is a flow diagram showing the process of implementing a method for representing depth image based 3D objects using Octree according to another embodiment of the present invention.

Referring to FIGS. 53 and 54, the depth image based 3D object representing apparatus 3600 according to the present invention includes an input unit 3610, a first extractor 3620, a decoder 3630, a second extractor 3640 and an object representing unit 3650.

In step S3700, the input unit 3610 inputs bitstreams from an external device. In step S3710, the first extractor 3620 extracts octree nodes from the input bitstreams.

In step S3720, the decoder 3630 decodes the extracted octree nodes. The decoder 3630 includes a context determining portion, a first decoding portion, a second decoding portion and a third decoding portion. The operations of the respective components constituting the decoder 3630 are the same as those of encoders described with reference to FIGS. 43 through 45 and FIGS. 49 through 52, and a detailed explanation thereof will not be given. In step S3730, the second extractor 3540 extracts shape information and reference images for a plurality cubes constituting octrees from the decoded octree nodes. In step S3740, the object representing unit 3650 represents an object by combination of the extracted reference images corresponding to the shape information.

The present invention can be implemented on a computer-readable recording medium by computer readable codes. The computer-readable recording medium includes all kinds of recording apparatus from which data readable by a computer system can be read, and examples thereof are ROM, RAM, CD-ROM, magnetic tapes, floppy disks, optical data storage devices or the like, and also embodied in a carrier wave, e.g., from the Internet or other transmission medium. Also, the computer-readable recording medium is distributed in a computer system connected to a network so that computer readable codes are stored and implemented by a distributed method.

According to the present invention, in image-based representations, since perfect information on a colored 3D object is encoded by a set of 2D images-simple and regular structure instantly adopted into well-known methods for image processing and compression, the algorithm is simple and can be supported by the hardware in many aspects. In addition, rendering time for image-based models is proportional to the number of pixels in the reference and output images, but in general, not to the geometric complexity as in polygonal case. In addition, when the image-based representation is applied to real-world objects and scene, photo-realistic rendering of natural scene becomes possible without use of millions of polygons and expensive computation.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. The scope of the invention is defined by the claims and their equivalents.

What is claimed is:

1. A computer-implemented apparatus including at least one processor device for representing an object as a depth image based 3-dimensional (3D) object, comprising:
   a node generator using the at least one processor device to generate a DepthImage node corresponding to a plane of the image ("image plane"), wherein the DepthImage node comprises:
      a viewpoint field in which a viewpoint from which the image plane is viewed is recorded;
      a fieldOfView field in which a visibility area from the viewpoint to the image plane is recorded;
      an orthographic field in which a projection method from the viewpoint to the image plane is recorded, wherein the projection method is one of an orthogonal projection method and a perspective projection method;
      nearPlane and farPlane fields which specify distances from the viewpoint to a near plane and a far plane of the visibility area, respectively, wherein the near plane and the far plane define an area used to determine depth information for the image; and
      a diTexture field which specifies a depth image texture identifying a texture with depth for the image, the image including a grid on projected image planes, the grid including plural cells with each cell having a center point, the diTexture field comprising a texture field in which a colored plane image containing color information for each pixel forming the image is recorded and a depth field in which the depth information for each pixel forming the image is recorded,
   wherein:
      the depth information in the depth field comprises a still image frame and specifies multiple depths of each center point in the projected image planes, and
      the color information in the texture field comprises a plurality of sequences of image frames, and
   wherein the depth image texture identifies a reference video stream including animated texture and depth information covering all potentially visible parts of a surface of the 3D object.

2. The apparatus according to claim 1, wherein the viewpoint field comprises a position field where a position of the viewpoint is recorded, and an orientation field where an orientation of the viewpoint is recorded, the position being a relative location to the origin of the coordinate system, and the orientation being a rotation amount relative to a default orientation.

3. The apparatus according to claim 1, wherein the projection method comprises the orthogonal projection method in which the visibility area is represented by width and height, and the perspective projection method in which the visibility area is represented by a horizontal angle and a vertical angle.

4. The apparatus according to claim 3, wherein, when the orthogonal projection method is selected, the width and the height of the visibility area correspond to the width and height of the image plane, respectively, and when the perspective projection method is selected, the horizontal and vertical angles of the visibility area correspond to angles formed to horizontal and vertical sides by views ranging from the viewpoint to the image plane.

5. The apparatus according to claim 1, wherein a set of the depth information in the depth field forms a depth image which corresponds to the colored plane image in the texture field, and wherein the depth image is represented as a gray scale plane image according to the depth information.

6. A computer-implemented apparatus including at least one processor device for representing an object in as a depth image based 3-dimensional (3D) object, comprising:
   a node generator using the at least one processor to generate a DepthImage node corresponding to an a plane of the image ("image plane"), wherein the DepthImage node comprises:
      a viewpoint field in which a viewpoint from which the image plane is viewed is recorded;
      a fieldOfView field in which a visibility area from the viewpoint to the image plane is recorded;
      an orthographic field in which a projection method from the viewpoint to the image plane is recorded, wherein the projection method is one of an orthogonal projection method and a perspective projection method;
      nearPlane and farPlane fields which specify distances from the viewpoint to a near plane and a far plane of the visibility area, respectively, wherein the near plane and the far plane define an area used to determine depth information for an the image; and
      a diTexture field which specifies a depth image texture identifying a texture with depth for the image, the image including a grid on projected image planes, the grid including plural cells with each cell having a center point, the diTexture field comprising a texture field in which a colored plane image containing color information for each pixel forming the image is recorded and a depth field in which the depth information for each pixel forming the image is recorded,
   wherein:
      the depth information in the depth field comprises a plurality of sequences of image frames and specifies multiple depths of each center point in the projected image planes, and
      the color information in the texture field comprises a still image frame, and
   wherein the depth image texture identifies a reference video stream including animated texture and depth information covering all potentially visible parts of a surface of the 3D object.

7. The apparatus according to claim 5, wherein if the depth field is unspecified, the depth information is retrieved from an alpha channel in the texture field.

8. The apparatus according to claim 7, wherein the depth information is retrieved from a corresponding alpha channel in the texture field of each image frame of the plurality of sequences of image frames.

9. The apparatus according to claim 1, wherein the diTexture field includes:
   a width field in which width information of the image plane is recorded;
   a height field in which height information of the image plane is recorded;
   the depth field in which multiple pieces of depth information on each pixel of the image are recorded; and
   a color field in which color information on each pixel is recorded.

10. The apparatus according to claim 9, wherein the depth information is a sequence of numbers of pixels projected onto the image plane and depths for the respective pixels, and the color information is a sequence of colors corresponding to the respective pixels projected onto the image plane.

11. A computer-implemented method for representing an object as a depth image based 3-dimensional (3D) object, comprising:
generating, using a computer, a DepthImage node corresponding to a plane of the image ("image plane"), wherein the DepthImage node includes:
a viewpoint field in which a viewpoint from which the image plane is viewed is recorded;
a fieldOfView field in which a visibility area from the viewpoint to the image plane is recorded;
an orthographic field in which a projection method from the viewpoint to the image plane is recorded, wherein the projection method is one of an orthogonal projection method and a perspective projection method;
nearPlane and farPlane fields which specify the distances from the viewpoint to a near plane and a far plane of the visibility area, respectively, wherein the near plane and the far plane define an area used to determine depth information for the image; and
a diTexture field which specifies a depth image texture identifying a texture with depth for the image, the diTexture field including a texture field in which a colored plane image containing color information for each pixel forming the image is recorded and a depth field in which the depth information for each pixel forming the image is recorded, the image including a grid on projected image planes, the grid including plural cells with each cell having a center point, wherein:
the depth information comprises a still image frame and specifies multiple depths of each center point in the projected image planes in an order of traversal, and
the color information in the texture field comprises a plurality of sequences of image frames, and
wherein the depth image texture identifies a reference video stream including animated texture and depth information covering all potentially visible parts of a surface of the 3D object.

12. The method according to claim 11, wherein the viewpoint field includes a position field where a position of the viewpoint is recorded, and an orientation field where an orientation of the viewpoint is recorded, the position being a relative location to the coordinate system's origin, and the orientation being a rotation amount relative to a default orientation.

13. The method according to claim 11, wherein the projection method includes the orthogonal projection method in which the visibility area is represented by width and height, and the perspective projection method in which the visibility area is represented by a horizontal angle and a vertical angle.

14. The method according to claim 13, wherein when the orthogonal projection method is selected, the width and the height of the visibility area correspond to the width and height of the image plane, respectively, and when the perspective projection method is selected, the horizontal and vertical angles of the visibility area correspond to angles formed to horizontal and vertical sides by views ranging from the viewpoint to the image plane.

15. The method according to 11, wherein a set of the depth information in the depth field forms a depth image which corresponds to the colored plane image in the texture field, and wherein the depth image is represented as a gray scale plane image according to the depth information.

16. A computer-implemented method for representing an object in as a depth image based 3-dimensional (3D) object, comprising:
generating, using a computer, a DepthImage node corresponding to a plane of the image ("image plane"), wherein the DepthImage node includes:
a viewpoint field in which a viewpoint from which the image plane is viewed is recorded;
a fieldOfView field in which a visibility area from the viewpoint to the image plane is recorded;
an orthographic field in which a projection method from the viewpoint to the image plane is recorded, wherein the projection method is one of an orthogonal projection method and a perspective projection method;
nearPlane and farPlane fields which specify the distances from the viewpoint to a near plane and a far plane of the visibility area, respectively, wherein the near plane and the far plane define an area used to determine depth information for the image; and
a diTexture field which specifies a depth image texture identifying a texture with depth for the image, the image including a grid on projected image planes, the grid including plural cells with each cell having a center point, the diTexture field including a texture field in which a colored plane image containing color information for each pixel forming the image is recorded and a depth field in which the depth information for each pixel forming the image is recorded, wherein:
the depth information in the depth field comprises a plurality of sequences of image frames and specifies multiple depths of each center point in the projected image planes in an order of traversal, and
the color information in the texture field comprises a still image frame, and
wherein the depth image texture identifies a reference video stream including animated texture and depth information covering all potentially visible parts of a surface of the 3D object.

17. The method according to claim 15, wherein if the depth field is unspecified, the depth information is retrieved from an alpha channel in the texture field.

18. The method according to claim 17, wherein the depth information is retrieved from a corresponding alpha channel in the texture field of each image frame of the plurality of sequences of image frames.

19. The method according to claim 11, wherein the diTexture field includes:
a width field in which width information of the image plane is recorded;
a height field in which height information of the image plane is recorded;
the depth field in which multiple pieces of depth information on each pixel of the image are recorded; and
a color field in which color information on each pixel is recorded.

20. The method according to claim 19, wherein the depth information is a sequence of numbers of pixels projected onto the image plane and depths for the respective pixels, and the color information is a sequence of colors corresponding to the respective pixels projected onto the image plane.

21. The apparatus according to claim 9, the diTexture field further includes:
a resolution (depthNbBits) field in which the resolution of the depth for each pixel is recorded.

22. The method according to claim 19, the diTexture field further includes:
a resolution (depthNbBits) field in which the resolution of the depth for each pixel is recorded.

* * * * *

UNITED STATES PATENT AND TRADEMARK OFFICE
CERTIFICATE OF CORRECTION

Page 1 of 1

PATENT NO. : 8,217,941 B2
APPLICATION NO. : 10/305065
DATED : July 10, 2012
INVENTOR(S) : Kyu-In Park et al.

It is certified that error appears in the above-identified patent and that said Letters Patent is hereby corrected as shown below:

Title Page Col. 1 (Inventors), Line 6, Delete "Leckovich-Maslyuk," and insert -- Levkovich-Maslyuk, --, therefor.

In the Claims:

Column 62, Line 13, In Claim 6, delete "an a" and insert -- a --, therefor.
Column 62, Line 28, In Claim 6, delete "an the" and insert -- the --, therefor.
Column 63, Line 58, In Claim 15, delete "to" and insert -- to claim --, therefor.
Column 64, Line 15, In Claim 16, delete "an the" and insert -- the --, therefor.

Signed and Sealed this
Fourteenth Day of May, 2013

Teresa Stanek Rea
*Acting Director of the United States Patent and Trademark Office*